US008271870B2

(12) United States Patent  
Verma et al.

(10) Patent No.: US 8,271,870 B2
(45) Date of Patent: Sep. 18, 2012

(54) DOCUMENT ANALYSIS, COMMENTING, AND REPORTING SYSTEM

(75) Inventors: Kunal Verma, Santa Clara, CA (US); Alex Kass, Palo Alto, CA (US); Reymonrod G. Vasquez, Vallejo, CA (US)

(73) Assignee: Accenture Global Services Limited, Dublin (IE)

( * ) Notice: Subject to any disclaimer, the term of this patent is extended or adjusted under 35 U.S.C. 154(b) by 399 days.

(21) Appl. No.: 12/558,483

(22) Filed: Sep. 11, 2009

(65) Prior Publication Data

US 2010/0005386 A1 Jan. 7, 2010

Related U.S. Application Data

(63) Continuation-in-part of application No. 12/121,503, filed on May 15, 2008, which is a continuation-in-part of application No. 11/945,958, filed on Nov. 27, 2007.

(51) Int. Cl.
*G06F 17/21* (2006.01)
(52) U.S. Cl. ..................................... 715/237
(58) Field of Classification Search ............ 715/237
See application file for complete search history.

(56) References Cited

U.S. PATENT DOCUMENTS

| 5,369,575 A | 11/1994 | Lamberti et al. |
| 5,774,833 A | 6/1998 | Newman |
| 5,995,920 A | 11/1999 | Carbonell et al. |
| 6,139,201 A | 10/2000 | Carbonell et al. |
| 6,167,370 A | 12/2000 | Tsourikov et al. |
| 6,343,297 B1 | 1/2002 | D'Anjou et al. |
| 6,510,425 B1 | 1/2003 | Okamoto et al. |
| 6,681,383 B1 | 1/2004 | Pastor et al. |
| 6,715,130 B1 | 3/2004 | Eiche et al. |
| 6,886,115 B2 | 4/2005 | Kondoh et al. |
| 7,111,076 B2 | 9/2006 | Abjanic et al. |

(Continued)

FOREIGN PATENT DOCUMENTS

EP 1 672 547 A1 6/2006

OTHER PUBLICATIONS

Boehm, et al., "Identifying Quality Requirement Conflicts," IEEE Software, vol. 13 No. 2, pp. 25-35, Mar. 1996.

(Continued)

*Primary Examiner* — Laurie Ries
*Assistant Examiner* — Tionna Smith
(74) *Attorney, Agent, or Firm* — Brinks Hofer Gilson & Lione

(57) ABSTRACT

A document analysis, commenting, and reporting system provides tools that automate quality assurance analysis tailored to specific document types. As one example, the specific document type may be a requirements specification and the system may tag different parts of requirements, including actors, entities, modes, and a remainder. The system also includes tools for visualizing the relationships between entities in a requirements specification and for identifying whether the requirements specification provides for attributes specified by a non-functional attribute glossary. The system facilitates the visualization of interactions of individual entities, of a system of entities, or entities identified for a specific use. The different types of visualizations distinguish between interacting and non-interacting entities, and highlight where a set of requirements may be deficient with respect to the non-interacting entities. However, the flexibility of the system permits analysis of any other document type, such as instruction manuals and best practices guides.

18 Claims, 48 Drawing Sheets

U.S. PATENT DOCUMENTS

| | | | |
|---|---|---|---|
| 7,146,422 | B1 | 12/2006 | Marlatt et al. |
| 7,337,102 | B2 | 2/2008 | Mosterman |
| 7,500,185 | B2 | 3/2009 | Hu |
| 7,536,711 | B2 | 5/2009 | Miyashita et al. |
| 7,647,349 | B2 | 1/2010 | Hubert et al. |
| 7,694,222 | B2 | 4/2010 | Steen et al. |
| 7,725,923 | B2 | 5/2010 | Miyashita et al. |
| 7,769,570 | B2 | 8/2010 | Mosterman |
| 7,774,743 | B1 | 8/2010 | Sanchez et al. |
| 7,877,737 | B2 | 1/2011 | Austin et al. |
| 7,975,220 | B2 | 7/2011 | Hattori |
| 2002/0065857 | A1 | 5/2002 | Michalewicz et al. |
| 2002/0147763 | A1 | 10/2002 | Lee et al. |
| 2002/0165717 | A1 | 11/2002 | Solmer et al. |
| 2002/0184397 | A1 | 12/2002 | Cooper |
| 2003/0149692 | A1 | 8/2003 | Mitchell |
| 2003/0172135 | A1 | 9/2003 | Bobick et al. |
| 2004/0025110 | A1 | 2/2004 | Hu |
| 2004/0030540 | A1 | 2/2004 | Ovil et al. |
| 2004/0034651 | A1 | 2/2004 | Gupta et al. |
| 2004/0039734 | A1 | 2/2004 | Judd et al. |
| 2004/0083092 | A1 | 4/2004 | Valles |
| 2004/0153992 | A1 | 8/2004 | Molina-Moreno et al. |
| 2004/0215443 | A1 | 10/2004 | Hatton |
| 2005/0108001 | A1 | 5/2005 | Aarskog |
| 2005/0216882 | A1 | 9/2005 | Sundararajan et al. |
| 2006/0041579 | A1 | 2/2006 | Miyashita et al. |
| 2006/0085451 | A1 | 4/2006 | Pal et al. |
| 2006/0085489 | A1 | 4/2006 | Tomic et al. |
| 2006/0190804 | A1 | 8/2006 | Yang |
| 2006/0265646 | A1 | 11/2006 | Girolami Rose |
| 2006/0282266 | A1 | 12/2006 | Lopez-Barquilla et al. |
| 2007/0143329 | A1 | 6/2007 | Vigen |
| 2007/0244859 | A1* | 10/2007 | Trippe et al. ................. 707/3 |
| 2007/0294230 | A1 | 12/2007 | Sinel et al. |
| 2008/0033897 | A1* | 2/2008 | Lloyd ........................ 706/19 |
| 2009/0138793 | A1 | 5/2009 | Verma et al. |

OTHER PUBLICATIONS

Boehm, et al., "Understanding and Controlling Software Costs," IEEE Transactions on Software Engineering, vol. 14, No. 10, Oct. 1988.

Borland, Mitigating Risk with Effective Requirements Engineering, available at http://www.borland.com/resources/en/pdf/white_papers/mitigating_risk_with_effective_requirements_engineering.pdf, Apr. 2005.

Curtis, Bill, Best Practices for Requirements Development and Management, available at http://info.borland.com/new/edm_images/JD/campaigns/BestPractices_Seminars_msp_chi.pdf, 2005.

Duan, Mary, Ravenflow Seeks to Eliminate Software Ambiguity, Error, Silicon Valley/San Jose Business Journal, Nov. 17, 2006, 2 pgs.

Hooks, Ivy F., "Managing Requirements," Crosstalk, The Journal of Defense Software Engineering, vol. 17, No. 8, Aug. 2004.

IEEE Standard Glossary of Software Engineering Terminology, IEEE Std 610.12-1990, Standards Coordinating Committee of the Computer Society of IEEE: New York, Sep. 1990.

Jena—A Semantic Web Framework for Java, available at http://jena.sourceforge.net/, last accessed on Oct. 10, 2008.

Lami, et al., "An Automatic Tool for the Analysis of Natural Language Requirements," published as Technical Report 2004-TR-40, Consiglio Nazionale delle Ricerche, Instituto di Scienza e Tecnologie dell'Informazione 'A. Faedo', Sep. 27, 2004.

OWL Web Ontology Language Overview, W3C, available at http://www.w3.org/TR/owl-features/, last retrieved on Oct. 10, 2008.

William N. Robinson, et al., "Requirements Interaction Management," ACM Computing Surveys, vol. 35, No. 2, Jun. 2003.

William N. Robinson, et al., "Requirements Interaction Management," Georgia State University, Department of Computer Information Systems Working Paper 99-7, Aug. 30, 1999.

Subject matter believed to be from Borland: Best Practices for Requirements Development & Management, believed to be publicly available at least since Apr. 2006.

Axel van Lamsweerde, et al., "Managing Conflicts in Goal-Driven Requirements Engineering," IEEE Transactions on Software Engineering, vol. 24, No. 11, Nov. 1998.

Wilson, William M., Rosenberg, Ph.D., Linda H., and Hyatt, Lawrence E., "Automatic Quality Analysis of Natural Language Requirement Specification," NASA, The Goddard Space Flight Center's Software Assurance Technology Center, http://satc.gsfc.nasa.gov/support/PNSQC-_OCT96/phq.html, dated Oct. 1996, pp. 1-19.

Fantechi, Allesandro, and Spinicci, Emilio, "A Content Analysis Technique for Inconsistency Detection in Software Requirements Documents," Dipartimento di Sistemi e Informatica Universita degli Studi di Firenzi, Italy, Jun. 2005, pp. 1-12.

Schindler, Esther, "Learning to Speak "User"," Digital Producer Magazine, Mar. 2006, pp. 1-2.

Rubinstein, David, "Quoth the Ravenflow: Drag-and-Drop Nevermore: Requirements suite generates UML diagrams from plain text," Software Development Times, Mar. 15, 2006, Issue No. 146, 1 page.

"The Declaration of Independence: Six Principles to Benefit You and Your Agile Organization," Better Software, www.StickMinds.com, Jun. 2006, pp. 24 and 36.

"Raven Professional Includes Five New Modules," Computer Magazine, Nov. 2006, p. 85.

Ravenflow website, © 2005-2006, http://www.ravenflow.com, last accessed on Jan. 30, 2008, 72 pages.

Karl E. Wiegers, Software Requirements, Chapters 1-13, Microsoft Press: Redmond, 2003.

Karl E. Wiegers, Software Requirements, Chapters 14-Appendix D, Microsoft Press: Redmond, 2003.

The prosecution history of U.S. Appl. No. 11/945,958.

The prosecution history of U.S. Appl. No. 12/121,503.

Search Report in European Patent Application No. EP 08 02 0182, dated Aug. 14, 2009, 6 pages.

European Search Report from corresponding European application No. 10000780.6, dated Jul. 16, 2010, 8pp.

Verma, Kunal and Kass, Alex, Requirements Analysis Tool: A Tool for Automatically Analyzing Software Requirements Documents, Accenture Technology Labs, San Jose, CA, 2008, 13pp.

Prateek Jain, Kunal Verma, Alex Kass, Reymonrod G. Vasquez, "Automated review of natural language requirements documents: generating useful warnings with user-extensible glossaries driving a simple state machine," Proceeding of the 2nd Annual Conference on India Software Engineering Conference, Feb. 23, 26, 2009, pp. 37-46, XP002539469, Pune, India.

Anderson, T., de Lemos, R., Fitzgerald, J.S. and Saeed, A., "On Formal Support for Industrial-Scale Requirements Analysis," Workshop on Theory of Hybrid Systems, Springer-Verlag Lecture Notes in Computer Science vol. 736, 1993, pp. 426-451, ISSN: 3-540-57318-6.

Yoo, J., Kim, T., Lee, J., and Son, H.S. "A Formal Software Requirements Specification Method for Digital Nuclear Plant Protection Systems," J. Syst. Soft 74, 1, Jan. 2005, pp. 73-83. DOI=http://dx.doi/org/10.1016/j.jss.2003.10.18, 11pp.

Young, R.R. 2000 Effective Requirements Practices, Addison-Wesley Longman Publishing Co., Inc. 2001, 387pp.

IEEE Recommended Practice for Software Requirement Specifications, IEEE/ANSI Standard 830-1998, Institute of Electrical and Electronics Engineers, 1998, 39pp.

YACC, URL: available at http://dinosaur.compilertools.net/yaac, last retrieved Apr. 29, 2010, 24pp.

ANTLR, URL: available at http/www.antir.org, last retrieved on May 18, 2010, 2pp.

Alani, H. et al., "Automatic Ontology-Based Knowledge Extraction from Web Documents," IEEE Intelligent Systems, 2003, pp. 14-21.

Baral, C. et al., "Using AnsProlog with Link Grammar and Word Net for QA with deep reasoning," 9th International Conference on Information Technology, IEEE Computer Society, 2006, 4 pages.

Basili, V. R. et al., "Comparing the Effectiveness of Software Testing Strategies," IEEE Transactions on Software Engineering, vol. SE-13, No. 12, 1987, pp. 1278-1296.

Biswal, B. N. et al., "A Novel Approach for Scenario-Based Test Case Generation," International Conference on Technology, IEEE Computer Society, 2008, pp. 244-247.

Dahab, M. Y. et al., "TextOntoEx: Automatic ontology construction from natural English text," Expert Systems with Applications, vol. 34, 2008, pp. 1474-1480.

Daneva, M., "ERP Requirements Engineering Practice: Lessons Learned," IEEE Software, 2004. pp. 26-33.

Daneva, M., "Establishing Reuse Measurement Practices in SAP Requirements Engineering," IEEE, 2000, 10 pages.

de Marneffe, M-C. et al., "Stanford typed dependencies manual," Sep. 2008 (Revised for Stanford Parser v. 1.6.2, 2010), 20 pages.

Deeptimahanti, D. K. et al., "An Automated Tool for Generating UML Models from Natural Language Requirements," IEEE/ACM International Conference on Automated Software Engineering, IEEE Computer Society, 2009, pp. 680-682.

Deeptimahanti, D. K. et al., "Semi-automatic Generation of UML Models from Natural Language Requirements," India Software Engineering Conference, 2011, pp. 165-174.

Dickinson, I., "Jena Ontology API," 2009, printed from the internet at <http://jena.sourceforge.net/ontology/> on Feb. 21, 2012, 29 pages.

Egyed, A., "Scalable Consistency Checking between Diagrams—The ViewIntegra Approach," Proceedings of the 16th IEEE International Conference on Automated Software Engineering, USA: San Diego, 2001, 4 pages.

Gervasi, V. et al., "Reasoning About Inconsistencies in Natural Lanuguage Requirements," ACM Transactions on Software Engineering and Methodology, vol. 14, No. 3, 2005, pp. 277-330.

Hayes, J. H. et al., "Advancing Candidate Link Generation for Requirements Tracing: The Study of Methods," IEEE Transactions on Software Engineering, vol. 32, No. 1, 2006, pp. 4-19.

"IEEE Standard for Software and System Test Documentation," IEEE Standard 829-2008, IEEE Computer Society, 2008, 132 pages.

Ilieva, M. G. et al., "Automatic Transition of Natural Language Software Requirements Specification into Formal Presentation," Natural Language and Processing Information Systems, Lecture Notes in Computer Science, vol. 3513, copyright Springer-Verlag, 2005, pp. 392-397.

Jirapanthong, W. et al., "XTraQue: traceability for product line systems," Software and Systems Modeling, vol. 8, 2009, pp. 117-144.

Kof, L., et al., "Faster from Requirements Documents to System Models: Interactive Semi-Automatic Translation with a tool that is learning on the fly," Requirements Engineering Efficiency Workshop, 17th International Working Conference on Requirements Engineering: Foundation for Software Quality, 2011, 41 pages.

Kosindrdecha, N. et al., "A Test Generation Method Based on State Diagram," Journal of Theoretical and Applied Information Technology, 2010, pp. 28-44.

Li, L. et al., "A Software Framework for Matchmaking Based on Semantic Web Technology," in WWW, 2003, pp. 331-339.

Li, Y. et al., "Sentence Similarity Based on Semantic Nets and Corpus Statistics," IEEE Transactions on Knowledge and Data Engineering, vol. 18, No. 8, 2006, pp. 1138-1150.

Litvak, B. et al., "Behavioral Consistency Validation of UML Diagrams," Proceedings of the First International Conference on Software Engineering and Formal Methods, IEEE Computer Society, 2003, 8 pages.

Marcus, M. P. et al., "Building a Large Annotated Corpus of English: the Penn Treebank," Computational Linguistics, 1993, 22 pages.

Mihalcea, R. et al., "Corpus-based and Knowledge-based Measures of Text Semantic Similarity," in American Associate for Artificial Intelligence, 2006, 6 pages.

Miller, G. A., "Wordnet: A Lexical Database for English," Communications of the ACM, vol. 38, No. 11, 1995, pp. 39-41.

Nanduri, S. et al., "Requirements Validation via Automated Natural Language Parsing," Proceedings of the 28th Annual Hawaii International Conference on System Sciences, IEEE, 1995, pp. 362-368.

Nebut, C. et al., "Automatic Test Generation: A Use Case Driven Approach," IEEE Transactions on Software Engineering, vol. 32, No. 3, 2006, pp. 140-155.

Neill, C. J. et al., "Requirements Engineering: The State of the Practice," IEEE Software, IEEE Computer Society, vol. 20, No. 6, 2003, pp. 40-45.

Phyu, A. L. L. et al., "Domain Adaptive Information Extraction Using Link Grammar and WordNet," Fifth International Conference on Creating, Connecting, and Collaborating through Computing, IEEE Computer Society, 2007, 7 pages.

Porter, M. F., "An Algorithm for Suffix Stripping," Program, vol. 14, No. 3, 1980, pp. 130-137.

RosettaNet website, 2012, printed from the internet at <http://www.rosettanet.org/> on Feb. 21, 2012, 2 pages.

Ryan, K., "The Role of Natural Language in Requirements Engineering," IEEE, 1992, pp. 240-242.

Sharma, V. S. et al., "Extracting High-Level Functional Design from Software Requirements," 16th Asia-Pacific Software Engineering Conference, IEEE Computer Society, 2009, pp. 35-42.

Sinha, A. et al., "Text2Test: Automated Inspection of Natural Language Use Cases," 2010 Third International Conference on Software Testing, Verification and Validation, IEEE Computer Society, 2010, pp. 155-162.

Sleator, D. D. et al., "Parsing English with a Link Grammar," CMU Technical Report, 1991, 93 pages.

Sleator, D. D. et al., "Parsing English with a Link Grammar," In Third International Workshop on Parsing Technologies, 1993, 14 pages.

Sleator, D., "Link Grammar License," 2005, printed from the internet at <http://www.link.cs.cmu.edu/link/license.html> on Feb. 21, 2012, 1 page.

Sleator, D., "Summary of Link Types," 1998, 7 pages.

Sneed, H. M., "Testing Against Natural Language Requirements," Seventh International Conference on Quality Software, IEEE Computer Society, 2007, 8 pages.

Soffer, P. et al., "Modelling Off-the-Shelf Information Systems Requirements: An Ontological Approach," Requirements Engineering, vol. 6, 2001, pp. 183-199.

Sutton, S. M. et al., "Text2Test: Automated Inspection of Natural Language Use Cases," IBM Search Report, Computer Science, 2009, 11 pages.

"The Phrase Parser," printed from the internet at <http://www.abisource.com/projects/link-grammar/dict/ph-explanation.html> on Feb. 21, 2012, 8 pages.

"The Stanford Parser: A statistical parser," The Stanford Natural Language Processing Group, printed from the internet at <http://nlp.stanford.edu/software/lex-parser.shtml> on Feb. 21, 2012, 6 pages.

"WebSphere Industry Content Packs accelerate Insurance, Banking, Telecom, Healthcare & Industrial PLM WebSphere BPM solutions," IBM Software, printed from the internet at <http://www-142.ibm.com/software/products/gb/en/inducontpack/> on Feb. 21, 2012, 5 pages.

Zachos, K. et al., "Inventing Requirements from Software: An Empirical Investigation with Web Services," in 16th IEEE International Requirements Engineering Conference, IEEE Computer Society, 2008, pp. 145-154.

Zamin, N., "Information Extraction using Link Grammar," 2009 World Congress on Computer Science and Information Engineering, IEEE Computer Society, 2008, pp. 149-153.

Anandha Mala, G.S. et al., "Automatic Construction of Object-Oriented Design Models [UML Diagrams] from Natural Language Requirements Specification," PRICAI, 2006, pp. 1155-1159.

Apache OpenNLP, The Apache Software Foundation, 2010, printed from the internet at <http://incubator.apache.org.opennlp/index.html> on Aug. 22, 2011, 2 pages.

Appfuse, 2008, printed from the internet at <http://appfuse.org/display/APF/Home> on Aug. 16, 2011, 2 pages.

Baader, F. et al., "Description Logics," Reasoning Web. Semantic Technologies for Information Systems, 2009, 40 pages.

Baader, F. et al., Chapter 3, Description Logics, Elsevier, 2007, 47 pages.

Basler, M. et al., "Introducing the Java Pet Store 2.0 Application," 2007, printed from the internet at <http://java.sun.com/jsp.utils/PrintPage.jsp?url=http%3A%2F%2Fjava.sun.com%2Fdevelo . . . > on Aug. 17, 2011, 10 pages.

Boddu, R. et al., "RETNA: From Requirements to Testing in a Natural Way," Proceedings of the 12th IEEE International Requirements Engineering Conference, 2004, 10 pages.

Boehm, B. W., "Understanding and Controlling Software Costs," IEEE Transactions on Software Engineering, vol. 14, No. 10, 1988, pp. 1462-1477.

Boehm, B. et al., "Identifying Quality-Requirement Conflicts," IEEE Software, vol. 13, No. 2, IEEE Computer Society Press, Los Alamitos, 1996, pp. 25-35.

Borland Software Corporation, "Mitigating Risk with Effective Requirements Engineering," Apr. 2005, 14 pages.

Brandozzi, M. et al., "Transforming Goal Oriented Requirement Specifications into Architecture Prescriptions," Proceedings STRAW '01, ICSE 2001, 8 pages.

Crain, A., "The Simple Artifacts of Analysis and Design," IBM Software Group, 2004, printed from the internet at <http://www.ibm.com/developerworks/rational/library/4871.html> on Aug. 18, 2011, 7 pages.

Cunning, S. J. et al., "Test Scenario Generation from a Structured Requirements Specification," IEEE Conference and Workshop on Engineering of Computer-Based Systems, ecbs, 1999, 7 pages.

Curtis, Dr. B., Best Practices for Requirements Development and Management, Borland Software Corporation, 2005, 36 pages.

Dashofy, E. M. et al., "A Comprehensive Approach for the Development of Modular Software Architecture Description Languages," ACM Transactions on Software Engineering and Methodology, vol. 14, No. 2, 2005, pp. 199-245.

de Marneffe, M-C. et al., "Generating Typed Dependency Parses from Phrase Structure Parses," LRCE, 2006, 6 pages.

Duan, M., "Ravenflow Seeks to Eliminate Software Ambiguity, Errors," Silicon Valley / San Joes Business Journal, Nov. 17, 2006, 2 pages.

Extended European Search Report dated Nov. 4, 2009 for EP Application No. 08020182.5, 9 pages.

Extended European Search Report dated Apr. 20, 2011 for EP Application No. 11001270.5-1238, 6 pages.

Fabbrini, F. et al., "The Linguistic Approach to the Natural Language Requirements Quality: Benefit of the use of an Automatic Tool," SEW '01 Proceedings of the 26th Annual NASA Goddard Software Engineering Workshop, 2001, 9 pages.

Fantechi, A. et al., "A Content Analysis Technique for Inconsistency Detection in Software Requirements Documents," WER, 2005, pp. 245-256.

Glass, R. L., *Facts and Fallacies of Software Engineering*, Addison Wesley, copyright 2003, 150 pages.

Gnesi, S. et al., "An Automatic Tool for the Analysis of Natural Language Requirements," Comput. Syst. Sci. Eng., 2005, 13 pages.

Grunbacher, P. et al., "Reconciling Software Requirements and Architectures: The CBSP Approach," Proceedings of the 5th IEEE International Symposium on Requirements Engineering, Toronto, Canada, 2001, 10 pages.

Hall, J. G. et al., "Relating Software Requirements and Architectures using Problem Frames," Proceedings of the IEEE Joint International Conference on Requirements Engineering (RE '02), 2002, 8 pages.

Hooks, I. F., "Managing Requirements," Crosstalk, The Journal of Defense Software Engineering, vol. 17, No. 8, Aug. 2004, 8 pages.

IBM DeveloperWorks: Rational Software Architect, printed from the internet at <http://www.ibm.com/developerworks/rational/products/rsa/> on Aug. 18, 2011, 2 pages.

IEEE Recommended Practice for Architectural Description of Software-Intensive Systems, The Institute of Electrical and Electronics Engineering, Inc., 2000, 29 pages.

IEEE Standard Glossary of Software Engineering Terminology, IEEE Std. 610.12-1990, Standards Coordinating Committee of the Computer Society of the IEEE, New York, Sep. 1990, 84 pages.

"Information Technology—Open Distributed Processing—Reference model: Architecture," International Standard, ISO/IEC 10746-3, 1st Ed. 1996, 68 pages.

"Information technology—Open Distributed Processing—Reference model: Foundations" ISO/IEC 10746-2, 1st Ed., 1996, 28 pages.

Jena—A Semantic Web Framework for Java, printed from the internet at <http://jena.sourceforge.net>, last retrieved on Oct. 10, 2008, 1 page.

Keshav, R. et al., "Towards a Taxonomy of Architecture Integration Strategies," the 3rd International Software Architecture Workshop, 1998, 4 pages.

Kruchten, P., "An Ontology of Architectural Design Decisions in Software-Intensive Systems," 2004, 8 pages.

Kruchten, P., "Architectural Blueprints—The "4+1" View Model of Software Architecture," IEEE Software, vol. 12, No. 6, 1995, 15 pages.

Lami, G. et al., "An Automatic Tool for the Analysis of Natural Langauge Requirements," published as Technical Report 2004-TR-40, Consiglio Nazionale delle Ricerche, Instituto di Scienza e Tecnologie dell'Informazione 'A.Faedo', 2004, 21 pages.

Lami, G., "QuARS: A Tool for Analyzing Requirements," Software Engineering Measurement and Analysis Initiative, Technical Report, 2005, 44 pages.

Lau, K-K. et al., "A Taxonomy of Software Component Models," Proceedings of the 2005 31st EUROMICRO Conference on Software Engineering and Advanced Applications, IEEE, 2005, 8 pages.

Lin, D., "Dependency-Based Evaluation of MINIPAR," Text, Speech, and Language Technology 1, vol. 20, Treebanks, Part II, 2003 pp. 317-329.

Lin, D., "An Information-Theoretic Definition of Similarity," Proceedings of the 15th International Conference on Machine Learning 1, 1998, pp. 296-304.

Liu, D. et al., "Natural Language Requirements Analysis and Class Model Generation Using UCDA," IEA/AIE, Springer-Verlag, 2004, pp. 295-304.

Luisa, M. et al., "Market Research for Requirements Analysis Using Linguistic Tools," Requirements Engineering, vol. 9, No. 1, 2002, 26 pages.

Luo, L., "Software Testing Techniques: Technology Maturation and Research Strategy," Class Report for 17-939A, Institute for Software Research International, Carnegie Mellon University, 2009, 20 pages.

Maiden, N. A. et al., "Acquiring COTS Software Selection Requirements," IEEE Software, 1998, pp. 46-56.

Mattsson, A. et al., "Modelling Architectural Design Rules in UML," Proceedings of EMMSAD, 2008, pp. 71-79.

Medvidovic, N. et al., "A Classification and Comparison Framework for Software Architecture Description Languages," IEEE Transactions on Software Engineering, vol. 26, No. 1, 2000, pp. 70-93.

Mehta, N. R. et al., "Towards a Taxonomy of Software Connectors," In Proceedings of the 22nd International Conference on Software Engineering, 2000, pp. 178-187.

"Modeling," Software Development Times, Jun. 1, 2007, 2 pages.

Morisio, M. et al., "Definition and Classification of COTS: A Proposal," ICCBSS, Orlando, FL, 2002, 10 pages.

Offutt, J. et al., "Generating Tests from UML Specifications," U.S. National Science Foundation under grant CCR-98-04111 and Rockwell Collins, Inc., Robert Franc and Bernhard Rurape (Eds.), '99, LNCS 1723, 1999, pp. 416-429.

OWL Web Ontology Language Overview, W3C, available from http://www.w3.org/TR/owl-features/, last retrieved on Oct. 10, 2008, 13 pages.

Paolucci, M. et al., "Semantic Matching of Web Services Capabilities," International Semantic Web Conference (ISWC), Sandinia, Italy, Jun. 9-12, 2002, pp. 333-347.

Pyysalo, S. et al., "Analysis of Link Grammar on Biomedical Dependency Corpus Targeted at Protein-Protein Interactions," JNLPBA '04 Proceedings of the International Joint Workshop on Natural Language Processing in Biomedicine and its Applications, 2004, pp. 15-21.

Raven Professional Includes Five New Modules, Computer Magazine, Nov. 2006, p. 85.

Raven Software, URL: available at www.ravensoft.com last retrieved Aug. 26, 2010, 1 page.

Ravenflow website, 2005-2006, http://www.ravenflow.com, last accessed on Jan. 30, 2008, 71 pages.

Rech, J. et al., "Intelligent Assistance in German Software Development: A Survey," IEEE Software, vol. 24, No. 4, 2007, 9 pages.

Robinson, W. N. et al., "Requirements Interaction Management," ACM Computing Surveys, vol. 35, No. 2, Jun. 2003, pp. 1-59.

Robinson, W. N. et al., "Requirements Interaction Management," Georgia State University, Department of Computer Information Systems Working Paper 99-7, Aug. 30, 1999, 68 pages.

Rubinstein, D., "Quoth the Ravenflow: Drag-and_Drop Nevermor: Requirments Suite Generates UML Diagrams from Plain Text," Software Development Times, Mar. 15, 2006, Issue No. 146, 1 page.

Schindler, E., "Learning to Speak 'User'," Digital Producer Magazine, Mar. 2006, 2 pages.

Schmerl, B. et al., "AcmeStudio: Supporting Style-Centered Architecture Development," In Proc. 2004 International Conference on Software Engineering, Edinburgh, Scotland, 2004, 2 pages.

Schmidt, D., "Model-Driven Engineering," IEEE Computer Society, 2006, pp. 25-31.

Selic, B. "The Pragmatics of Model-Driven Development," IEEE Software, 2003, pp. 19-25.

Shahin, M. et al., "Improving Understandability of Architecture Design through Visualization of Architectural Design Decision," SHARK '10, ACM, 2010, 8 pages.

Skyway Software, printed from the internet at <http://www.skywaysoftware.com/> on Aug. 22, 2011, 3 pages.

Statement in Accordance with the Notice from the European Patent Office dated Oct. 1, 2007 Concerning Business Methods, sent with Extended European Search Report, Nov. 2007, 2 pages.

The Declaration of Independence: Six Principles to Benefit You and Your Agile Organization, Better Software, www.StickMinds.com, Jun. 2006, pp. 24 and 36.

The Protege Ontology Editor and Knowledge Acquisition System, printed from the internet at <http://protege.stanford.edu/> on Aug. 16, 2011, 2 pages.

Tolvanen, J-P. et al., "Defining Domain-Specific Modeling Languages to Automate Product Derivation: Collected Experiences," SPLC 2005, pp. 198-209.

van Lamsweerde, A. et al., "Managing Conflicts in Goal-Driven Requirements Engineering," IEEE Transactions on Software Engineering, Special Issue on Managing Inconsistency in Software Development, Nov. 1998, pp. 1-21.

Wiegers, K. E., Software Requirements, Chapters 1-13, Microsoft Press, Redmond, 2003, 262 pages.

Wiegers, K. E., Software Requirements, Chapters 14-Appendix D, Microsoft Press, Redmond, 2003, 278 pages.

Wilson, W. M. et al., "Automatic Quality Analysis of Natural Language Requirement Specification," NASA, The Goddard Space Flight Center's Software Assurance Technology Center, http://satc.gsfc.nasa.gov/support/PNSQC-_OCT96/phq.html, dated Oct. 1996, pp. 1-19.

Zimmermann, O. et al., "Managing Architectural Decision Models with Dependency Relations, Integrity Constraints, and Production Rules," Journal of Systems and Software, vol. 82, No. 8, Aug. 2009, 36 pages.

\* cited by examiner

Agent Glossary 140

| Agent Descriptor 202 | Explanation 204 | Parent 206 | Additional Notes 208 |
|---|---|---|---|
| Cafeteria Staff | The Process Impact cafeteria currently employs about 20 Cafeteria Staff, who will receive orders from the Cafeteria Ordering System, prepare meals, package them for delivery, print delivery instructions, and request delivery. Most of the Cafeteria Staff will need to be trained in the use of the computer, the Web browser, and the Cafeteria Ordering Sytem. | | |
| Customer stakeholders | | | |
| Database administrator | | | |
| Developers | | Development team | |
| Development team | The entire team responsible for developing the system. | | |
| Downstream technical stakeholders | The team that will be responsible over time for deploying, managing, and maintaining the system. | | |

Figure 2

Mode Glossary _144_

| Mode | Explanation | Additional Notes |
|---|---|---|
| Will | | |
| Shall | | |
| Must | | |
| May | | |
| Can | | |
| Needs to | | |
| No mode found | | |

Figure 3

| 402 | 404 | 406 | 408 142 |
|---|---|---|---|
| | Action Glossary | | |
| Action | Explanation | Parent Action | Additional Notes |
| Recognize | | | |
| Color | | | |
| Maintain | | | |
| Underline | | | |
| Allow | | | |
| Identify | | | |
| Define | | | |
| Reduce | | | |
| Improve | | | |
| Create | | | |
| Support | | | |
| Outline | | | |
| Help | | | |
| Send | | | |
| Be | | | |
| Tag | | | |
| Show | | | |
| Store | | | |
| Email | Send | | |
| No action found | | | |

Figure 4

| Problem Phrase 502 | Explanation 504 | Phrase Glossary Suggestion 506 | Priority 508 | Additional Notes 510 146 |
|---|---|---|---|---|
| could | is ambiguous, or inappropriate. Use 'shall' for requirements, 'will' for assumptions. | | 1 | |
| easy<br>easily<br>easy to use<br>user friendly | is often ambiguous; consider replacing with a specific description of the expected user profile, and expected time to competence or completion. | A user with <specify background> will be able to <specify function> with <specify effort><br><br>The system will reduce the effort required to <specify function> by x%<br><br>The system will require no more than <specify duration> time for a <specify user profile> to learn to use. | 1 | |
| efficiently | is ambiguous. Define quantitatively how efficient it is. | | 1 | |
| flexible | is a relative term. Make the forms of flexibility supported clear. | | 1 | |
| improved<br>better<br>faster<br>superior | is underspecified, unless it specifies how much faster, improved, better, or superior. | | 2 | |
| may | is ambiguous, or inappropriate. | | 1 | |

| Agent | Requirements |
|---|---|
| Release #1 | B01.1: Release #1 will reduce requirements-related defects by 20%. Release #1 will reduce requirements-related defects by 20%. |
| Release #2 | B01.2: Release #2 will reduce requirement-related defects by an additional 10%. B01.2: Release #2 will reduce requirement-related defects by an additional 10%. |
| Release #3 | B01.3: Release #3 will reduce requirement-related defects by an additional 10%. B01.3: Release #3 will reduce requirement-related defects by an additional 10%. |
| Release #3 | B01: The requirements initiative will reduce the cost of requirements-related defects by an average of 40%. B02: The requirements initiative will reduce time to complete requirements definition tasks by an average of 25% |

Figure 14

Relationship Glossary 2102

| Class 2104 | Parent Class 2106 | Keywords 2108 | Relationships 2110 |
|---|---|---|---|
| Security | ReqType | | Affects: Time |
| Authentication | Security | Password, token, authentication, Kerberos | |
| Encryption | Security | Encrypt, SSH, RSA, DSA | |
| Time | ReqType | | |
| Query Time | Time | Query time, querytime | |
| Response Time | Time | Response, respond | |

Figure 21

| 2504 | 2506 | 2508 Entity Glossary | 2510 | 2512 2502 |
|---|---|---|---|---|
| Phrase | Explanation | Additional Notes | Type | Part-Of |
| Order Processing System | | | System ▶ | |
| order portal | | | System ▶ | |
| billing module | | | System ▶ | Order Processing System |
| finance department user | | | Person ▶ | |
| administrator | | | Person ▶ | |
| shipping module | | | System ▶ | Order Processing System |
| order details | | | GenericEntity ▶ | |

Figure 25

| 2604 | 2606 | 2608 Problematic Phrase Glossary | 2610 | 2612 2602 |
|---|---|---|---|---|
| Phrase | Explanation | Suggestion | Template | Category |
| easy to use | To correct this requirement, follow one of the suggestions in the checker to write a more testable requirement. | "easy to use" is often ambiguous. Replace with a specific description of the expected result. | | |
| none | To correct this requirement, follow one of the suggestions in the checker to write a more testable requirement. | "none" implies unproven certainty. Replace with a specific condition. | | |
| efficiently | To correct this requirement, follow one of the suggestions in the checker to write a more testable requirement. | "efficiently" is often ambiguous. Define quantitatively how efficient it is. | | |
| improved better faster superior | To correct this requirement, follow one of the suggestions in the checker to write a more testable requirement. | is underspecified, unless it specifies how much faster, improved, better, or superior. | | |

Figure 26

| 2704 | 2706 | 2708 Non-Functional Attribute Glossary | 2710 | 2712 | 2714 | 2702 |
|---|---|---|---|---|---|---|
| Area | Attribute | Notes | Sample | Indicator Phrase | | Enable 2716 ☑ |
| Non-Functional | Delivery Channels | | | | | ☑ |
| Delivery Channels | Delivery Channels | List of delivery channels | Auto-12: The system must be accessible via all traditional browsers | Delivery channels, delivery channel, browser, browsers, Internet Explorer, ... | | ☑ |
| Delivery Channels | Connectivity Requirement | Connectivity requirements (e.g., Internet, dial-up, leased line) | Req1: Broadband Internet connection is needed for proper functioning of the system. | Dial-up, dial, boradband, dsl, internet, web, intranet, leased line, ... | | ☑ |
| Non-Functional | CapacityVolumetrics | Annual growth rate should be indicated for each attribute as appropriate. | | | | ☑ |
| CapacityVolumetrics | Locations | List of user/actor locations and processing locations | Req1: The users of the system shall be located in the US.<br>Req2: The system shall be located in Chicago. | User located, user location, processing location, location, locations, ... | | ☑ |
| CapacityVolumetrics | Number Of Users | Broken down by user/actor type, by channel, by location | Auto-2: The system must be able to handle over 1000 concurrent internal users. | User count, users, average, max, maximum, over, peak, total | | ☑ |

Figure 27

| | System\Person | Resource Manager 3918 | Project Lead 3920 |
|---|---|---|---|
| 1 | | | |
| 2 | Project Resource Management System 3906 | SC-03: The Project Resource Management System shall allow a Resource Manger to assign roll on, roll-off dates to employee project assignment.<br><br>SC-01: The Project Resource Management System shall allow a Resource Manager to assign an Employee to projects.<br><br>SC-02: The Project Resource Management System shall allow a Resource Manager to assign an Employee to a Project Lead. 3922 | SC-03: The Project Resource Management System shall allow a Resource Manger to assign roll on, roll-off dates to employee project assignment.<br><br>SC-01: The Project Resource Management System shall allow a Resource Manager to assign an Employee to projects.<br><br>SC-02: The Project Resource Management System shall allow a Resource Manager to assign an Employee to a Project Lead. |
| 3 | Reporting Module 3908 | DT-05.9: The Reporting Module must issue an email to the Resource Manager 14 days before the scheduled end-date for an employee's project assignment.<br><br>DT-05.1: The Reporting Module shall allow Resource Manager to request batch report jobs.<br><br>DT-05.8: The Reporting Module shall send email project record status report to the Resource Manager at the end of each pay period. 3924 | DT-05.3: The Reporting Module shall give Read access to the project lead. |
| 4 | Project Module 3910 | | |
| 5 | Assign Resource Module 3912 | | DT-01.8: The Assign Resource Module shall add a project lead to the assignment record based on the project. |
| 6 | Maintain Project Module 3914 | | |
| 7 | Backup Master Employee Repository 3916 | | NFR7: The Backup Master Employee Repository shall Maintain Project Module to add project lead from the Master Employee Repository. |

Figure 39

| | System\System | 4404 Project Resource Management System | Reporting Module | Project Module | Assign Resou |
|---|---|---|---|---|---|
| 1 | | | | 4430 | 4432 |
| 2 | Project Resource Management System | | | | |
| 3 | Reporting Module | | 4434 | | |
| 4 | Project Module | | | | |
| 5 | Assign Resource Module | | 4436 | | |
| 6 | Maintain Project Module | | | | |
| 7 | Master Project Repository | | | | |
| 8 | Project Role Repository | | | | |
| 9 | E-Verify System | | | | |
| 10 | Backup Master Employee | | | | |
| 11 | Credit Check System | | | | |
| 12 | Master Employee Repository | | | | |
| 13 | | | | | |
| 14 | | | | | |

Figure 44

| | System\Person | Project Manager | Employee | Resource Manager | Administrator | Client |
|---|---|---|---|---|---|---|
| 1 | | 4506 | 4528 | 4530 | 4532 | 4534 |
| 2 | Project Resource Management System | | | | | |
| 3 | Reporting Module | | | 4536 | | |
| 4 | Project Module | | | | | |
| 5 | Assign Resource Module | | | 4538 | | |
| 6 | Maintain Project Module | | | | | |
| 7 | Master Project Repository | | | | | |
| 8 | Project Role Repository | | | | | |
| 9 | E-Verify System | | | | | |
| 10 | Backup Master Employee | | | | | |
| 11 | Credit Check System | | | | | |
| 12 | Master Employee Repository | | | | | |
| 13 | | | | | | |
| 14 | | | | | | |

Figure 45

| | System\System | Project Resource Management System | Reporting Module | Project Mo |
|---|---|---|---|---|
| 1 | | | | |
| 2 | Project Resource Management System | | UC 1-4: Project resource management system sends data to reporting module 4604 | |
| 3 | Reporting Module | | | |
| 4 | Project Module | | | |
| 5 | Assign Resource Module | | | |
| 6 | Maintain Project Module | | | |
| 7 | Master Project Repository | | | |
| 8 | Project Role Repository | | | |
| 9 | E-Verify System | | | |
| 10 | Backup Master Employee | | | |
| 11 | Credit Check System | | | |
| 12 | Master Employee Repository | | | |

Figure 46

| | System\Person | Project Manager | Employee | Resource Manager |
|---|---|---|---|---|
| 1 | | | | |
| 2 | Project Resource Management System | UC-1-1: Project Manager navigates to add employee page in project resource management system _4704_ | UC-1-2: Project Manager navigates to add employee page in project resource management system<br><br>UC-1-3: Project resource management system assigns employee as unassigned. _4706_ | UC-1-5: Reporting n notification to resour |
| 3 | Reporting Module | | | |
| 4 | Project Module | | | |
| 5 | Assign Resource Module | | | |
| 6 | Maintain Project Module | | | |
| 7 | Master Project Repository | | | |

Figure 47

DOCUMENT ANALYSIS, COMMENTING, AND REPORTING SYSTEM

CROSS-REFERENCE TO RELATED APPLICATIONS

This application is a continuation-in-part of U.S. patent application Ser. No. 12/121,503, filed May 15, 2008, the entirety of which is incorporated by reference herein and U.S. patent application Ser. No. 11/945,958, filed Nov. 27, 2007, the entirety of which is incorporated by reference herein.

BACKGROUND OF THE INVENTION

1. Technical Field

This application relates to document analysis, and in particular, to visualizing the relationships between entities described in a requirements specification.

2. Related Art

Rapid developments in computer technology have given rise to the widespread adoption of document authoring applications. Today, a significant portion of the modern workforce generates documents using a word processor. Unfortunately, the writing skills of the typical individual have not improved at anywhere near the pace of technology. As a result, computer technology often results in faster generation of poorly written documents, rather than in efficient production of clear, consistent, and unambiguous work product.

At the same time, significant technical challenges exist in analyzing and providing constructive feedback on documents. The documents themselves vary widely in purpose, format, and content, and there is no general flexible and adaptable framework in place for specific document analysis, commenting, or reporting. Document authoring applications only provide basic tools that cooperate with authors to improve document quality. As examples, analysis tools such as spell checkers and grammar checkers only provide analysis at a general level, such as checks of the fundamental rules of a given language. In other words, the specialized nature of many documents defeats more specific analysis that could provide meaningful criticism on a document and vastly improve the substantive content of a document.

Poorly written documents have many adverse and costly consequences. Vague or ambiguous terms create misunderstandings and misinterpretations. Poor formatting frustrates testing and validation procedures. Failure to clearly separate concepts results in extra work needed to untangle and factor concepts into individual pieces. Contradictory statements, which often arise in lengthy, complex documents, create extra work to resolve the meaning and intended purpose of passages in the document. Inconsistent terms leave different readers with different, possibly inconsistent, expectations regarding specific parts of the document.

One specific application of the system described below is to analyze requirements documents. Requirements documents mediate between stakeholder objectives and the solution that developers will create to achieve the objectives. A successful requirements process is one that creates requirements documentation that captures stakeholder needs, sets stakeholder expectations, and may be used by developers to create a solution which satisfies the stakeholder's needs and expectations. Unsuccessful requirements processes result in requirements that do not ensure that stakeholders understand what they will be getting or that developers will build something that is ultimately going to satisfy the stakeholder's needs.

While creating a good, clear requirements document may sound straightforward, it is not. For large software systems it is extremely difficult to create good requirements documents. Furthermore, defects in the requirements process are very expensive. Incorrect, incomplete, or unclear requirements are the most common cause of software defects, and problems resulting from requirements defects are also the most expensive kinds of "bugs" to fix.

Some existing tools primarily concentrate on maintaining requirements and test scripts after a baseline requirements set has been defined. However, this is only part of the story. Many of the most costly requirements defects happen during the definition process, resulting in a baseline that is of poor quality, and prior tools are agnostic to the quality of the requirements or of the definition process and therefore provide no aid in that regard.

Moreover, many tools do not provide an overview of the interactions between entities of a requirements document. Thus, a reader is often left wondering whether one or more entities of a requirements document should be, or should not be, interacting. These tools do not account for the interactions that occur among entities of a requirements document, and a reader may be left with an impression that certain entities interact while other entities do not interact.

A need exists for improved document analysis tools that address the problems noted above and other previously experienced.

SUMMARY

In one implementation, the system includes a syntax-based document visualization module operative to identify constituents in document structure instances of an electronic document and determine whether the constituents in the document structure instances match constituents of an editable electronic spoken language glossary. The editable electronic spoken language glossary may include words or phrases that are considered permissible words and phrases for a previously defined document type specific syntax. The syntax-based document visualization module may be operative to generate one or more maps, such as a component visualization relationship map or a system visualization relationship map, that illustrate interactions and/or non-interactions between constituents of the document structure instances.

In addition, or alternatively, the system may include a syntax-based document attribute analysis module that operates in conjunction with an electronic attribute glossary. The electronic attribute glossary may specify one or more attribute requirements for one or more constituents of the editable electronic spoken language glossary. The syntax-based document attribute analysis module may determine whether one or more document structure instances of the electronic document satisfy the attribute requirements for one or more constituents. The syntax-based document attribute analysis may be further operative to generate and output an attribute requirement report that identifies whether an attribute requirement for one or more constituents has been satisfied.

In one implementation, the system may be a Visual Basic for Applications plug-in for the Word 2007® word processor. In that regard, the system may provide a specific ribbon interface. The system may be implemented in many other ways, however, such as a stand alone application, web service, or shared function library.

Other systems, methods, features and advantages will be, or will become, apparent to one with skill in the art upon examination of the following figures and detailed description.

All such additional systems, methods, features and advantages are included within this description, are within the scope of the invention, and are protected by the following claims.

BRIEF DESCRIPTION OF THE DRAWINGS

The system may be better understood with reference to the following drawings and description. The elements in the figures are not necessarily to scale, emphasis instead being placed upon illustrating the principles of the system. In the figures, like-referenced numerals designate corresponding parts throughout the different views.

FIG. 2 shows an example of an agent glossary.

FIG. 3 illustrates an example of a mode glossary.

FIG. 4 shows an example of an action glossary.

FIG. 5 illustrates an example of a problem phrase glossary.

FIG. 11 shows an analysis messages embedded in a document under analysis.

FIG. 14 shows an example report.

FIG. 21 shows an example of a requirements relationship glossary.

FIG. 25 shows an example of an entity glossary.

FIG. 26 shows an example of an alternative problematic phrase glossary.

FIG. 27 shows an example of a non-functional attribute glossary.

FIG. 39 shows yet another example of a component visualization relationship map.

FIG. 44 shows another example of a sub-system visualization relationship map.

FIG. 45 shows yet another example of a sub-system visualization relationship map.

FIG. 46 shows a further example of a sub-system visualization relationship map.

FIG. 47 shows an additional example of a sub-system visualization relationship map.

DETAILED DESCRIPTION OF THE PREFERRED EMBODIMENTS

Figure 1:
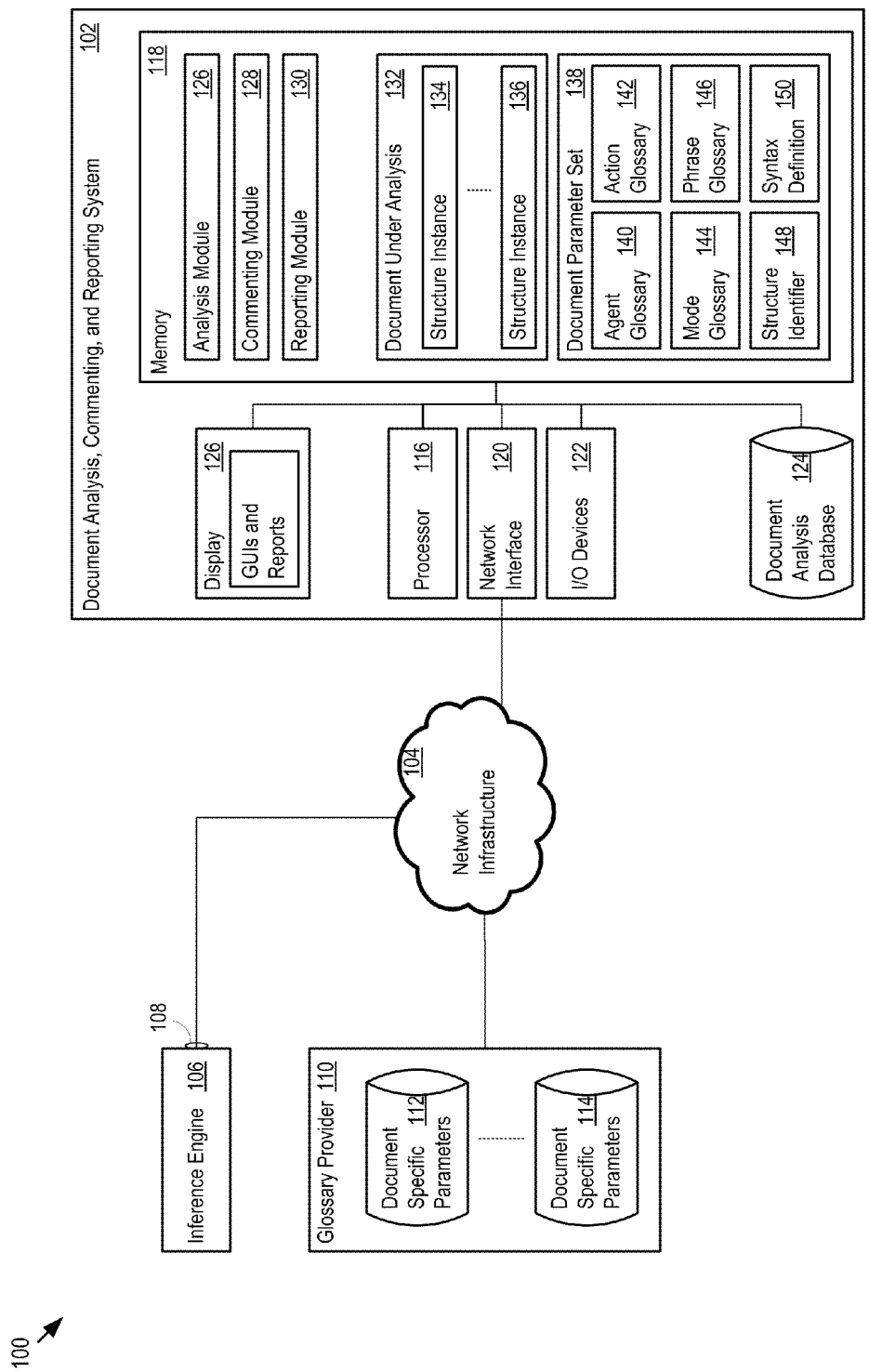
FIG. 1 shows a network including a document analysis system in communication with other systems.

FIG. 1 shows a network 100 including a document analysis, commenting, and reporting system 102 ("system 102"). The system 102 is connected to the network infrastructure 104. Through the network infrastructure 104, the system 102 may communicate with an inference engine 106, such as by a web services interface 108, and with other entities, such as the glossary provider 110. The system 100 may analyze a wide range of document types, with analysis tailored for the specific document type in question. In one implementation, the system 100 includes the document parameter sets that tailor analysis to any specific document type. However, in other implementations, the system 100 may receive new document parameter sets or update existing document parameters sets by coordinating with the glossary provider 110. To that end, the glossary provider 110 may maintain a database of many different document specific parameter sets, two of which are labeled 112 and 114.

The system 102 includes a processor 116, memory 118, network interface 120, I/O devices 122, and a document analysis database 124. The system 102 also includes a display 126 on which graphical user interfaces (GUIs) and analysis reports are rendered, as noted below. The document analysis database 124 may store document parameter sets that tailor the operation of the system 102 to any desired document type.

In the example shown in FIG. 1, the memory 118 includes an analysis module 126, a commenting module 128, and a reporting module 130. Each of the modules 126-130 is described in more detail below, and each module may be used alone or in combination with other modules to assess a document under analysis 132 ("document 132"). The document 132 may be any form of document, such as a word processor document, spreadsheet document, or text file. In addition, the document may be any specific type of document, such as a requirements specification, patent application, contract, building specification, or other document type.

As will be described in more detail below, the document 132 includes any number of document structure instances (e.g., the document structure instances 134 and 136). Each document structure instances represents a unit of content for analysis by the modules 126-130. As examples, a document structure instance may be a word, phrase, sentence, or paragraph. Other examples of document structure instances include arbitrary sequences of characters (e.g., serial numbers, email addresses, or encryption keys).

Yet another example of document structure instances are requirements statements. Requirements statements may take any number of forms, such as a requirement statement identifier, followed by a requirement sentence containing an actor, modal verb, action, and statement remainder. The discussion below uses examples of processing on requirements statements found in requirements documents. However, the system 102 may analyze any specific type of document, with any particular form of document structure instances.

The modules 126-130 analyze the document 132 in a manner tailored to the type of document. To that end, the modules 126-130 access a document specific parameter set which may be retrieved from the document analysis database 124, pre-configured in a word processor or other application, pre-defined as individual files stored in memory, or otherwise obtained or provided to the modules 126-130. FIG. 1 shows an example of a document specific parameter set 138. Any of the information in the document specific parameter set 138 may be made read-only, read-write, or have attached access control permissions for specific users or groups.

The document specific parameter set 138 may include one or more glossaries for analyzing a document. The glossaries may be spoken language glossaries, written language glossaries, language specific glossaries, document property glossaries, or other types of glossaries, which may store language components such as words, phrases, or other language constructs for analysis. Examples of spoken language glossaries include glossaries having words from the English language, words from the Russian language, words form the Japanese language, or words from Latin or non-Latin languages. Spoken language glossaries may also include words from multiple different spoken languages. Accordingly, the system may perform a multiple language analysis on a document that includes many languages without having to load or unload glossaries specific to each language and separately perform multiple processing passes.

Examples of written language glossaries include glossaries having words from the English language, words from the Russian language, or words from a Latin or non-Latin language. A written language glossary may have words depicted in print, script, cursive, or any other font. In other words, the written language glossary may include visual language indicia that the system may analyze to determine, for example, whether a language construct is vague or ambiguous. A written language glossary may also include words from one or more written languages, or from words contained in a spoken language glossary. Accordingly, the system may also perform multiple language analysis with written languages.

Examples of language specific glossaries include glossaries having words from computer programming languages, words made up of symbols or other non-alphanumeric characters, or components of any other non-written or non-spoken languages. Examples of document property glossaries include glossaries having words describing document properties, such as the margins of a document, the number of pages in a document, the permissible or non-permissible fonts in a document, or other document property. As a result, the system may extend its processing to document properties beyond language constructs, to help critique a document in other meaningful ways.

In one embodiment, the document parameter set 138 includes an agent glossary 140, an action glossary 142, a mode glossary 144, and a phrase glossary 146. The document specific parameter set 138 further includes a structure identifier 148 and a syntax definition 150. The structure identifier 148 may define a label that flags a portion of the document as a structure instance for analysis. The syntax definition 150 may define the expected syntax for the structure instance. In one implementation, the system 102 analyzes a received document to determine a document type, and then retrieves the document specific parameter set 138 corresponding to the determined document type. For example, the system 102 may retrieve the syntax definition 150, the structure identifier 148, the glossaries 140-146, or other document parameters corresponding to the determined document type. One example of a document type is a requirements document.

In the context of a requirements specification, the structure identifier 148 may be a regular expression, such as "[A-Za-z0-9]*[0-9]". The regular expression specifies that any combination of uppercase letters, lower case letters, and digits, followed by a digit, flags the following sentence as a requirement to analyze. An example syntax definition is: [agent] [mode] [action] [remainder]. The syntax definition specifies structure category components for the document structure. In this example, the structure category components include an agent, followed by a modal verb, followed by an action, followed by the rest of the sentence.

The agent glossary 140 defines the permissible agents. The mode glossary 144 defines the permissible modal verbs. The action glossary 142 defines the permissible actions. The system 102 may enforce the syntax, by performing processing only on those sentences that meet the syntax with agents, modes, and actions defined in the glossaries 140-144, or may perform processing on a sentence that partially or wholly meets the syntax. For example, even if an actor is missing or an unrecognized actor is present, the system 102 may still analyze the remainder for ambiguous terms.

FIG. 2 shows an example of the agent glossary 140. In the example shown in FIG. 2, the agent glossary 140 defines an agent field 202, an explanation field 204, a parent field 206, and a notes field 208. The agent field 202 defines permissible constituent agents for the structure instance syntax, such as "Developers" and "Development Team". The explanation field 204 provides diagnostic information relevant to the agent, how the agent performs their job, or other agent related information. The parent field 206 may be used to indicate a constituent hierarchy parameter for building hierarchies of agents, as will be described in more detail below. The additional notes field 208 provides a place where developers may insert information regarding a particular agent and its presence in the agent glossary 140. One of the uses of the agent glossary 140 is to check that the requirements document only specifies that certain actors perform actions.

FIG. 3 shows an example of the mode glossary 144. In the example shown in FIG. 3, the mode glossary 144 defines a mode field 302, an explanation field 304, and a notes field 306. The mode field 302 defines permissible constituent modes for the actions that an agent may take, such as "must", or "will", while the explanation field 304 provides diagnostic information related to the mode. The diagnostic information may expresses issues or concerns about certain modes, may recommend or encourage certain modes, or may provide other mode related information and feedback.

FIG. 4 shows an example of the action glossary 142. In the example shown in FIG. 4, the action glossary 142 defines an action field 402, an explanation field 404, a parent field 406, and a notes field 408. The action field 402 defines permissible constituent actions for the structure instance syntax, such as "Define" and "Tag". The explanation field 404 provides diagnostic information relevant to the action, how an agent performs the action, or other action related information. The parent field 406 may be used to build hierarchies of actions, as will be described in more detail below. The additional notes field 408 provides a place where developers may insert information regarding a particular action and its presence in the action glossary 142. The system 102 may use the action glossary 142 to check that the only certain actions are specified in a requirements document.

FIG. 5 shows an example of the phrase glossary 146. In the example shown in FIG. 5, the phrase glossary 146 defines a problem phrase field 502, an explanation field 504, a suggestion field 506, a priority field 508, and a notes field 510. The problem phrase field 502 defines words or combinations or words that often give rise to problematic statements. Such problem phrases may define ambiguous or inappropriate words, such as "could", or "improved", particularly in the context of the specific document type. The problem phrases may also include industry, domain, or technology phrases, such as "Windows Mobile" or "strong encryption." Thus, the document specific parameter sets tailor the analysis of the system 102 to the particular document type.

The explanation field 504 provides a description of why the problem phrase gives rise to difficulties. For example, the problem phrase "could" may be associated with the corresponding explanation of "is ambiguous". The phrase glossary 146 may also define suggestions in the suggestion field 506, explanation field 504, or both, for how to improve the problem phrase to a less problematic state. For example, the suggestion field 506 may suggest that "easy" should be replaced with specific language, such as "The system will reduce the effort required to <function> by x %." The document reviewer may then adopt the suggestion, complete the <function> field, and specify a value for 'x' to improve the statement.

The priority field 508 assigns a priority value to a problem phrase. The system 102 may then prioritize analysis and evaluation of problem phrases. As examples, the system 102 may determine which colors or patterns to use to highlight problem phrases according to the priority value. As another example, the system 102 may more strongly encourage the reviewer to modify the problem phrase, provide additional suggestions, or take other actions driven by the priority value. The additional notes field 510 provides a place where developers may insert information regarding a particular problem phrase and its presence in the phrase glossary 146.

Figure 6:
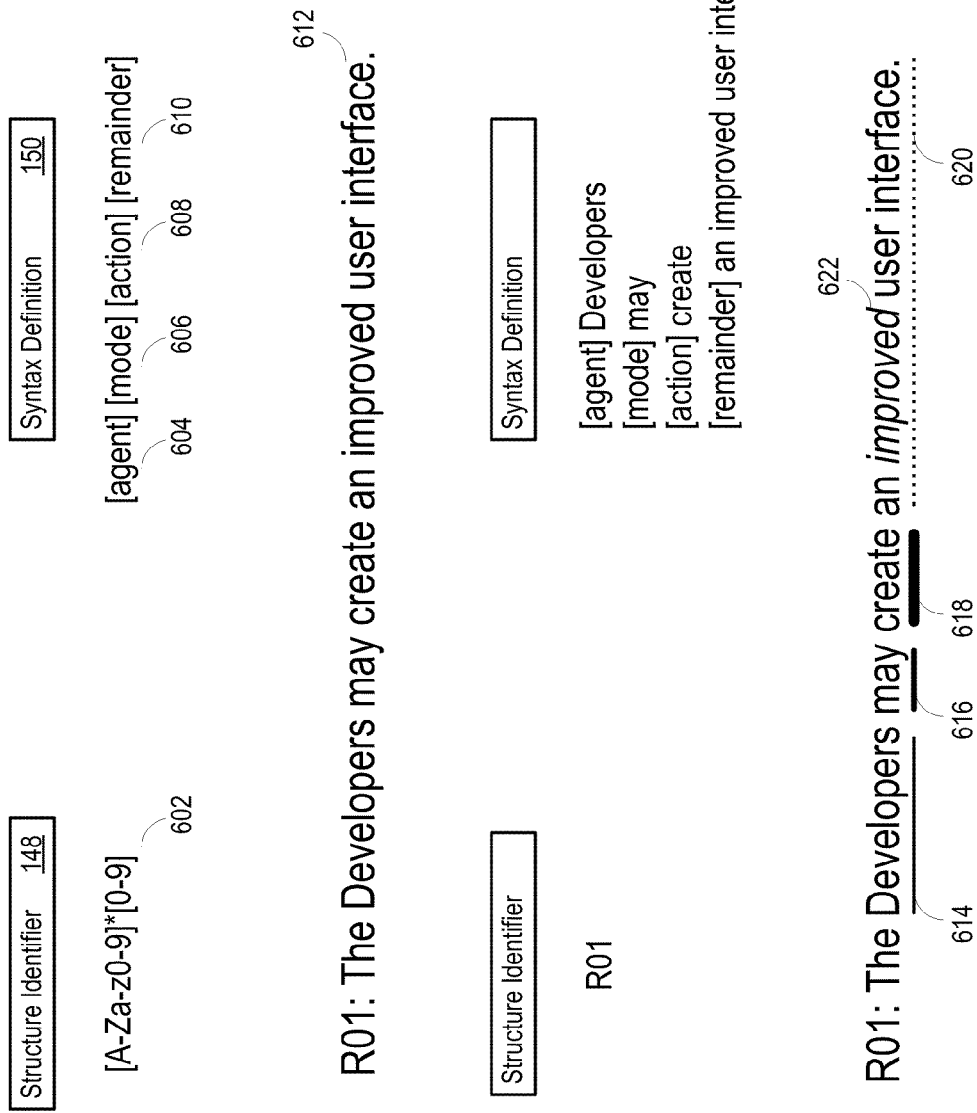
FIG. 6 shows an example of a structure identifier and a syntax definition.

FIG. 6 illustrates examples of a structure identifier 148 and a syntax definition 150 for a requirements specification. The structure identifier 148 is the regular expression "[A-Za-z0-9*0-9]" 602. The regular expression specifies that any combination of alphanumeric characters, followed by a digit, flags the following sentence as a requirement to analyze. The syntax definition 150 is: [agent] [mode] [action] [remainder]. The structure category components specified by the syntax definition are an agent component 604, followed by a modal verb component 606, followed by an action component 608, followed by a remainder component 610 of the rest of the sentence.

FIG. 6 also shows an example requirement 612: "R01: The Developers may create an improved user interface." found in the text of the document 132. The system 102 parses the document text, finding first the structure identifier "R01" that matches the structure identifier 148. According, the requirement sentence that follows is next checked against the syntax definition 150. In this instance, the syntax definition, supported by the glossaries 140-144, parse the sentence as follows: Agent=Developers, Mode=may, Action=create, and Remainder="an improved user interface."

The system 102 may carry out document analysis operations based on the analysis of the document structure instances. In the example shown in FIG. 6, the system 102 highlights each structure category component, using a thin line 614 for the agent, a medium line 616 for the modal verb, and a heavy line weight 618 for the action. The system 102 uses a dashed line 620 for the remainder.

In addition, the system 102 applies the phrase glossary 146 against the requirement sentence. As a result, the system 102 identifies the ambiguous term "improved" in the requirement sentence, and applies an italic highlight 622 to emphasize the presence of the problematic word. The system 102 may use any combination of any desired colors, line weights, line patterns, sounds, animations, icons, or other indicia to highlight any of the structure components, problem phrases, structure identifiers, or other parts of the document.

In addition to the syntax definition shown in FIG. 6, additional syntax definitions are also possible. For example, the syntax definition 150 may define conditional syntax definitions or feature syntax definitions. Table 1 below lists different examples of syntax definitions definable by the syntax definition 150.

TABLE 1

| Syntax Type | Syntax Definition Example | Structure Instance Example |
|---|---|---|
| Statement | [agent] [mode] [action] [remainder] | The order-processing system shall send a message to the procurement manager. The user shall click the button |
| Conditional | When [condition], [agent] [mode] [action] [remainder] | When the user clicks the button, the order-processing system shall send a message to the procurement manager. |
| Conditional: | If [condition] then [agent] [mode] [action] [rest] | If the user clicks the button, the order-processing system shall send a message to the procurement manager. |
| Feature | [system-agent] [mode] [remainder] | The order-entry interface shall have a 'cancel' button. |

In one implementation, the syntax definition 150 further defines syntax definitions according to a set of controlled document structure instance syntaxes. For example, the syntax definition 150 may define a document structure instance as a requirement document structure instance. The requirement document structure instance may then be defined as a conditional requirement document structure instance or as a simple requirement document structure instance. The set of controlled document structure instance syntaxes may also define additional syntaxes for the simple requirement document structure instance or the conditional requirement document structure instance. For example, the set of controlled document structure instance syntaxes may define the simple requirement document structure instance as a standard requirement document structure instance, as a business rule document structure instance, or as any other type of document structure instance. Table 2 illustrates one example of a set of controlled document structure syntaxes that may be defined according to the syntax definition 150. Other types of syntaxes may also be defined.

TABLE 2

| Syntax Type | Syntax Identifier | Syntax | Brief Explanation |
|---|---|---|---|
| Requirement | Req. | Req. -> ConditionalReq \| SimpleReq | A requirement may be a simple requirement or a conditional requirement. |

TABLE 2-continued

| Syntax Type | Syntax Identifier | Syntax | Brief Explanation |
|---|---|---|---|
| Conditional | ConditionalReq. | ["if"][condition]["then"] [SimpleReq]; or ["if"][condition]["then"] [SimpleReq]["else"] [SimpleReq]; or ["when"][condition] [SimpleReq] | A conditional requirement may be an "if-then", "if-then-else", or "when" kind of document structure instance. It may be either a functional requirement or business rule depending on the text of the document structure instance. |
| Standard | StandardReq | [Agent] [ModalWord] [Action] [Rest] | A standard requirement may be an agent followed by a modal word, followed by an action (verb), followed by the remainder of the document structure instance. |
| Business Rule | BusinessRule | ["all" | "only" | "exactly" ] [Rest] | A business rule may be any document structure instances that starts with "all", "only" or "exactly". |
| Remainder | Rest | [rest] -> [Secondary Agent | Secondary Action] | The rest of sentence may contain a number of secondary agents and actions from their respective glossaries. |

Figure 7:
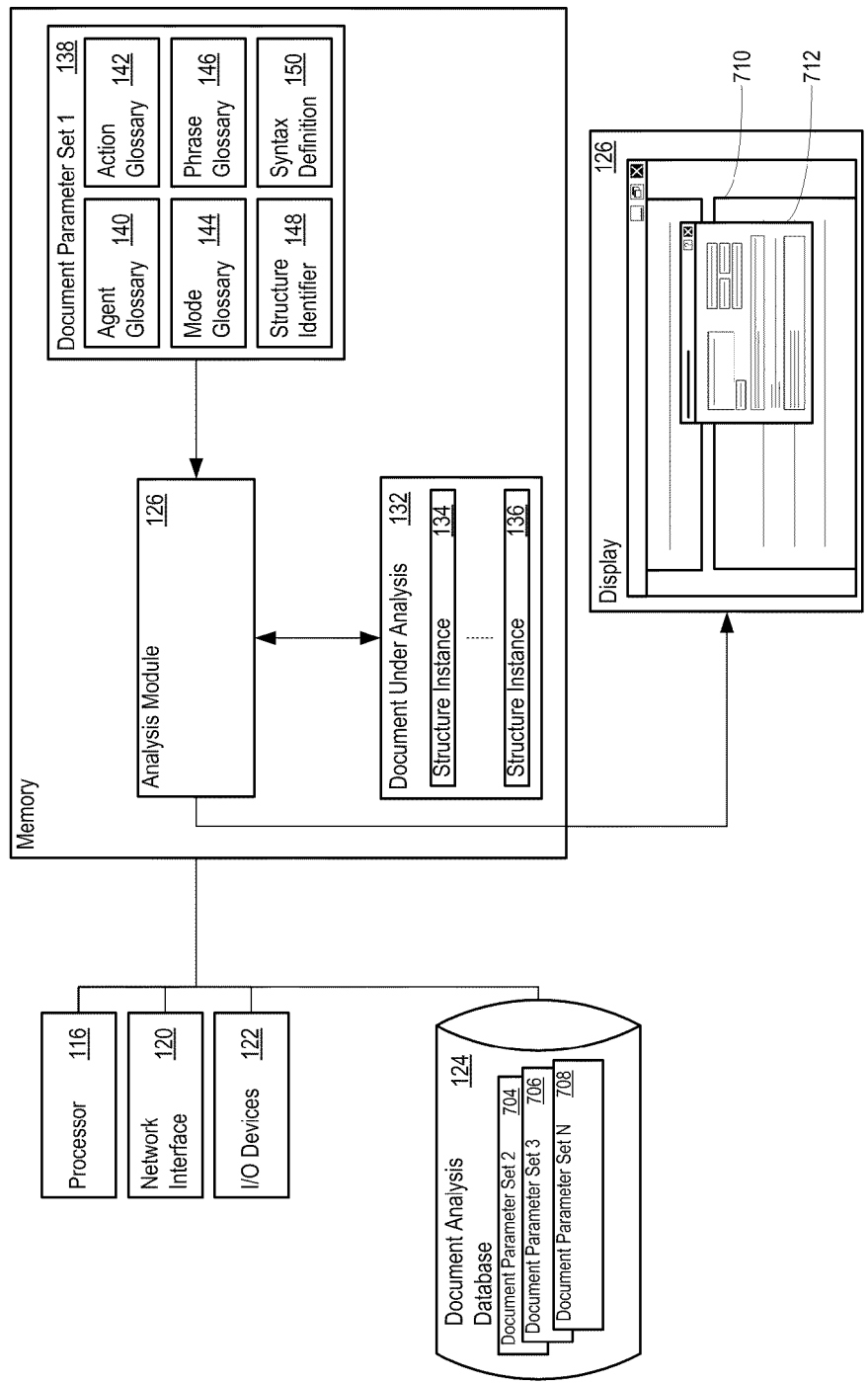
FIG. 7 shows a requirements analysis system.

FIG. 7 illustrates an example of a requirements analysis system 702. In the example shown in FIG. 7, the requirements analysis system 702 includes the document analysis module 126 in communication with a document under analysis 132 and the first document specific parameter set 138. The document analysis module 126 may also be in communication with the document analysis database 124 to retrieve one or more document specific parameter sets 706-708. The analysis module 126 is also in communication with the processor 116, the network interface 120 and various other input/output devices 122. As shown in FIG. 7, the document specific analysis module is in communication with the display 126, which may display an electronic representation 710 of the document under analysis 132 and a graphical user interface 712 for interacting with the document analysis module 126.

In general, the document analysis module 126 is operative to analyze the document instances 134-136 of the document under analysis 132. For example, when analyzing the document structure instance 134, the document analysis module 126 may determine whether the document structure instance 134 is a requirement statement. The pseudo-codes below illustrate several methods that the document analysis module 126 may perform in determining whether the document structure instance 134 is a requirement statement according to the syntax definition 150. The first pseudo-code below illustrate one method that the document analysis module 126 may use to determine whether the document structure instance 134 contains a structure identifier:

```
isRequirement (Document structure instances)
   if the first word of the document structure instances has a structure
      identifier:
         return true
   end if
      else
         return false
      end else
end isRequirement
```

In addition, the document analysis module 126 may determine whether the document structure instance 134-136 includes any of the constituents in glossaries 140-146 consistent with the syntax definition 150. More specifically, the document analysis module 126 may determine whether a document structure instance 134, such as a requirements statement of a requirements document, includes a constituent from the agent glossary 140. In an alternative example, the document analysis module 126 may determine whether a document structure instance 134 includes a constituent from the phrase glossary 146, the mode glossary 144, the action glossary 142, or another glossary from another document parameter set 704-708.

The pseudo-code below illustrates one method for identifying whether the document structure instance 134 contains an agent constituent:

```
FindAgent(Document structure instance s)
   For each agent_i in AgentGlossary
      If agent_i is the first phrase in the document structure instance
         after the structure identifier
            return true
      end if
   end for
   return false
end FindAgent
```

The pseudo-code below illustrates one method for identifying whether the document structure instance 134 contains a mode constituent:

```
FindMode(Document structure instance s)
   For each mode in ModeGlossary
      If mode is the second phrase in the document structure
         instance after the agent phrase
            return true
```

-continued

```
        end if
    end for
    return false
end FindMode
```

The pseudo-code below illustrates one method for identifying whether the document structure instance 134 contains an action constituent

```
FindAction(Document structure instance s)
    For each action in ActionGlossary
        If action is the third phrase in the document structure
        instance after the mode phrase
            return true
        end if
    end for
    return false
end FindAction
```

The pseudo-code below illustrates one method for identifying whether the document structure instance 134 contains a constituent from the phrase glossary 146:

```
FindPhrase(Document structure instance s)
    For each phrase_i in PhraseGlossary
        If phrase_i occurs in the document structure instance
            return true
        end if
    end for
    return false
end FindPhrase
```

The document analysis module 126 may further perform a document analysis operation based on whether the document structure instances 134-136 include any of the constituents in a glossary 140-146 consistent with the syntax definition 150. Examples of performing a document analysis operation include identifying a problematic constituent, identifying a constituent from the glossaries 140-146 contained in the document structure instances 134-136, identifying that the document structure instances 134-136 do not contain a constituent from the glossaries 140-146, or identifying whether the document structure instances 134-136 are consistent with the syntax definition 150. In addition, where the document analysis module 126 identifies an error or issue in the analyzed document structure instance, the document analysis module 126 may provide a suggestion for correcting or rectifying the identified error or issue.

The document analysis module 126 may also communicate with the inference engine 106 to determine whether one or more document structures instances 134-136 conflict using the document parameter set 138. For example, the document parameter set 138 may include one or more document structure rules relating to the substantive nature of the document structure instances 134-136. The document analysis module 126 may transmit the document structure instances 134-136, along with the document structure rules, to the inference engine 106 to determine whether the document structure instances 134-136 substantively conflict.

For example, suppose that the document structure rules include a rule stating that "Encryption delays a message by five seconds," and the document structure instances include first a document structure instance stating that "The system will encrypt all messages" and a second document structure instance stating that "The system will send all messages in less than five seconds." By transmitting the document structure rule along with each of the two document structure instances of the above example to the inference engine 106, the document analysis module 126 is able to report that the document structure instances conflict with one another.

The document analysis module 126 may also use a constituent hierarchy parameter, such as the parent field 206 of the agent 140, when analyzing the document structure instances 134-136. The document analysis module 126 may use the constituent hierarchy parameter to identify whether the document structure instances 134-136 conflict with a document structure rule. For example, as shown in FIG. 2, the parent field 206 of the agent glossary 140 identifies that "developers" are subordinate to "development team." Where a document structure rule states that "Only a development team shall contact suppliers" and a document structure instance states that "Developers will contact suppliers," the document analysis module 126 determines that the document structure instance does not conflict with the document structure rule.

As another example of using document structure rules to analyze document structure instances, suppose that a first business rule states that "If an order is to be delivered, the patron must pay by payroll deduction" and a second business rule states that "Only permanent employees may register for payroll deduction for any company purchase." The system 102 may then infer that the inferred business rule from the first and second business rule is that "Only a permanent employee can specify that an order can be picked up." Accordingly, the document analysis module 126 may output an alert where a document structure instance states that "The Patron shall specify whether the order is to be picked up or delivered." The document analysis module 126 may also communicate with the inference engine 106 to perform the analysis on the document structure instances 134-136 using the document structure rules.

The document analysis module 126 may also determine whether the document under analysis 132 contains document structure instances 134-136 of a specific type of document structure instance. For example, the document analysis module 126 may compare the document parameter set 138 to determine that the document under analysis 132 does not contain document structure instances of a security type. The document analysis module 126 may also determine whether the document structure instances 134-136 are complete. For example, a document structure instance conforming to a conditional syntax definition may have an "if" statement and no "else" statement. In this example, the document analysis module 126 may output an alert indicating that the document structure instance is an incomplete conditional structure instance.

The document analysis module 126 may also determine whether the document structure instances satisfy a priority given to a property or other document structure instance. For example, the document parameter set 138 may specify that user interface document structure instances are given the highest priority level. In analyzing the document under analysis 132, the document analysis module 126 may determine and identify whether any of the document structure instances are directed to a user interface.

In addition, the document analysis module 126 may further identify document structure instances for which a complementary document structure instance appears to be missing. For example, a document structure instance may specify that "System X will send an alert to System Y." The document analysis module 126 is operative to determine whether a similar document structure instance states that System Y should process alerts sent by System X.

Figure 8:
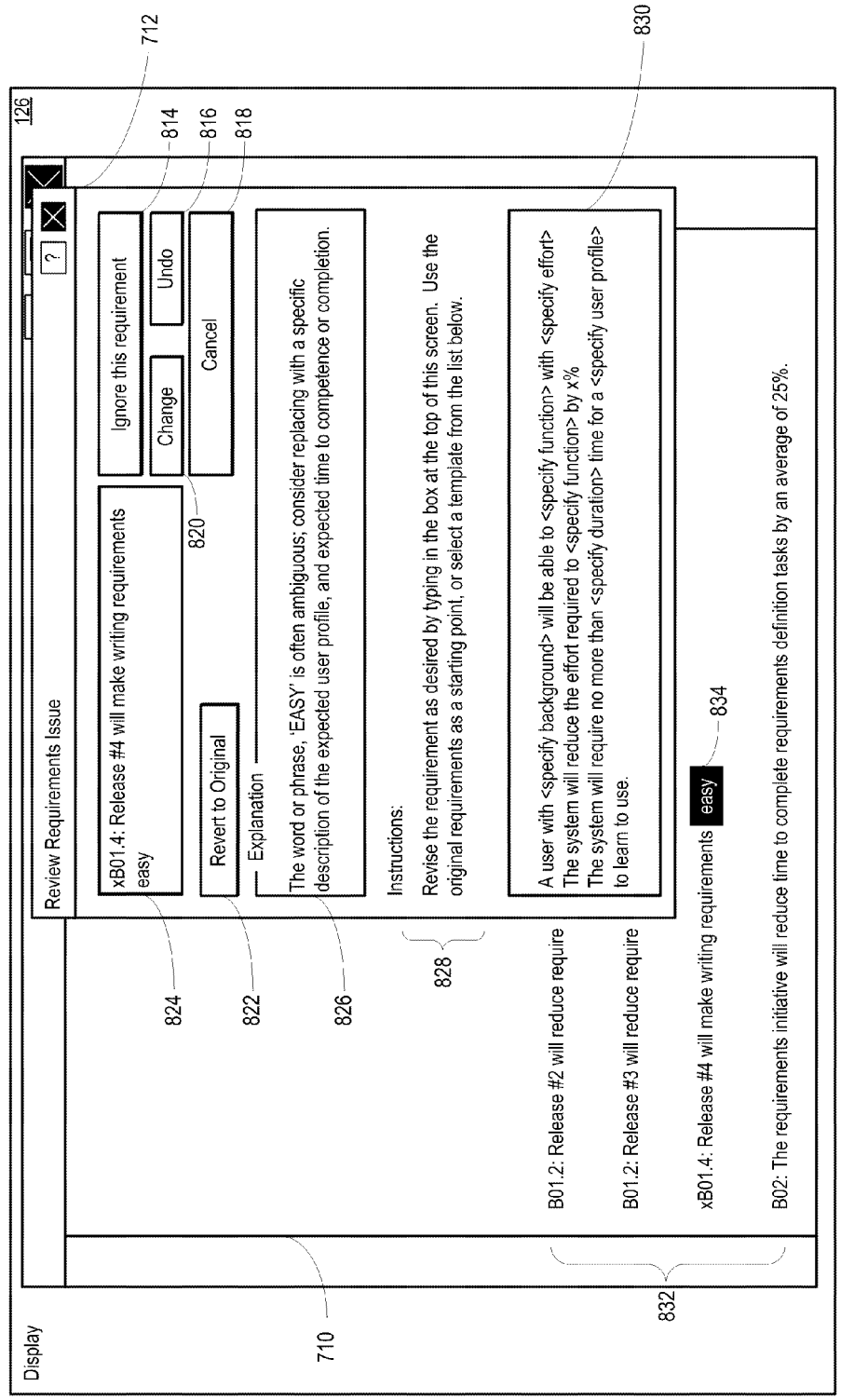
FIG. 8 shows a requirement analysis user interface.

The document analysis module 126 may also be in communication with a graphical user interface 712 for communicating analysis messages relating to the analysis of document structure instances 134-136. FIG. 8 shows one example of a graphical user interface 712 for communicating analysis messages relating to the analysis of a document structure instance. The graphical user interface 712 shown in FIG. 8 has been configured to communicate analysis messages associated with the phrase glossary 146. Other graphical user interfaces may also be configured for each of the other glossaries, including the agent glossary 140, the action glossary 142, and the mode glossary 144.

The graphical user interface 712 associated with the phrase glossary 146 includes several control parameters 814-822, including an "ignore this requirement" control parameter 814, a "change" control parameter 820, an "undo" control parameter 816, a "cancel" control parameter 818, and a "revert to original" control parameter 822. Each of the control parameters 814-822 are associated with an instruction for the document analysis module 126. For example, selecting the "ignore this requirement" control parameter 814 instructs the document analysis module 126 that it should ignore the analyzed document structure instance; selecting the "change" control parameter 820 instructs the document analysis module 126 that it should change the document structure instance; selecting the undo control parameter 816 instructs the analysis module 126 that it should undo the last change applied to the document structure instance; selecting the cancel control parameter 818 instructs the document analysis module 126 that it should cancel the analysis of the document structure instance; and, selecting the revert to original control parameter 822 instructs the document analysis module 126 that it should revert the document structure instance to its original form as it appeared before the analysis by the document analysis module 126.

The graphical user interface 712 also includes several different text fields 824-830. The text fields 824-830 include a document structure instance text field 824, an explanation text field 826, an instruction text field 828, and a suggested change text field 830. The text fields 824-830 may be associated with fields 502-506 of the phrase glossary 146, with fields from the document parameter set 138, or with fields from the document analysis database 124. For example, as shown in FIG. 8, the suggested text field 830 of the graphical user interface 712 is associated with the suggestion field 506 of the phrase glossary 146. Similarly, the explanation text field 826 is associated with the explanation field 504 of the phrase glossary 146. The document analysis module 146 is operative to populate the text fields 828-830 with the analysis messages of their associated fields. Other graphical user interfaces associated with the other glossaries 140-144 may include additional or fewer control parameters, or additional or fewer text fields.

In FIG. 8, the document analysis module 126 is analyzing document structure instances 832 using the constituent "easy" from the phrase glossary 146. The document analysis module 126 has identified an ambiguous phrase 834 in one of the document structure instances. Having identified a constituent from the phrase glossary 146, the document analysis module 126 has retrieved several analysis messages associated with the constituent "easy" and has populated the text fields 824-830 of the graphical user interface 712 with those analysis messages. The document analysis module 126 has populated the document structure instance text field 824 with the text of the document structure instance having the found constituent. The document analysis module 126 has also populated the explanation text field 826 with an analysis message indicating the reason for identifying the constituent of the document structure instance. The document analysis module 126 has further populated the instruction text field 828 with an analysis message indicating how to resolve the identified issue presented in the explanation text field 826, and the document analysis module 126 has populated the suggested text field 830 with analysis messages to replace the text of the identified constituent or the text of the analyzed document structure instance.

The text fields 824-830 may also be associated with the control parameters 814-822. For example, in one implementation, the suggested text field 830 is associated with the change control parameter 820. Thus, when an analysis message is selected from the suggested text field 830 and the change control parameter 820 is activated, the document analysis module 126 may replace the document structure instance text in the document structure instance text field 824 with the selected analysis message from the suggested text field 830. The document analysis module 126 may further change the document under analysis to reflect the changes made to the analyzed document structure instance of the document under analysis.

In addition that the graphical user interface 712 of FIG. 8 may indicate that the document analysis module 126 has found a constituent from the phrase glossary 146 in the analyzed document structure instance, other graphical user interfaces may indicate that the document analysis module 126 has not found a constituent from other glossaries. For example, a graphical user interface associated with the agent glossary 140 may present an analysis message indicating that the document analysis module 126 did not find an agent constituent in the analyzed document instance. Similarly, a graphical user interface associated with the action glossary 140 may present an analysis message indicating that the document analysis module 126 did not find an action constituent in the analyzed document instance. More generally, the requirements analysis system 702 may be configured such that a graphical user interface is associated with each of the document parameters of the document parameter sets for displaying the analysis of the document analysis module 126.

Figure 9:
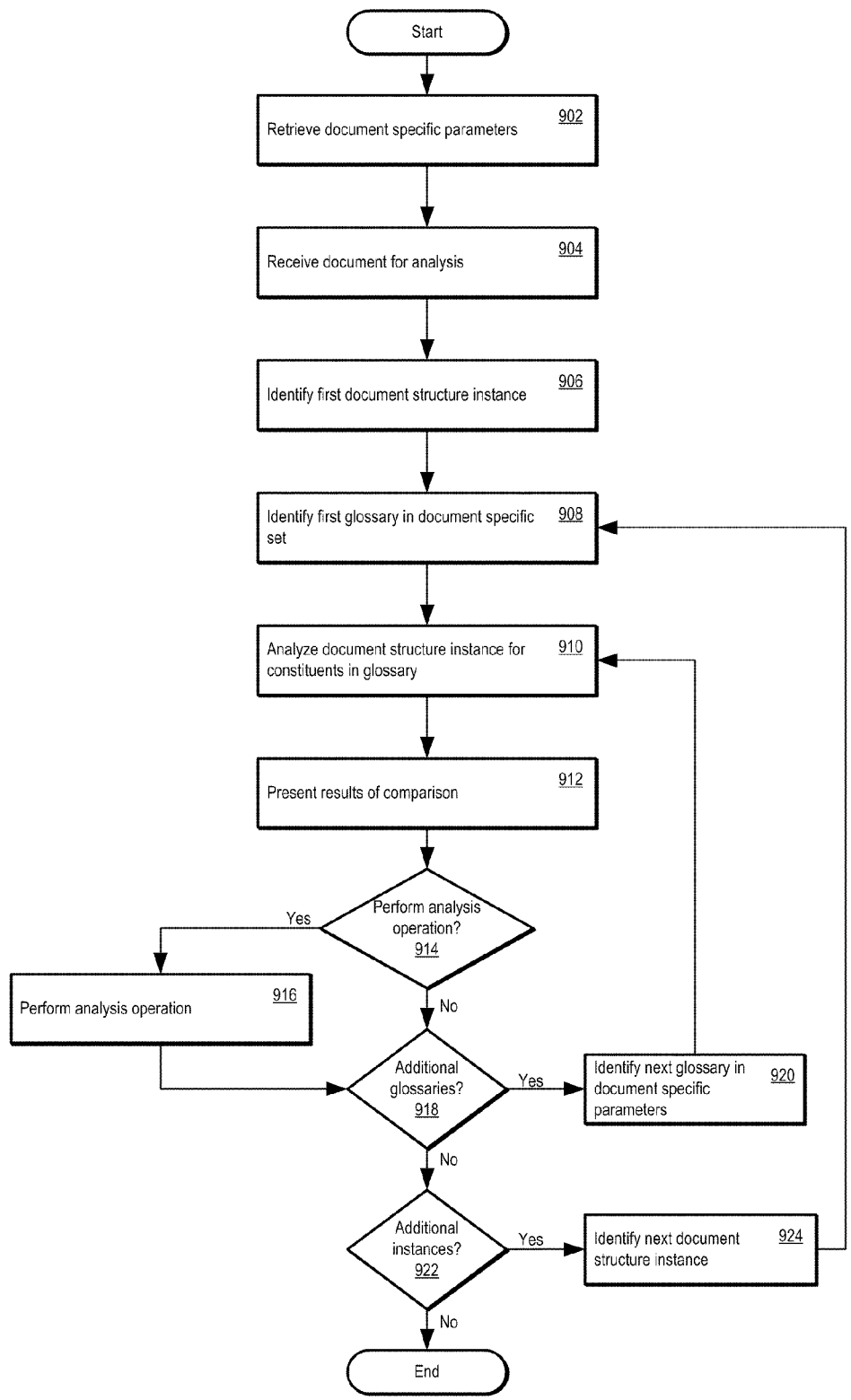
FIG. 9 shows logic flow for a requirements analysis system.

FIG. 9 shows logic flow for a requirements analysis system 702. The document analysis module 126 receives the document parameters, such as the glossaries 140-146 or the constituents of the glossaries 140-146, from the document parameter set 138 (902). The document analysis module 126 then receives the document for analysis (904). In starting the analysis of the document, the document analysis module identifies a first document structure instance, such as document structure instance 134 (906). The document analysis module 126 may not identify any document structure instances, in which case, the document analysis module 126 may display a graphical user interface with an analysis message indicating that the document analysis module 126 did not identify any document structure instances.

Where the document analysis module 126 identifies a document structure instance, the document analysis module 126 then identifies a first glossary in the document specific parameter set (908). The first glossary may be any of the glossaries 140-146. The first glossary may also be a glossary stored in the document analysis database 124. Alternatively, or in addition, the document analysis module 126 may receive a structure category component selection value that indicates the structure category component to start the analysis. For example, the document analysis module 126 may receive a structure category component selection value corresponding to the action category component, in which case, the document analysis module 126 begins the analysis of the document structure instance with the action glossary 142.

The document analysis module 126 then begins analyzing the document structure instance to determine whether the document structure instance contains any of the constituents in the first glossary (910). In one implementation, the document analysis module 126 compares each of the constituents of the first glossary with the document structure instance. After the analysis, the document analysis module 126 presents the results of the analysis, such as through the graphical user interface 712 (912).

Based on the results of the analysis, the document analysis module 126 may decide to perform a document analysis operation, pre-configured or otherwise, based on the results of the analysis (914). Examples of performing a document analysis operation include some of the examples previously mentioned above, but also include, displaying a graphical user interface, retrieving an analysis message, or terminating the analysis operation of the document structure instance. Where the document analysis module 126 decides to perform a document analysis operation (916), the document analysis module 126 may use the graphical user interface 712 to present an analysis message associated with the results of the analysis. For example, where the document analysis module 126 determines that the document structure instance does not have an action constituent from the action glossary 142, the document analysis module 126 uses the graphical user interface 712 to present an analysis message relating to the absence of the action constituent and a control parameter for adding an action constituent to the analyzed document structure instance. Alternatively, or in addition, the document analysis module 126 may be pre-configured to apply a change to the document structure analysis based on the results of the analysis and of the category component associated with the first glossary. The document analysis module 126 may perform more than one document analysis operation on the analyzed document structure instance.

The document analysis module 126 then determines whether the document parameter set contains additional glossaries (918), and if so, identifies the next glossary in the document parameter set with which to use in analyzing the document structure instance (920). When the document analysis 126 determines that there are no additional glossaries with which to use in analyzing the document structure instance, the document analysis module 126 then proceeds to determine whether there are additional document structure instances to identify (922). If so, the document analysis module 126 identifies another document structure instance (922), and proceeds through the analysis of the additional identified document structure instance as described above. After the document analysis module 126 determines that there are no additional document structure instances to analyze, the document analysis module 126 terminates its analysis of the received document.

Figure 10:
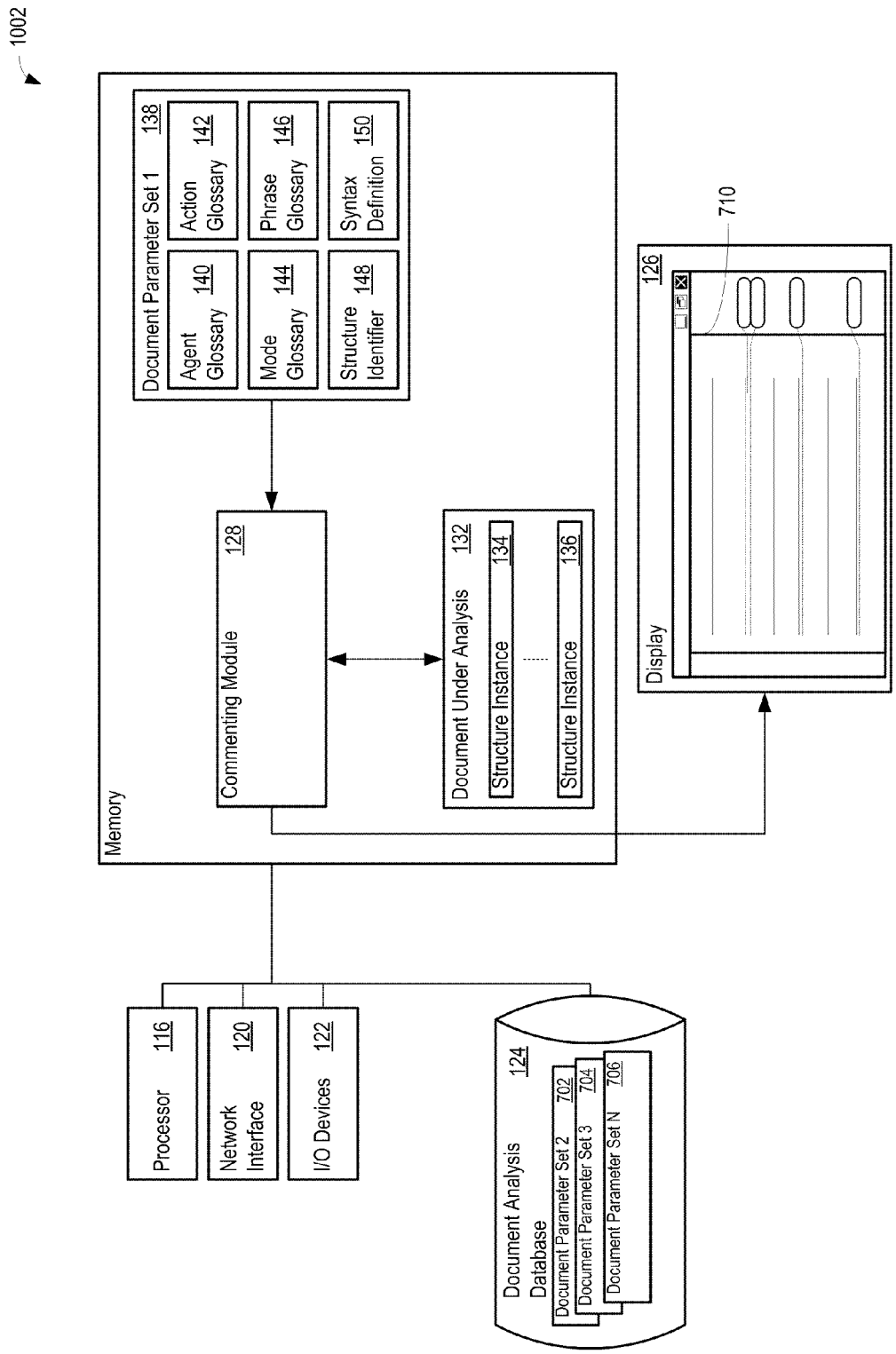
FIG. 10 shows a requirements commenting system.

FIG. 10 shows a requirements commenting system 1002. In the system shown in FIG. 10, the requirements commenting system 1002 includes components similar to those described with reference to FIG. 7 and the requirements analysis system 702. However, the requirements commenting system 1002 may further include the document commenting module 128.

In general, the document commenting module 128 is operative to comment on the document instances 134-136 of the document under analysis 132. For example, the document commenting module 128 may determine whether the document structure instance 134-136 includes any of the constituents in glossaries 140-146 consistent with the syntax definition 150. More specifically, the document commenting module 128 may determine whether a document structure instance 134, such as a requirements statement of a requirements document, includes a constituent from the agent glossary 140. In an alternative example, the document commenting module 128 may determine whether a document structure instance 134 includes a constituent from the phrase glossary 146, the mode glossary 144, the action glossary 142, or another glossary from another document parameter set 704-708.

The document commenting module 128 may further output an analysis message based on the analysis performed by the document commenting module 128. In one implementation, outputting an analysis message includes embedded an analysis message as a comment in the electronic representation 710 of the document under analysis 132. The pseudo-code below illustrates one method performable by the document commenting module 128 in retrieving analysis messages and embedding the analysis messages as comments in the electronic representation 710 of the document under analysis 132:

```
ProcessRequirements (Document reqDoc)
    For each document structure instance s in reqDoc
        If (isRequirement(s) is true)
            If (findAgent (s) = true)
                Mark agent
            Else
                Output ("No Agent Found")
                return
            End if
            If (findMode (s) = true)
                Mark mode
            Else
                Output ("No Mode Found")
                return
            End if
            If (findAction (s) = true)
                Mark action
            Else
                Output ("No Action Found")
                return
            End if
            Mark rest of sentence
            If (findPhrase (s) = true)
                Mark phrase
                Output ("Phrase used in requirement")
            End if
        End if
    End For
End ProcessRequirements
```

The document commenting module 128 may further perform one or more of the analyses as described above with reference to the document analysis module 126.

Figure 11:
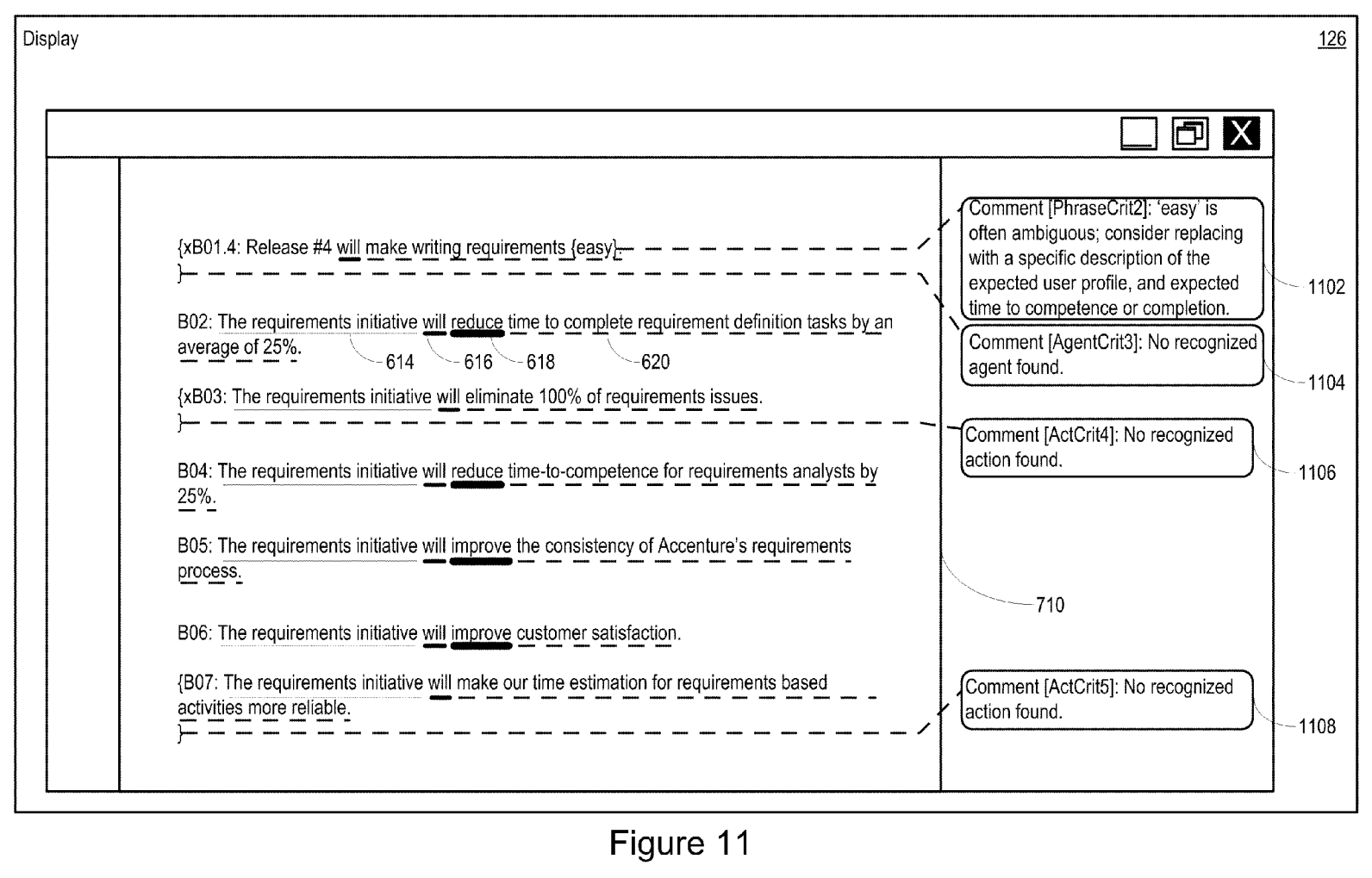

FIG. 11 shows analysis messages embedded as comments 1102-1108 in an electronic representation 710 of a document under analysis 132. The embedded comments 1102-1108 include a phrase embedded comment 1102, an agent embedded comment 1104, and action embedded comments 1106-1108. Each of the embedded comments have analysis messages associated with a glossary 140, 142, and 146. For example, the phrase embedded comment 1102 has an analysis message associated with the phrase glossary 146, the agent embedded comment 1104 has an analysis message associated with the agent glossary 140, and the action embedded comments 1106-1108 have analysis messages associated with the action glossary 142. Moreover, the document commenting module 128 may identify a specific constituent through the embedded comments 1102-1108, such as identifying the constituent "easy" as shown in FIG. 11.

Furthermore, the document commenting module 128 may indicate in the electronic representation 710 the structure category component of the document instances of the document under analysis 132 with markings 614-620. Using the markings 614-620 as discussed above with reference to FIG. 6, the document commenting module 128 may use a thin line 614 for the agent, a medium line 616 for the modal verb, and a heavy line weight 618 for the action. The document commenting module 128 may further use a dashed line 620 for the remainder.

Figure 12:
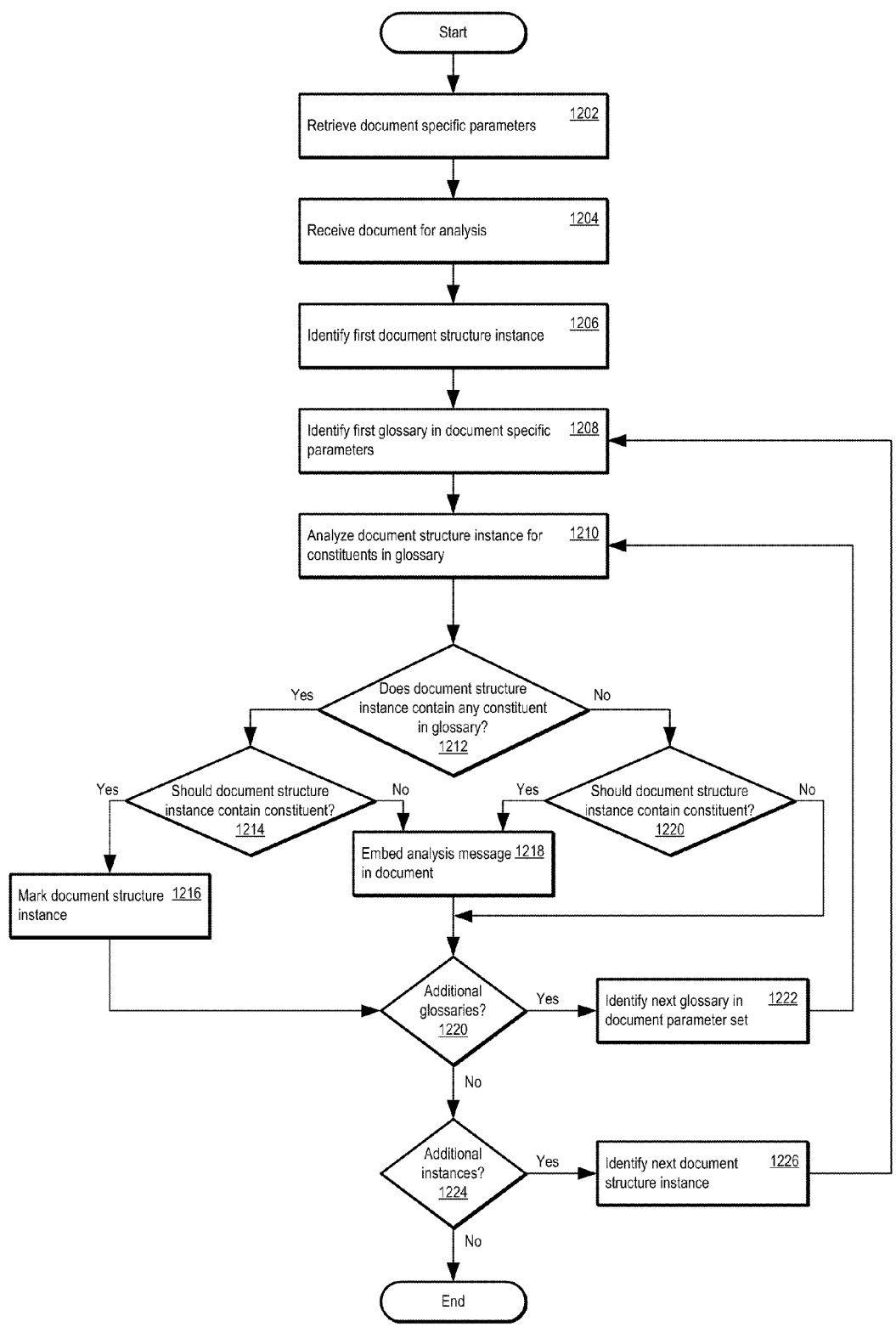
FIG. 12 shows logic flow for a requirements commenting system.

FIG. 12 shows logic flow for the requirements commenting system 1002. The document commenting module 128 receives the document parameters, such as the glossaries 140-146 or the constituents of the glossaries 140-146, from the document parameter set 138 (1202). The document commenting module 128 then receives the document for analysis (1204). In starting the analysis of the document, the document commenting module 128 identifies a first document structure instance, such as document structure instance 134 (1206). The document commenting module 128 may not identify any document structure instances, in which case, the document commenting module 128 may display an analysis message indicating that no document structure instances were identified.

Where the document commenting module 128 identifies a document structure instance, the document commenting module 128 then identifies a first glossary in the document specific parameter set (1008). The first glossary may be any of the glossaries 140-146. The first glossary may also be a glossary stored in the document analysis database 124. Alternatively, or in addition, the document commenting module 128 may receive a structure category component selection value that indicates the structure category component to start the analysis. For example, the document commenting module 128 may receive a structure category component selection value corresponding to the action category component, in which case, the document commenting module 128 begins the analysis of the document structure instance with the action glossary 142.

The document commenting module 128 then begins analyzing the document structure instance to determine whether the document structure instance contains any of the constituents in the first glossary (1210). In one implementation, the document commenting module 126 compares each of the constituents of the first glossary with the document structure instance (1212).

Where the document commenting module 128 determines that the document structure instance contains a constituent from the first glossary, the document commenting module 128 then proceeds to determine whether the document structure instance should contain the constituent (1214). If the document commenting module 128 determines that the document structure instance should contain the identified constituent, the documenting commenting module 128 indicates in the document structure instance the identified constituent (1216). For example, the syntax definition 150 defines that a requirement statement should contain an action category component. Accordingly, the document commenting module 128 will mark a document structure instance where the document commenting module 128 finds an action constituent in the document structure instance.

However, If the document commenting module 128 determines that the document structure instance should not contain the identified constituent, the documenting commenting module 128 retrieves an analysis message from the document parameter set 138 and embeds the analysis message in the electronic representation 710 of the document under analysis 132 (1218). For example, the phrase glossary 146 contains constituents that should not appear in a document structure instance. In this example, where the document commenting module 128 identifies a constituent from the phrase glossary 146 in the document structure instance, the document commenting module 128 embeds an analysis message associated with the identified constituent.

Alternatively, the document commenting module 128 may determine that the document structure instance does not contain a constituent from the first glossary. In this case, the document commenting module 128 determines whether the document instance structure should contain a constituent from the glossary. If the document structure instance should contain a constituent from the glossary, the document commenting module 128 retrieves an analysis message associated with the missing constituent or glossary, and embeds the analysis message in the electronic representation 710 of the document under analysis 132 (1218). Alternatively, if the document structure instance should not contain a constituent from the glossary, the document commenting module 128 then proceeds to determine whether there are additional glossaries (1220) in the document parameter set 138.

As an example of the above described logic flow, the syntax definition 150 defines that a requirements statement should contain an action category component. Where the document commenting module 128 identifies a requirements statement, but further identifies that the requirements statement is missing an action category component, the document commenting module 128 embeds an analysis message in the electronic representation 710 of the document under analysis 132 indicating that the requirements statement is missing an action category component.

After marking the document structure instance (1216), embedding an analysis message (1218), or determining that the document structure instance should not contain a constituent from the first glossary (1220), the document commenting module 128 proceeds to determine whether there are additional glossaries in the document parameter set 138 (1220). If the document commenting module 128 determines that there are additional glossaries, the document commenting module 128 identifies the next glossary (1222) and proceeds to analyze the document structure instance using the identified glossary (1210). However, if the document commenting module 128 determines that there are no remaining glossaries to use in analyzing the identified document structure instance, the document commenting module 128 proceeds to determine whether there are additional document structure instances remaining in the document under analysis 132 (1224). If there are remaining document structure instances, the document commenting module 128 identifies the next document structure instance (1226) and proceeds to analyze the identified next document structure instance as described above. Where there are no remaining document structure instances and no remaining glossaries, the document commenting module 128 terminates its analysis and commenting.

Although the logic flow described above illustrates some of the actions of the document commenting module 128, the actions described are not exhaustive. For example, the document commenting module 128 may mark a remainder component of the document structure instances.

Figure 13:
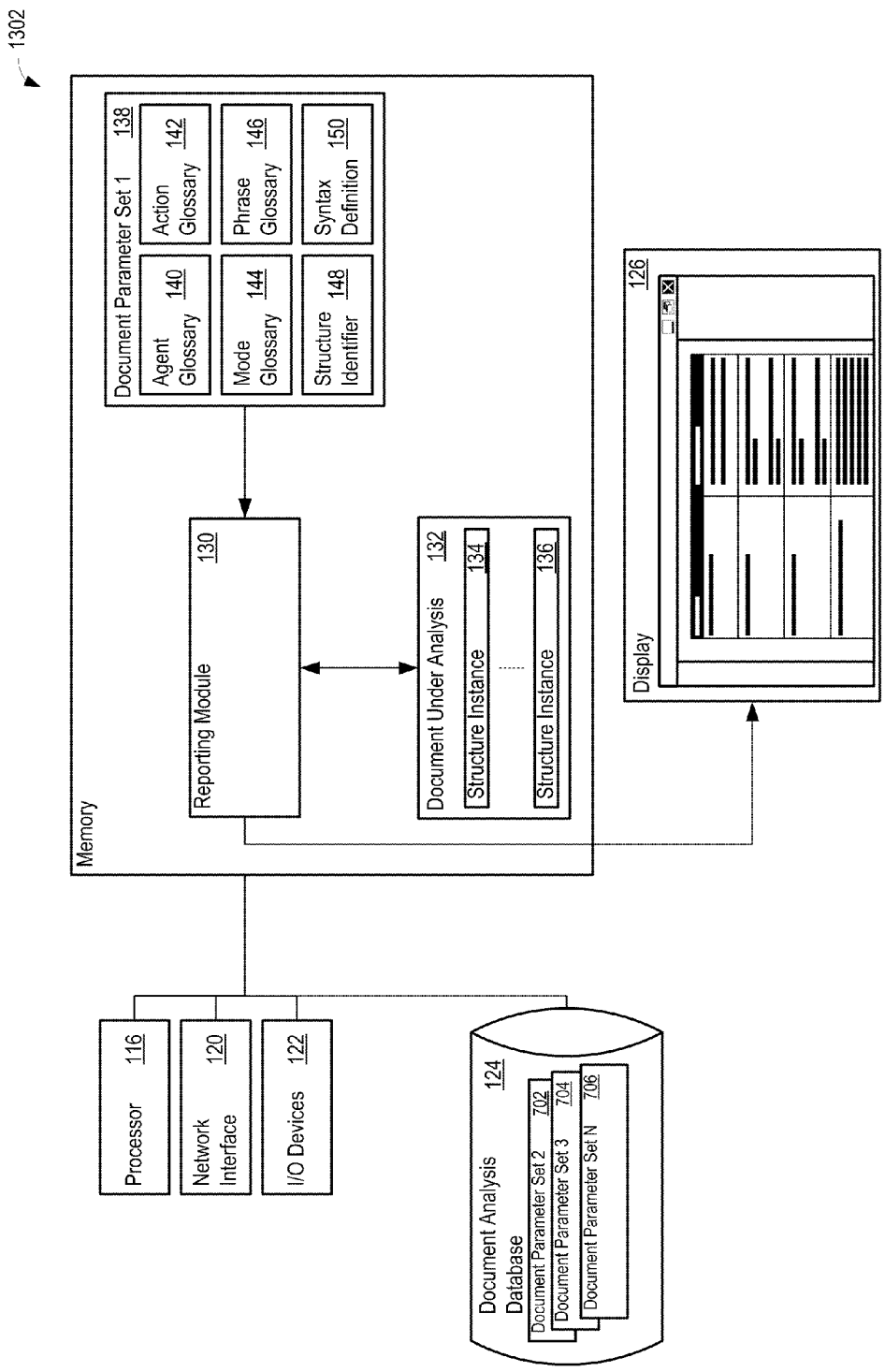
FIG. 13 shows a report generator system.

FIG. 13 shows a report generator system 1302. In the system shown in FIG. 13, the report generator system 1002 includes components similar to those described with reference to FIG. 7 and the requirements analysis system 702. However, the report generator system 1302 may further include the document reporting module 130. The document reporting module 130 may be configured to analyze electronic documents and document structure instances as described above with reference to the document analysis module 126.

In general, the document reporting module 130 is operative to generate reports organized by constituent and document structure instance document reporting module 130. More specifically, the document reporting module 130 is operative to generate a report associating constituents with document structure instances that contain those constituents and are consistent with the syntax definition 150. In general, the document reporting module 130 is operative to receive a structure category component value and generate a report using the received structure category component value.

FIG. 14 shows an example report 1402 generated by the document reporting module 130 using an action category component value. The example report 1402 contains a constituent column 1404 and an identified requirements statement column 1406. In the example report 1402, the constituent column 1404 contains rows of agent constituents and the requirements statement column 1406 contains rows of requirement statements associated with the agent constituent identified in the constituent column 1404. However, the constituent column 1404 may include other constituents such as action constituents, mode constituents, or other constituents, depending on the structure category component value received by the document reporting module 130. The document reporting module 130 may also be pre-configured to generate a report using a specific document structure category component.

Figure 15:
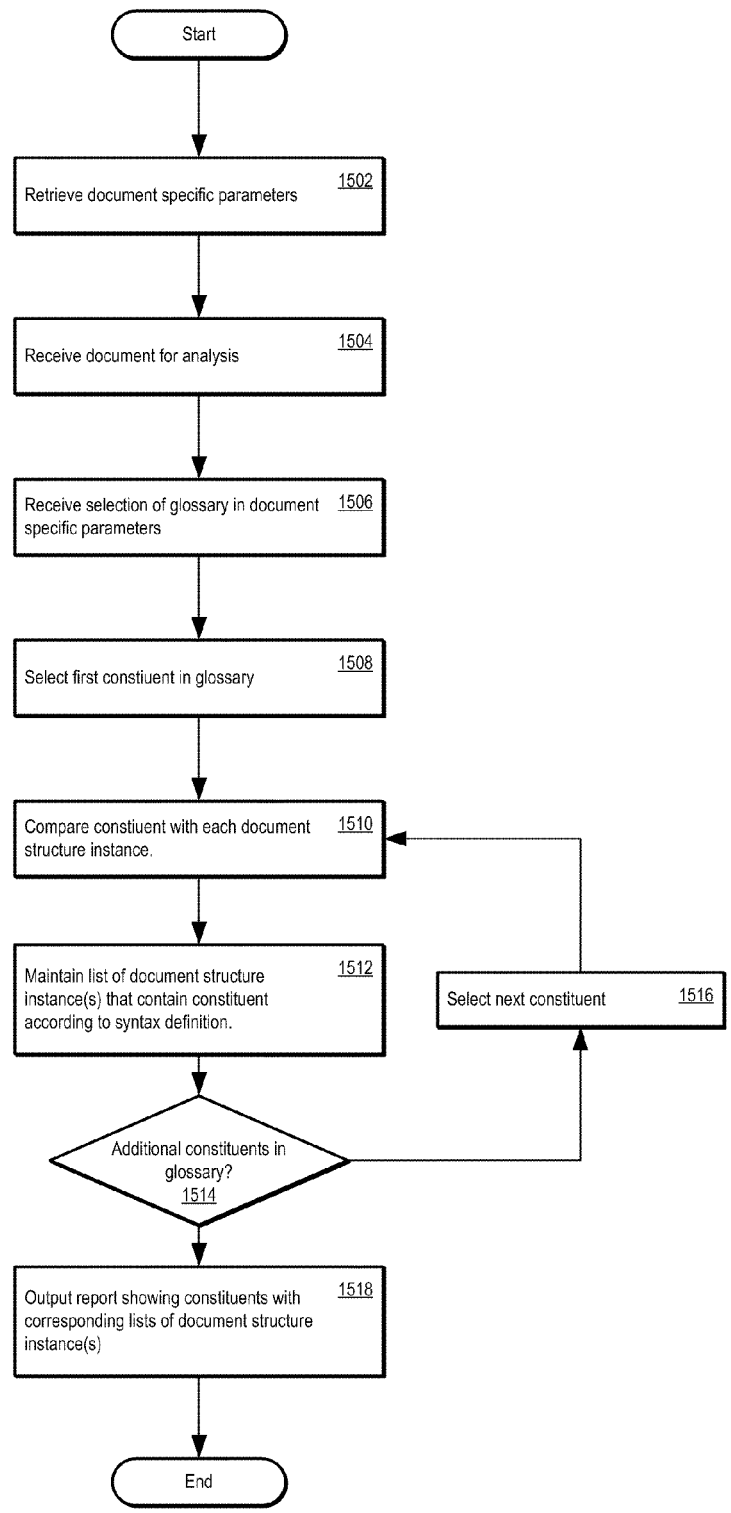
FIG. 15 shows logic flow for a report generator system.

FIG. 15 shows logic flow for the report generator system 1302. The document reporting module 130 receives the document parameters, such as the glossaries 140-146 or the constituents of the glossaries 140-146, from the document parameter set 138 (1502). The document reporting module 130 then receives the document for analysis (1504). Afterwards, the document reporting module 130 receives a structure category component selection value for selecting a glossary by which to analyze the received document. (1506)

In starting the report of the received document, the document reporting module 130 selects a first constituent from the selected glossary (1508). The document reporting module 130 then compares the selected first constituent with the document structure instances of the received document (1510). As the document reporting module 130 is comparing the selected first constituent with the document structure instances, the document reporting module 130 maintains a list of document structure instances that contain the selected first constituent according to the syntax definition 150. It is possible that none of the document structure instances contain the selected first constituent or contain the selected first constituent consistent with the syntax definition 150.

After comparing the selected first constituent with the document structure instances, the document reporting module 130 then determines whether there are additional constituents in the selected glossary (1514). Where the document reporting module 130 determines there are additional constituents in the selected glossary, the document reporting module 130 selects the next constituent in the selected glossary (1516), and proceeds to compare the selected next constituent with the document structure instances in the received document (1510). The document reporting module 1530 also maintains a list of document structure instances that contain the selected next constituent consistent with the syntax definition 150.

Where the document reporting module 130 determines that the selected glossary does not contain additional constituents, the document reporting module 130 outputs a report containing the list of constituents from the selected glossary and the maintained lists of document structure instances containing the constituents consistent with the syntax definition 150 (1518). In some instances, a list associated with a constituent may be an empty list. The document reporting module 130 may output more than one report depending on the number of selected glossaries and the number of received documents.

Figure 16:
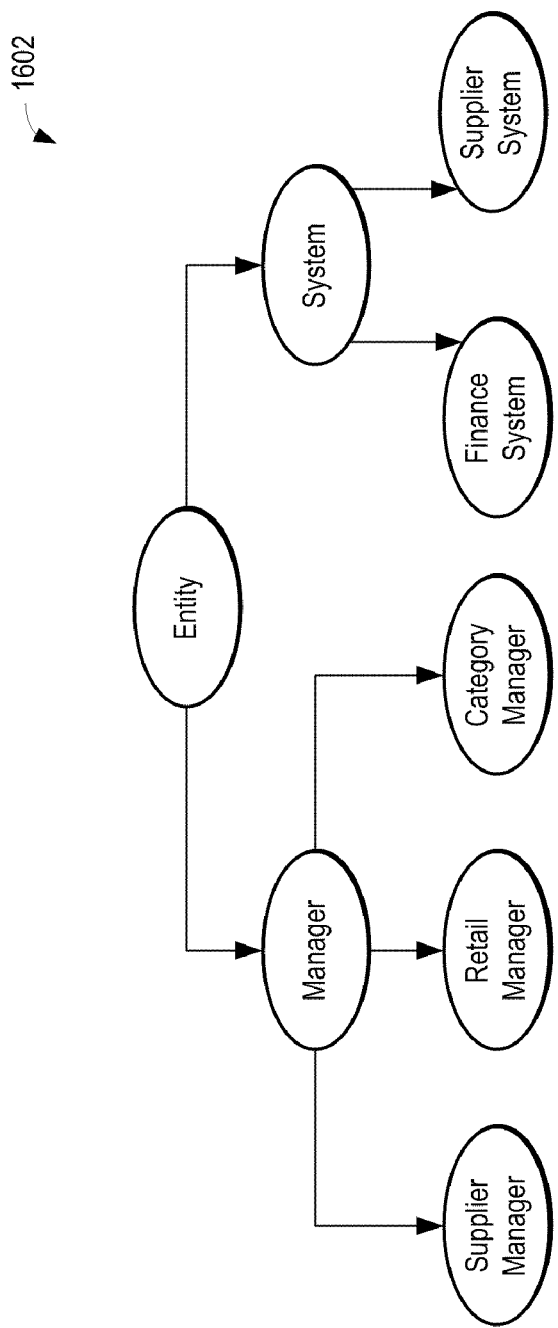
FIG. 16 shows an example of an agent taxonomy.
Figure 17:
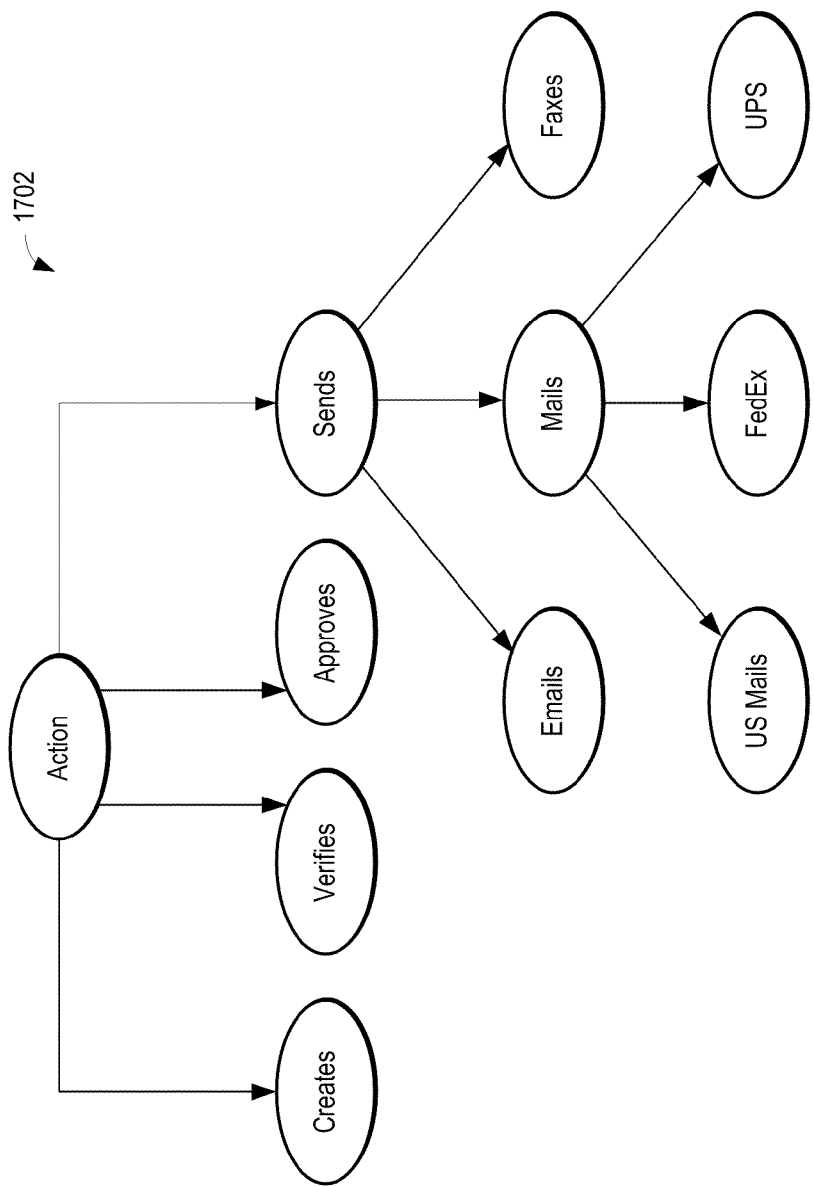
FIG. 17 shows an example of an action taxonomy.

FIG. 16 shows an example of an agent taxonomy 1602. The agent taxonomy 1602 illustrates a hierarchical relationship between agent constituents contained in an agent glossary 140. For example, the agent taxonomy 1602 illustrates that a "supplier manager" is a type of "Manager." Similarly, FIG. 17 shows an example of an action taxonomy 1702. The action taxonomy 1702 illustrates a hierarchical relationship between action constituents contained in an action glossary 142. For example, the action taxonomy 1702 shows that the verb "e-mail" is a more specific verb for "Send." The agent taxonomy 1602 or the action taxonomy 1702 may be used as part of a domain knowledge based analysis to determine whether there is a conflict among document structure instances, or, more specifically, requirements statements. For example, the document analysis, commenting, and reporting system 102 may include one or more business rules for resolving conflicts between requirement statements using an agent glossary 140 configured with the agent taxonomy 1602, the action glossary 142 configured with the action taxonomy 1702, or other glossary configured with another type of taxonomy. The document analysis, commenting, and reporting system 102 may also be configured to identify similar document structure instances, such as "The purchasing system sends the order to the user" and "The purchasing system faxes the order to the user," using the agent taxonomy 1602, the action taxonomy 1702, or an additional or alternative taxonomy.

Figure 18:
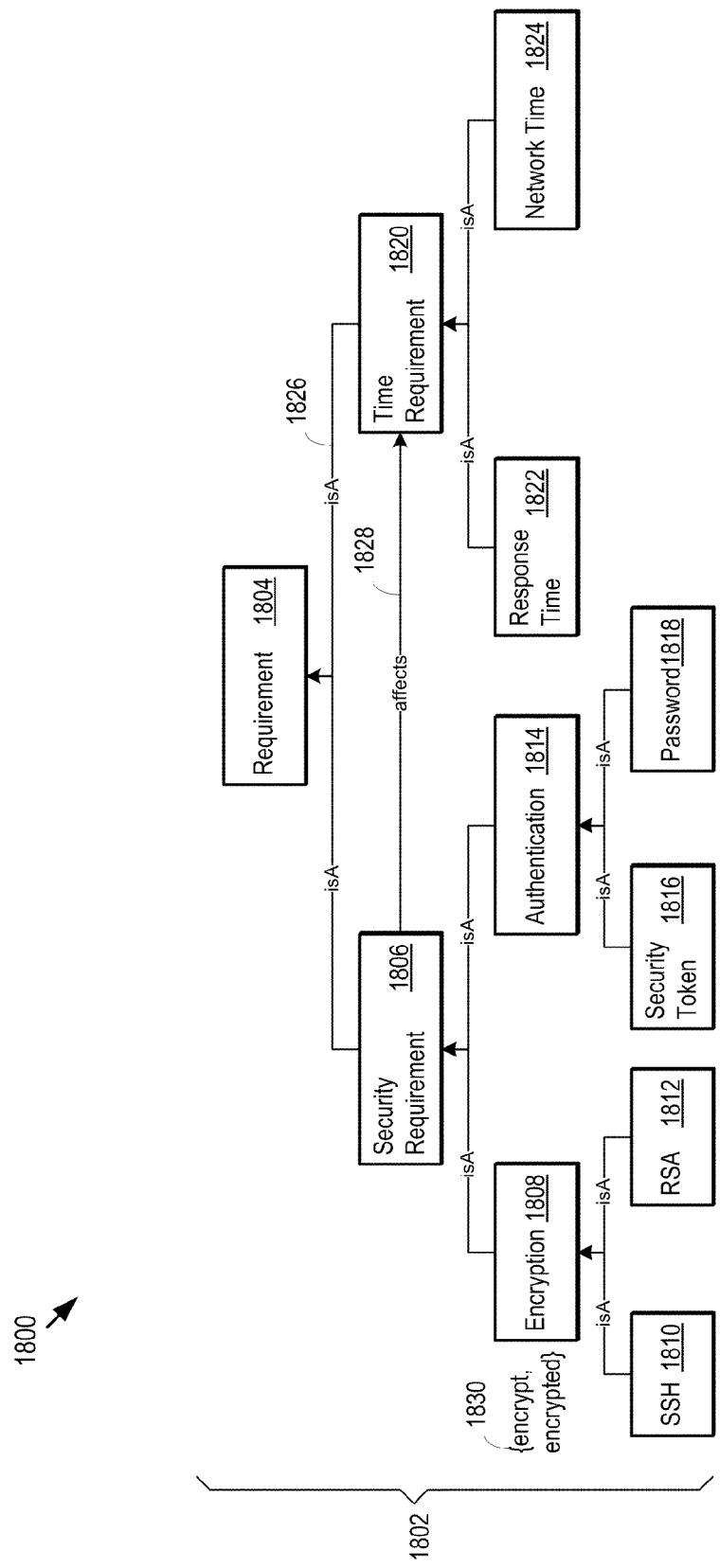
FIG. 18 shows an example of an ontology model.

FIG. 18 shows an example of an ontology model 1800. In one implementation, the ontology model 1800 defines an ontology hierarchy 1802. The ontology model 1800 may be described using the OWL Web Ontology Language. However, the ontology model 1800 may also be described using other languages such as the Resource Description Framework (RDF) or the Knowledge Interchange Format (KIF).

The ontology hierarchy 1802 comprises document structure instance classes related as root classes and child classes. For example, FIG. 18 shows that the ontology hierarchy 1802 starts with a root requirement class 1804 and that the root requirement class 1804 has two child classes, a security requirement class 1806 and a time requirement class 1820. In addition, the security requirement class 1806 is a root class of two child classes, an encryption class 1808 and an authentication class 1814. Similarly, the time requirement class 1820 is a root class of two child classes, a response time class 1822 and a network time class 1824 Additional child classes include an SSH class 1810, an RSA class 1812, a security token class 1816, and a password class 1818. As shown in FIG. 18, the SSH class 1810 and the RSA class 1812 are child classes of the encryption class 1808, and the security token class 1816 and the password 1818 are child classes of the authentication class 1814.

FIG. 18 also shows that the ontology hierarchy 1802 defines class relationships between the root classes and their associated child classes. For example, FIG. 18 shows that the ontology model 1800 includes a horizontal class definition relationship 1828 and a vertical class definition relationship 1826. In general, horizontal class definition relationships define relationships between classes unrelated to hierarchy, and vertical class definition relationships define hierarchical relationships between classes. In the example shown in FIG. 18, the horizontal class definition relationship 1828 is an "affects" relationship, and shows that the security requirement class 1806 affects the time requirement class 1820. In addition, FIG. 18 shows that the vertical class definition relationship 1826 is an "isA" relationship that shows that the time requirement class 1820 is a child class of the requirement class 1804. Examples of class definition relationships are shown below in Table 3.

TABLE 3

| Relationship Type | Description |
| --- | --- |
| Affect | Classifications that affect each other. |
| Contradict | Classifications that contradict each other |
| Dependency | Classifications that depend on each other |
| Implement | Classification that implements a higher-level classification |
| Similarity | Classifications that are similar to each other |
| isA | Classifications that are special cases of other classifications |

FIG. 18 also shows that the ontology model 1800 may further include instance class search terms that facilitate analysis of document structure instances against the ontology model 1800. Examples of instance class search terms are the encryption class search terms 1830 "encrypt" and "encrypted." Instance class search terms may be used to associate document structure instances with a class. Other examples of instance class search terms may be "SSH," "RSA," "authenticate," "password," or any other search term associated with the classes included in the ontology model 1800. However, other properties may be used to associate a document structure instance with one or more classes.

Figure 19:
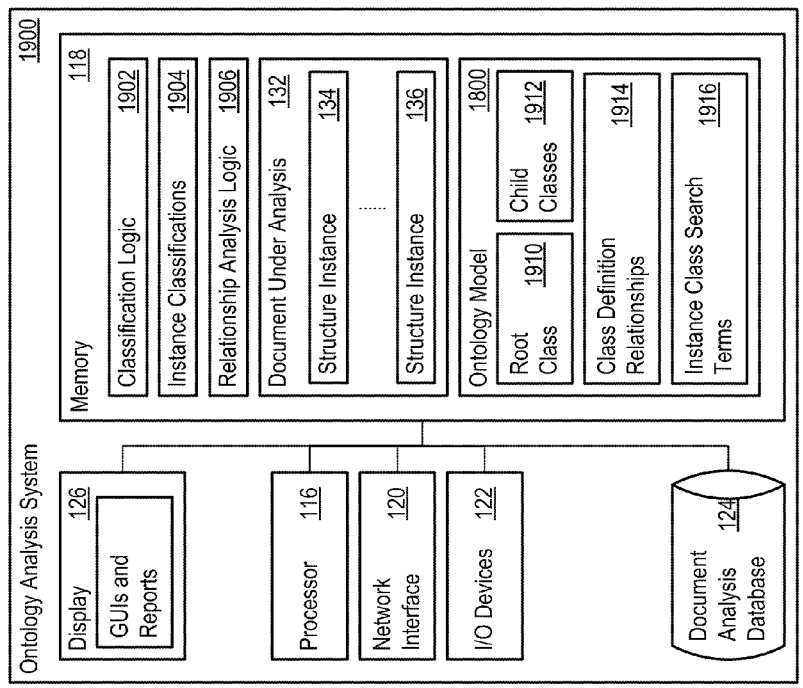
FIG. 19 shows an ontology analysis system.

Turning next to FIG. 19 is an example of an ontology analysis system 1900. The ontology analysis system 1900 may include one or more components of the document analysis, commenting, and reporting system 102. In one implementation, the memory 118 stores classification logic 1902 and relationship analysis logic 1906 for analyzing a document under analysis 132 using the ontology model 1800. The document analysis database 124 may also include additional ontology models other than ontology model 1800.

As shown in FIG. 19, the ontology model 1800 includes a root class 1910, such as the requirement class 1804, and child classes 1912, such as the security requirement class 1806 and the time requirement class 1820. The ontology model also includes class definition relationships 1914, such as horizontal relationship 1828 and vertical relationships 1826, and includes instance class search terms, such as the encryption instance class search terms 1830.

The classification logic 1902 is operative to analyze document structure instances 134-136 against the ontology model 1800 to determine classifications for the document structure instances among the document structure instance classes. In one implementation, the classification logic 1902 examines each of the structure instances 134-136 in a document under analysis 132, and when a document structure instance includes a search term associated with a class in the ontology model 1800, the classification logic 1902 assigns an instance classification to the document structure instance based on the found search term and the class associated with the found search term. However, the classification logic 1902 may assign an instance classification to a document structure using another property of the document structure instance other than search term.

In addition, the classification logic 1902 may communicate with the inference engine 106 to use a knowledge model to determine that the document structure instance is an instance of a class associated with the found search term. In one implementation, the inference engine 106 is a Jena inference engine, available from the Hewlett-Packard Development Company, LP located in Palo Alto, Calif. However, the inference engine 106 may be other reasoning engines such as Jess, available from the Sandia National Laboratories located in Livermore, Calif. or Oracle 10G, available from the Oracle Corporation located in Redwood Shores, Calif. The pseudo-code below illustrates one implementation of the classification logic 1902 when the classification logic 1902 uses the encryption instance class search terms 1830:

```
CreateRequirementInstance (Requirement R, Ontology ont, Model m)
    For each class_i in Ontology ont
        If class_i or searchterms (class_i) occur in R
            m.assert (R is a instance of classi)
        end if
    end For
end CreatementInstance
where: searchterms (class_i) is list of search terms for an class in an
ontology, such as "{encrypt, encrypted}."
```

As one example of the classification logic 1902 in operation, suppose that a first document structure instance states that "The messaging system will encrypt all its responses using SSH" and a second document structure instance states that "The messaging system will have a response time of 5 milliseconds." In this example, the classification logic 1902 will assert the first document structure instance as an instance of the encryption class 1808 and the SSH class 1810. The classification logic 1902 will also assert the second document structure instance as an instance of the response time class 1822. The classification logic 1902 may further maintain these assertions as part of the instance classifications 1904.

In addition to the classification logic 1902, the relationship analysis logic 1906 is operative to whether the document structure instances 134-136 affect each other. The relationship analysis logic 1906 may also operate in conjunction with the classification logic 1902 to determine the document structure instances 134-136 that affect each other. The relationship analysis logic 1906 may further use a knowledge model for determining the document structure instances 134-136 that affect each other. The relationship analysis logic 1906 may also find related document structure instances, complimentary document structure instances, or other document structure instances. The pseudo-code below illustrates one example of the relationship analysis logic 1906:

```
FindAffectedRequirements(Document d, Ontology ont, Model m)
    m.loadOntology (ont)
        For each Requirement r in a document
            CreateRequirementInstance (R, ont, m)
        End For
    m.executeQuery(SELECT  ?R1, ?R2 WHERE  {?R1   RDF.Type
                   Requirement ?R2 RDF.Type Requirement .?R1
                   affects ?R2})
End FindAffectedRequirements
where: the m.executeQuery is a SPARQL query that returns any two
instances of class Requirement (R1 and R2) that affect each other.
```

As shown above, the relationship analysis logic 1906 uses the SPARQL query language. However, the relationship analysis logic 1906 may use other query languages, such as SQL, the JESS Rules language, LISP, or any other query language.

Figure 20:
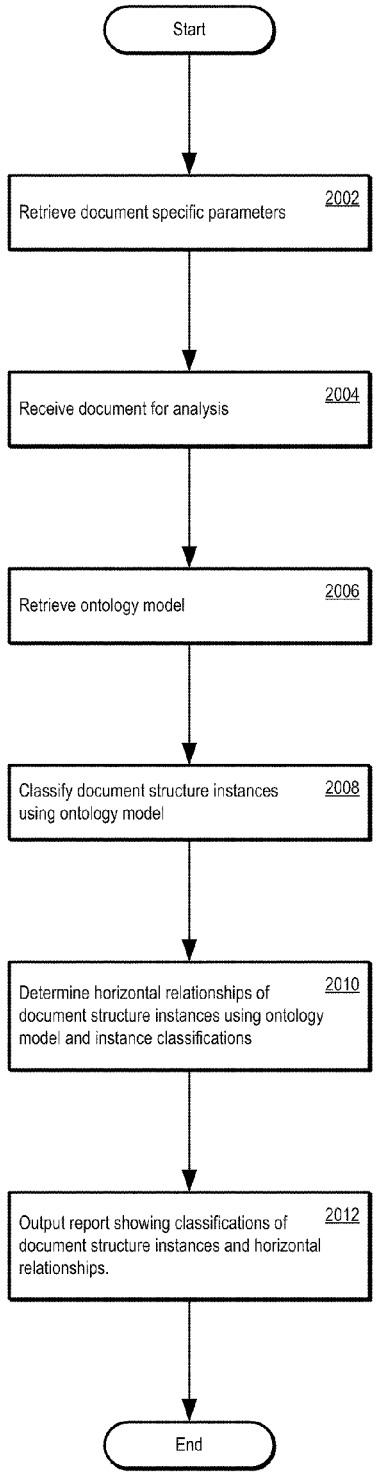
FIG. 20 shows logic flow for an ontology analysis system.

FIG. 20 shows logic flow for an ontology analysis system 1900. The ontology analysis system 1900 initially retrieves one or more document parameter sets from the document analysis database 124 (2002). As previously discussed, a document parameter set may include one or more glossaries, structure identifies, syntax definitions, or other parameters. The ontology analysis system 1900 then receives the document under analysis 132 (2004). Thereafter, the ontology analysis system 1900 retrieves an ontology model 1800 (2006). The ontology analysis system 1900 may also retrieve additional ontology models from the document analysis database 124.

Using the retrieved ontology model and the classification logic 1902, the ontology analysis system 1900 classifies the document structure instances of the document under analysis 132 based on whether the document structure instances contain associated instance class search terms 1916 (2008). For example, the classification logic 1902 may be operable to operable to search for instance class search terms 1916 in one or more document structure instances. The ontology analysis system 1900 may also maintain a set of instance classifications 1904 that may be identifiers or other data that assign one or more classes to a document structure instance.

After classifying the document structure instances, the ontology analysis system 1900 may then use the relationship analysis logic 1906 to determine whether there are horizontal class definition relationships between the document structure instances using the instance classifications 1904 and the ontology model 1800 (2010). The ontology analysis system 1900 may also communicate with an inference engine 106 to classify the document structure instances or to analyze the class definition relationships between the document structure instances.

Following the classification (2008) and relationship analysis (2010) of the document structure instances, the ontology analysis system 1900 may output an analysis result showing the results of the classification and relationship analysis (2012). As one example of an analysis result, the ontology analysis system 1900 may insert a relationship notification message into the document the document under analysis 132. Additional types of analysis results are also possible.

The description above explained the role of several types of glossaries 140-146, such as the agent glossary 140 that defines permissible agents. In addition to the glossaries 140-146, the document analysis, commenting, and reporting system 102 may also include other types of glossaries, such as a requirements relationship glossary. FIG. 21 shows one example of a requirements relationship glossary 2102. The requirements relationship glossary 2102 may define relationships between classes of an ontology model. The requirements relationship glossary 2102 may also define relationships between the structure category components of a document structure instance.

In one implementation, the requirements relationship glossary 2102 includes a class category 2104, a parent class category 2106, a keywords category 2108, and a relationship category 2110. Other implementations of the requirements relationship glossary 2102 may include other categories. The class category 2104 may identify a class from an ontology model. The parent class category 2106 may identify a parent class for a given class from the class category 2104. The keywords category 2108 may include keywords that facilitate analysis of document structure instances. Examples of keywords associated with an authentication class may include "password," "token," "authentication," and "Kerberos." The keywords may be used to associate document structure instances with a class. Alternatively, or in addition, the keywords may be used to associate a structure category component with a class. The relationship category 2110 may identify whether the given class has a relationship with another class. For example, a security class structure category component may affect a time structure category component.

Figure 22:
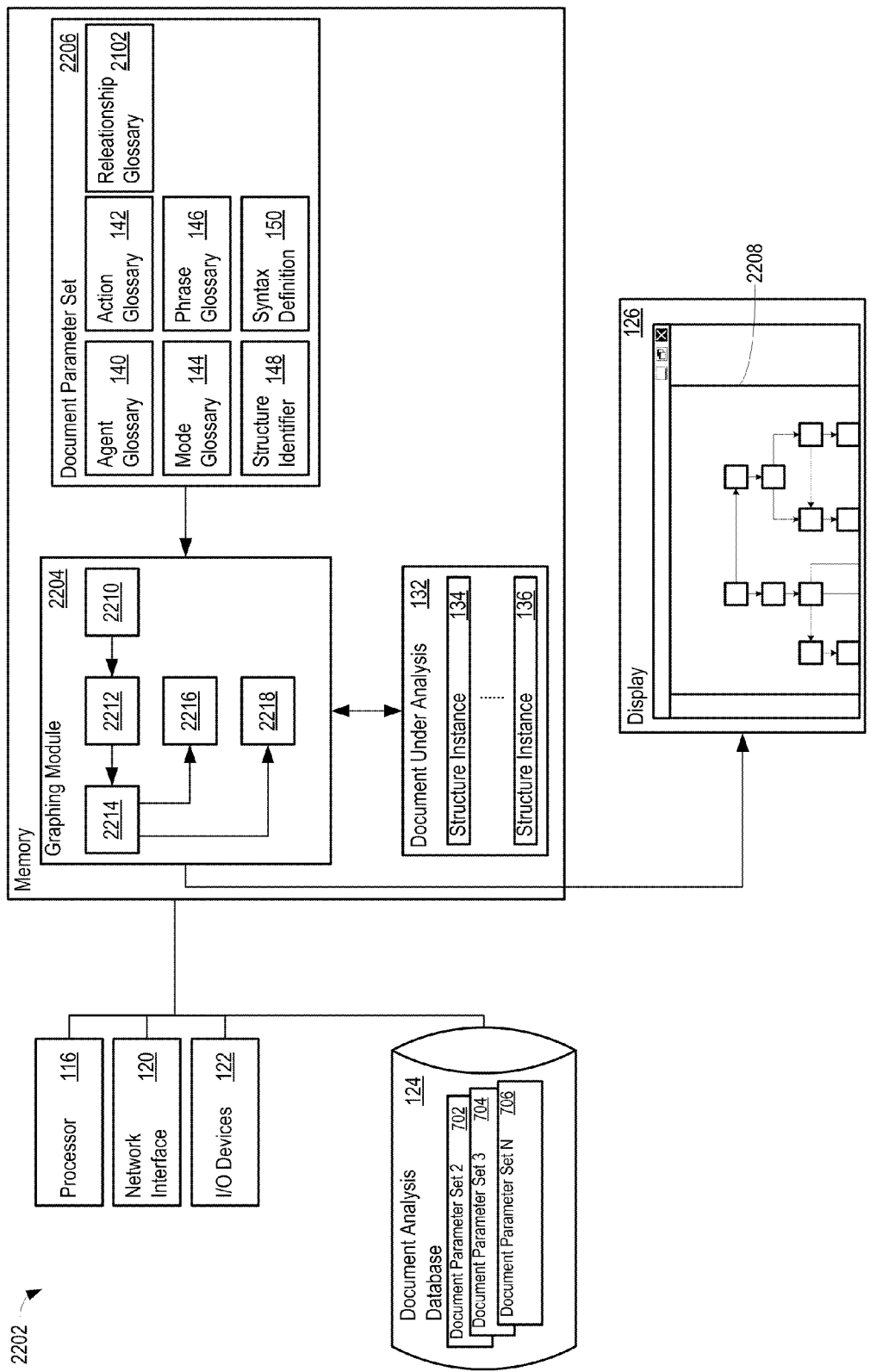
FIG. 22 shows a requirements graphing system.

FIG. 22 is an example of a requirements graphing system 2202. In the example shown in FIG. 22, the requirements graphing system 2202 includes a graphing module 2204 in communication with a document under analysis 132 and a document specific parameter set 2206. The graphing module 2204 may also be in communication with the document analysis database 124 to retrieve one or more document specific parameter sets 706-708. In one implementation, the graphing module 2204 is in communication with the document parameter set 2206 that includes the agent glossary 140, the mode glossary 144, the structure identifiers 148, the action glossary 142, the phrase glossary 146, the syntax definitions 150, and the relationship glossary 2102. The graphing module 2204 may also be in communication with the processor 116, the network interface 120 and various other input/output devices 122. As shown in FIG. 22, the graphing module 2204 is in communication with the display 126, which may display an electronic representation 2208 of an ontology hierarchy for the document under analysis 132.

Although the graphing module 2204 is shown as integrated as part of the requirements graphing system 2202, the graphing module 2204 may be integrated as part of any other system. For example, the graphing module 2204 may be incorporated into the document analysis, commenting, and reporting system 102, the requirements analysis system 702, the requirements commenting system 1002, the report generator system 1302, or the ontology analysis system 1900. In other implementations, the graphing module 2204 is accessed through remote procedure calls, web services, or other interfaces to obtain an image to render on the display 126.

The graphing module 2204 includes logic that generates or modifies an ontology hierarchy using the document parameter set 2206 and the document instances 134-136 of the document under analysis 132. For example, the graphing module 2204 may first identify a document structure instance in the document under analysis 132 (2210). The graphing module 2204 may then select or identify a structure category component from the identified document structure instance, such as an agent action or other structure category component (2212). Thereafter, the graphing module 2204 may generate an ontology hierarchy that includes the identified structure category component (2214). In one implementation, the graphing module 2204 is operative to generate an ontology hierarchy that includes each of the structure category components from an identified document structure instance (2216). In another implementation, the graphing module 2204 is operative to generate an ontology hierarchy that includes each of the structure category components from each of the document structure instances 134-136 from the document under analysis 132 (2218).

In a further implementation, the graphing module 2204 generates a core ontology hierarchy that has common root classes, child classes, and relationships. The graphing module 2204 may be configured to use the core ontology hierarchy to generate a document specific ontology hierarchy. For example, the graphing module 2204 may access the various glossaries, such as the agent glossary 140 and the action glossary 142, to modify the core ontology hierarchy to include agent and action classes and instances specific to agent glossary 140 and the action glossary 142. The graphing module 2204 may then access relationship glossary 2102 to build types and establish relationships between the classes of the modified core ontology hierarchy. Thereafter, the graphing module 2204 may extract the structure category components from the document structure instances 134-136 to add instances or identifiers of the document structure instances to the modified core ontology hierarchy. In other implementations, the graphing module 2204 may be configured to communicate with other modules, such as the analysis module 126, to add instances or identifiers of the document structure instances 134-136 to the modified core ontology hierarchy. The modified core ontology hierarchy may then be assigned as the document specific ontology hierarchy.

The graphing module 2204 may display one or more ontology hierarchies as output 2208 on the display 126. For example, the graphing module 2204 may display the core ontology hierarchy, the document specific ontology hierarchy, or any other hierarchy. The hierarchies may be displayed at any time including while being generated by the graphing module 2204, after being generated by the graphing module 2204, or being retrieved from another source, such as a memory device or other computer system.

Figure 23:
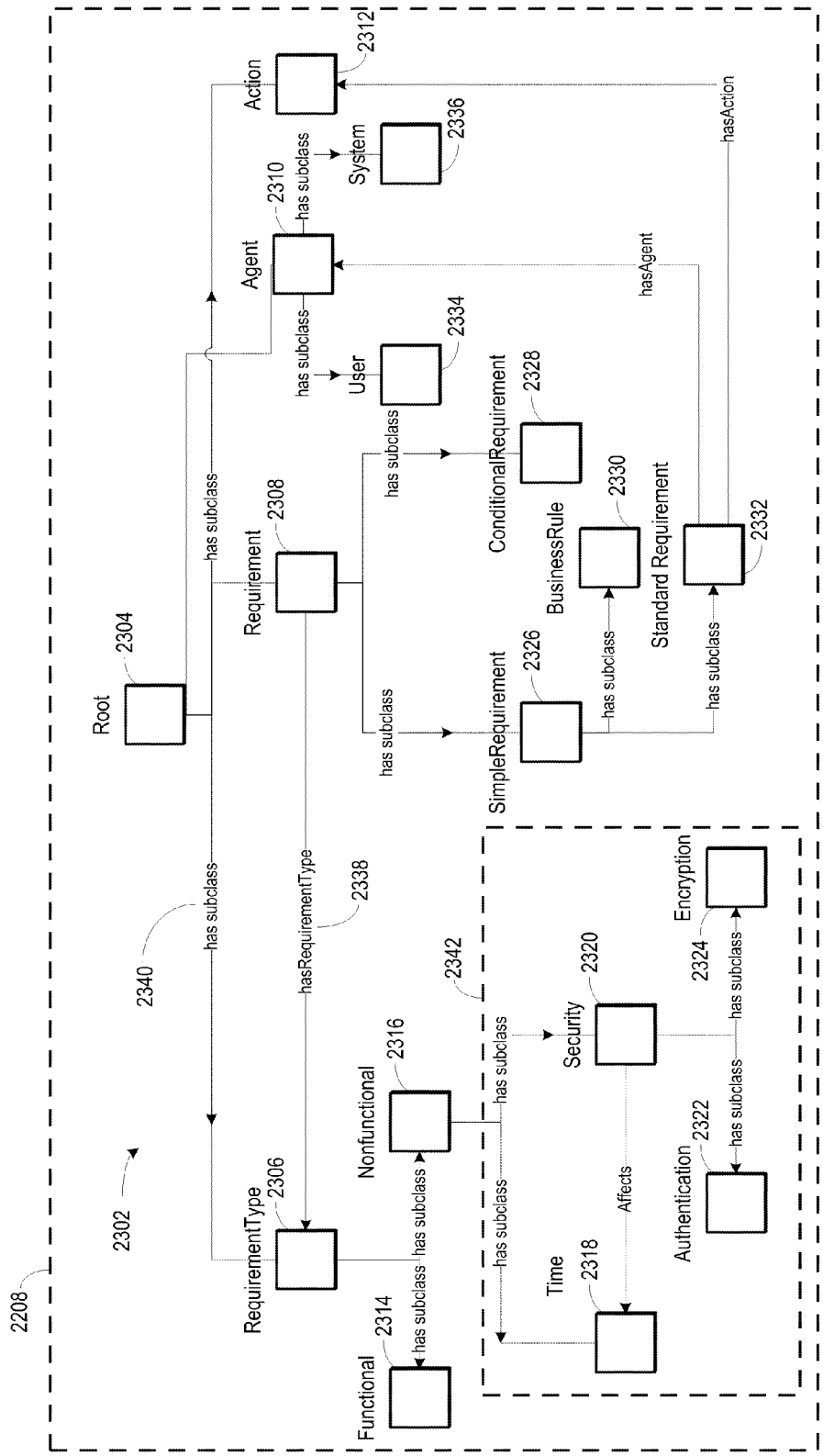
FIG. 23 shows an example of a core ontology hierarchy.

FIG. 23 shows one example of a core ontology hierarchy 2302. The core ontology hierarchy 2302 may be preconfigured or generated by the graphing module 2304. In one implementation, the core ontology hierarchy 2302 is generated as the output 2208. In general, the core ontology hierarchy 2302 illustrates the various relationships between classes of requirements. The core ontology hierarchy 2302 may be described using the OWL Web Ontology Language. However, the core ontology hierarchy 2302 may also be described using other languages such as the Resource Description Framework (RDF) or the Knowledge Interchange Format (KIF).

The core ontology hierarchy 2302 comprises document structure instance classes related as root classes and child classes. For example, FIG. 23 shows that the core ontology hierarchy 2302 starts with a root requirement class 2304 and that the root requirement class 2304 has four child classes: a RequirementType class 2306, a Requirement class 2308, an Agent class 2310, and an Action class 2312. The RequirementType class 2306 also has two child classes: a Functional class 2314 and a Nonfunctional class 2316. The Nonfunctional class 2316 is also a root class for two child classes: a Time class 2318 and a Security class 2320. The Security class 2320 also has two child classes: an Authentication class 2322 and an Encryption class 2324.

The Requirement class 2308 also has child classes. In one implementation, the Requirement class has a SimpleRequirement class 2326 and a ConditionalRequirement class 2328. The SimpleRequirement class 2326 has two child classes: a BusinessRule class 2330 and a Standard Requirement class 2332.

Like the Requirement class 2308, the Agent class 2310 has a User class 2334 and a System class 2336 as child classes. The Action class 2312 may or may not have child classes.

The subclasses for a parent class may be different depending on the context of the ontology hierarchy. For example, examples of other Nonfunctional classes include a SecureTokens class, a MessagingProtocol class, or other classes. The other parent classes may also have alternative subclasses depending on the context of the ontology hierarchy as well. Table 4 below lists some of the classes illustrated by the core ontology hierarchy 2302. In other implementations, the core ontology hierarchy 2302 includes alternative classes.

TABLE 4

| Class | Description |
| --- | --- |
| Root | The root of the ontology model |
| RequirementType | A class that defines the type of requirement |
| Requirement | A class that defines a requirement |
| Agent | A class that defines agents |
| Action | A class that defines actions |
| Functional | A class that defines functional requirements |
| Nonfunctional | A class the defines non-functional requirements |
| Time | A class that defines time |
| Security | A class that defines security |
| Authentication | A class that defines authentication |
| Encryption | A class that defines encryption |
| SimpleRequirement | A class that defines all requirements that are not conditional |
| ConditionalRequirement | A class that defines conditional requirements |
| BusinessRule | A class that defines those requirements that are business rules |
| StandardRequirement | A class that defines the standard requirement having the form: [agent] [modal] [word] [action] [rest] |
| User | A class that defines a user |
| System | A class that defines a system |

FIG. 23 also shows that the core ontology hierarchy 2302 defines class relationships between the root classes and their associated child classes. For example, FIG. 23 shows that the ontology model 2302 includes a horizontal class definition relationship 2338 and a vertical class definition relationship 2340. In general, horizontal class definition relationships define relationships between classes unrelated to hierarchy, and vertical class definition relationships define hierarchical relationships between classes. In the example shown in FIG. 23, the horizontal class definition relationship is a "hasRequirementType" relationship, and shows that the requirement class 2308 has a requirement type of the RequirementType class 2306. In addition, FIG. 23 shows that the vertical class definition relationship 2340 is a "has subclass" relationship that shows that the time root requirement class 2304 has four child classes. These relationships are not exhaustive and other relationships are also possible. Examples of class definition relationships are shown below in Table 5.

TABLE 5

| Relationship | Description |
| --- | --- |
| Affect | Classifications that affect each other. |
| Contradict | Classifications that contradict each other |
| Dependency | Classifications that depend on each other |
| Implement | Classification that implements a higher-level classification |
| Similarity | Classifications that are similar to each other |
| isA | Classifications that are special cases of other classifications |
| has subclass | Classifications where a subclass is a specialization of the parent class. For example, a "parent" is a sub-class of "human", which means that "parent" is a special sub-group of all "humans" that are parents |
| hasRequirementType | Classifications that define the type of the requirement. In general, the class may be a Functional class or a Nonfunctional class. I |
| hasAgent | Classifications where the class is the agent of the requirement. |
| has instance | Classifications that instances of a class. In other words, the instance classification is the specific form of the general class that the instance class is instantiating. |

TABLE 5-continued

| Relationship | Description |
| --- | --- |
| hasAction | Classifications where the class is the action of the requirement. |
| Affects | Classifications that affect each other. |
| hasSecondaryAgent | Secondary agent of a requirement |
| hasEncryptionAlgorithm | EncryptionAlgorithm used by the System (e.g. SSH, RSA) |

The core ontology hierarchy 2302 may include, or be integrated with, one or more domain specific ontologies. The domain-specific ontology may include one or more domain-specific classes. For example, the core ontology hierarchy 2302 includes a domain-specific ontology 2342 that comprises a Time class 2318, a Security class 2320, an Authentication class 2322, and an Encryption class 2324.

The domain-specific ontology 2342 is associated with the Nonfunctional class 2316 of the core ontology hierarchy 2302. Other examples of domain-specific ontologies include a mobile domain-specific ontology that has classes associated with mobile devices and an SAP system domain-specific ontology associated with SAP systems. Other domain-specific ontologies may be configured for other systems as well. The domain-specific ontologies may be associated with other classes. For example, the core ontology hierarchy may have a domain-specific ontology associated with the Functional class 2314, a domain-specific ontology associated with the Requirement class 2308, a domain-specific ontology associated with the Agent class 2310, and a domain-specific ontology associated with the Action class 2312. In other words, a domain-specific ontology may be associated with any class of the core ontology hierarchy 2302.

Figure 24:
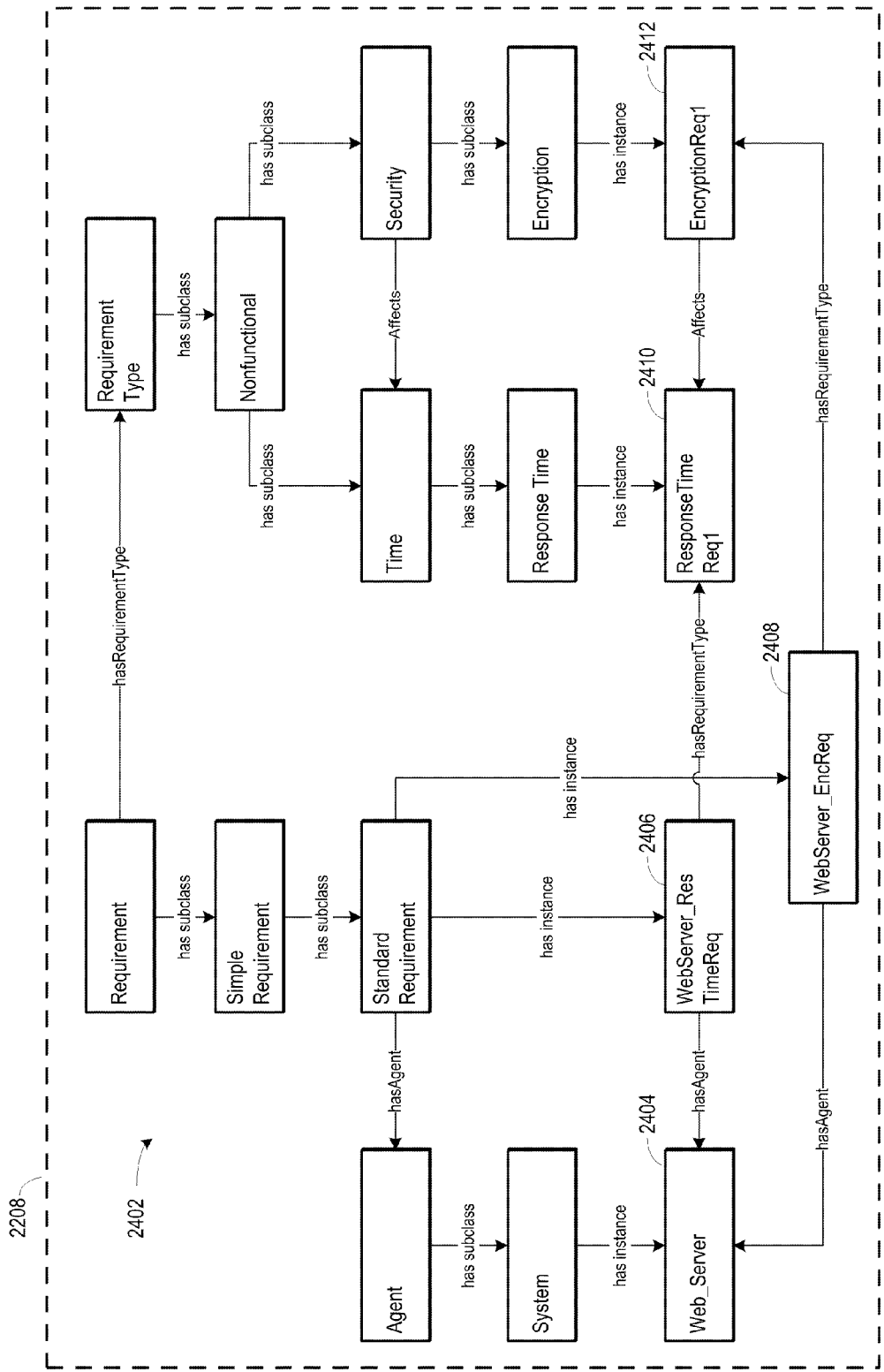
FIG. 24 shows an example of a document specific ontology hierarchy.
Figure 28:
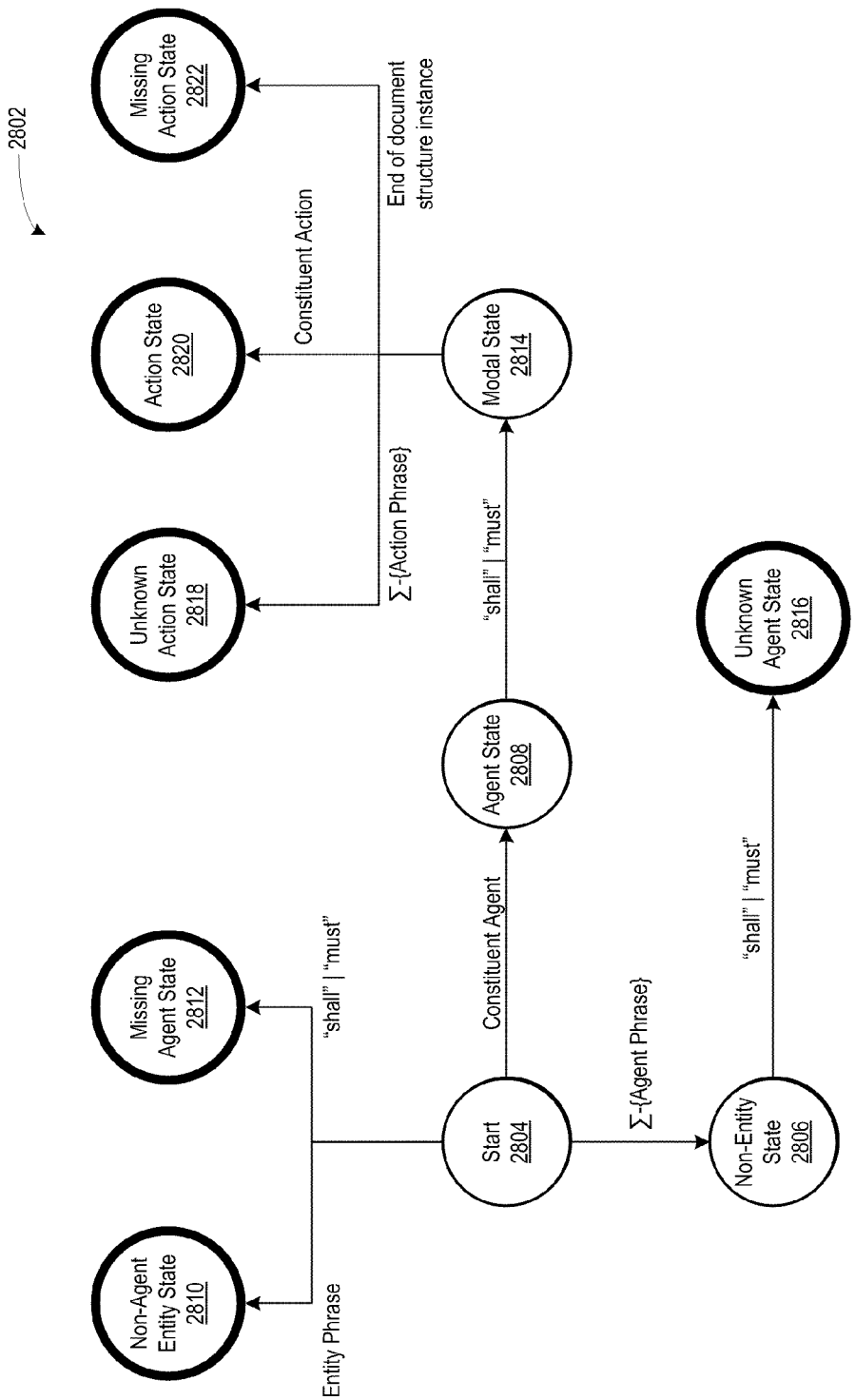
FIGS. 28-35 show examples of state machines employed by the requirements analysis system in evaluating document structure instances.
Figure 29:
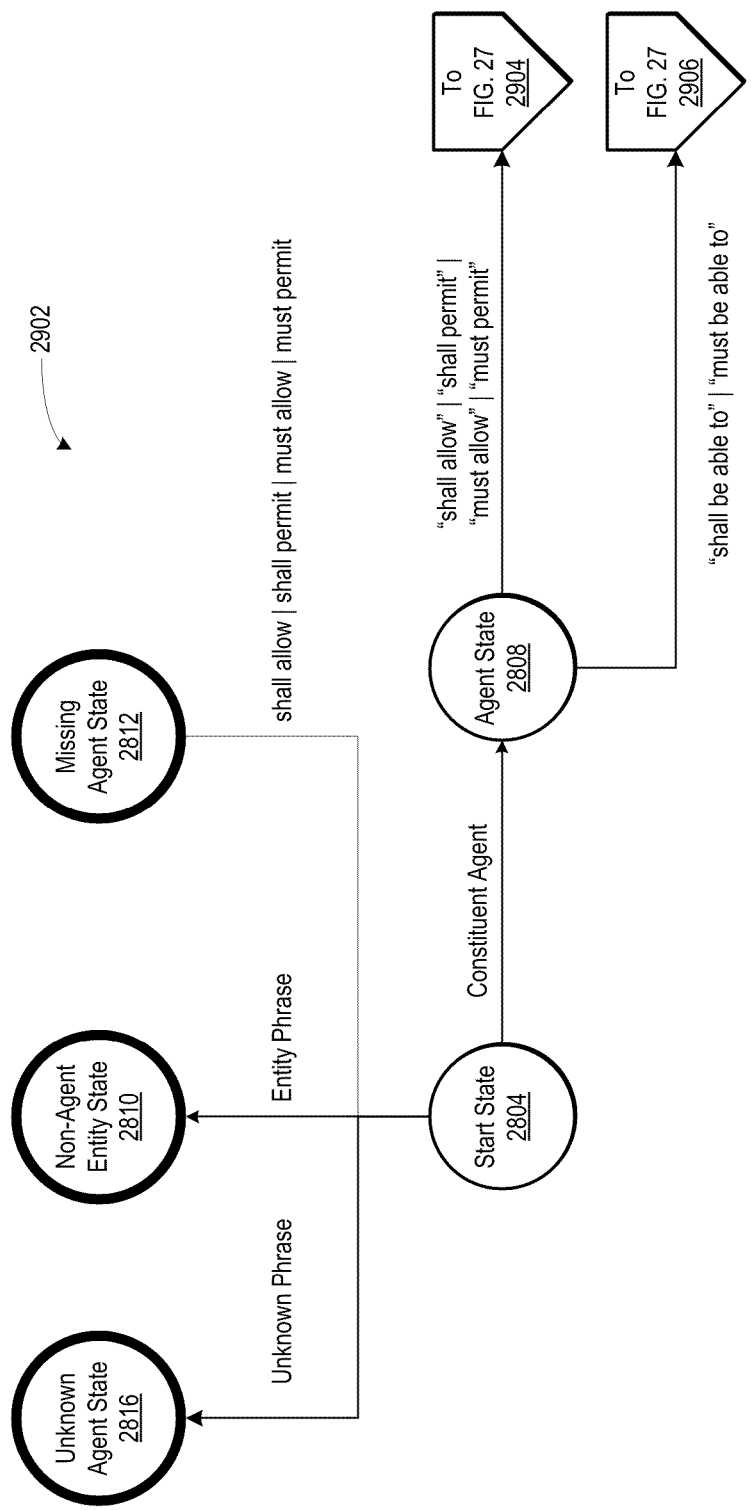
Figure 30:
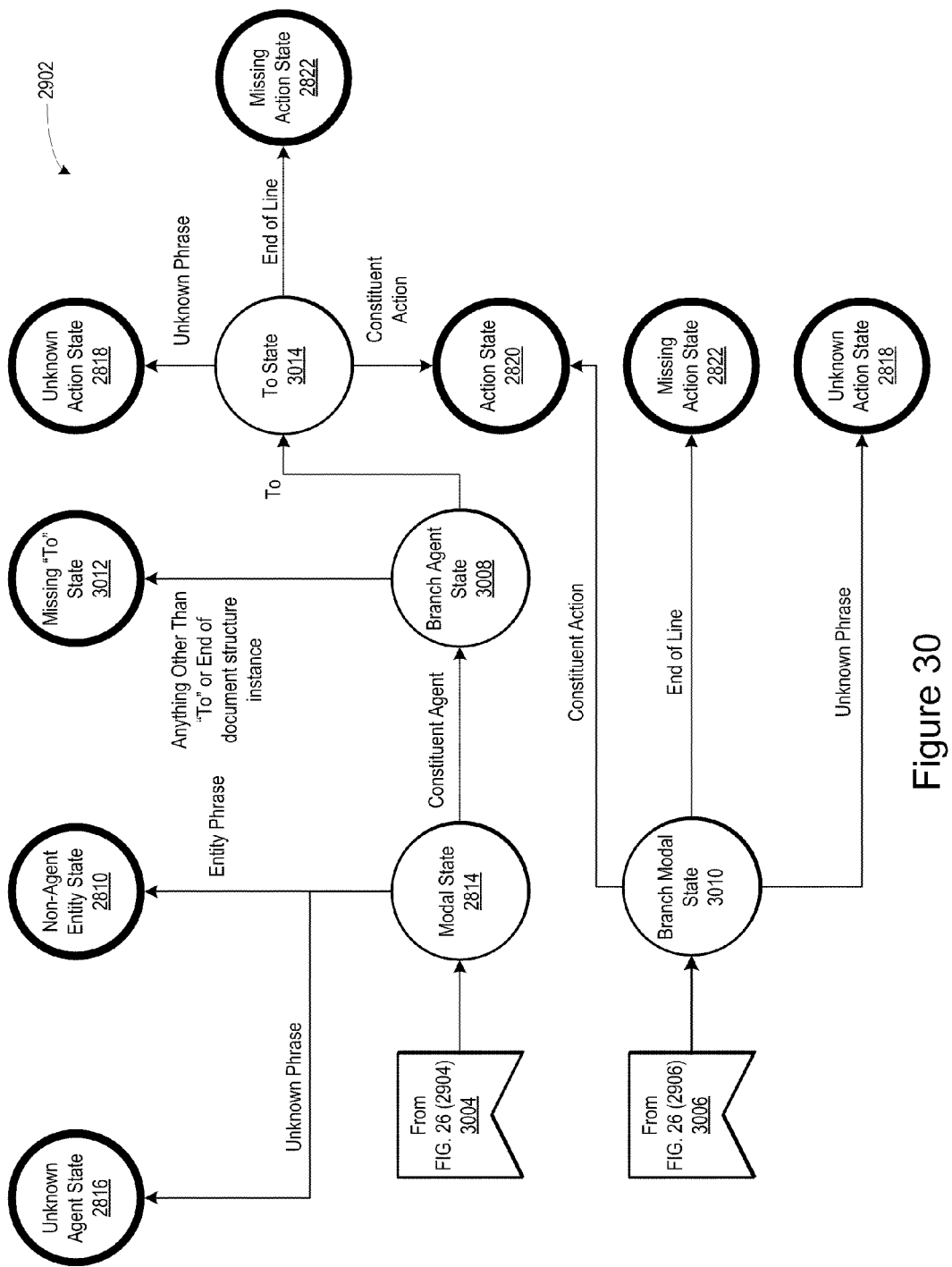
Figure 31:
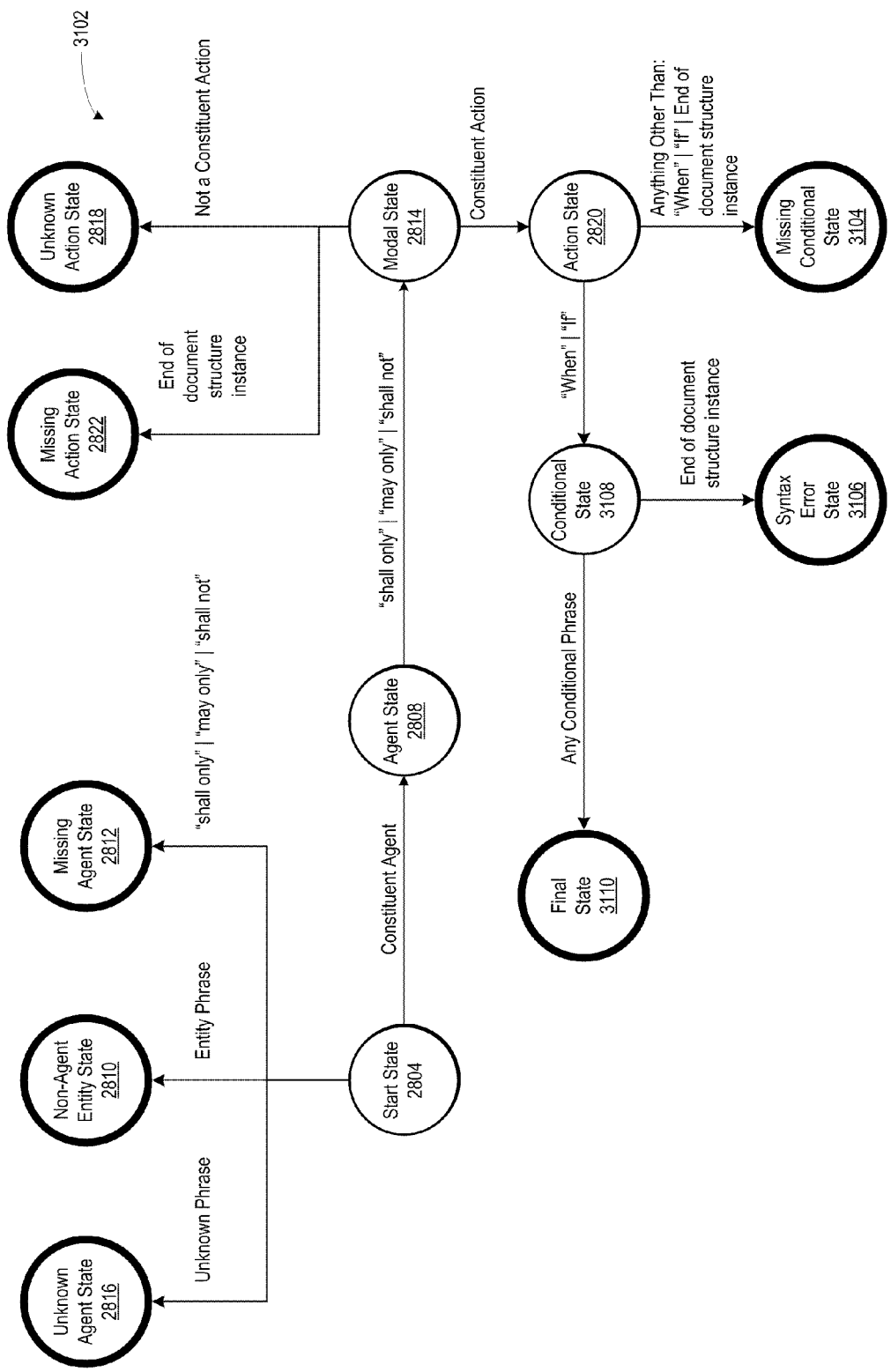
Figure 32:
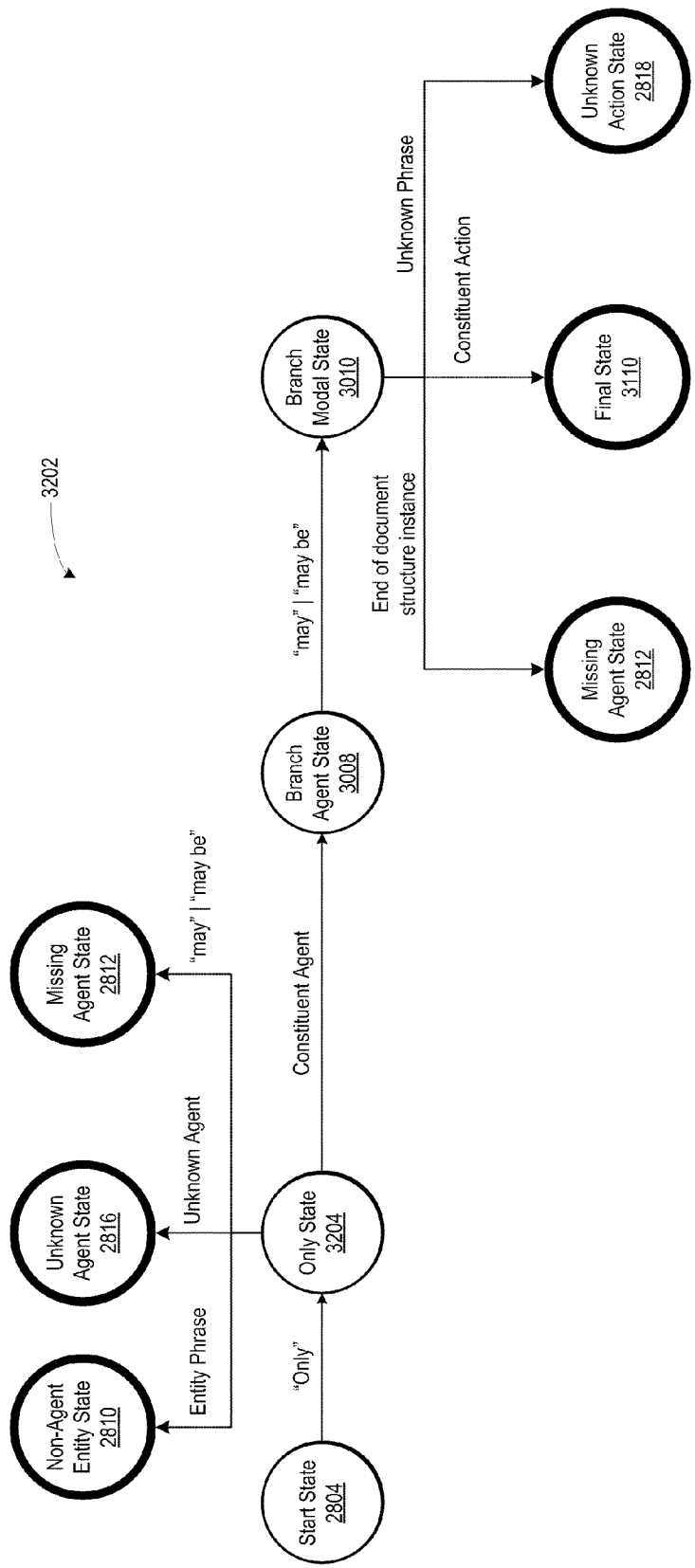
Figure 33:
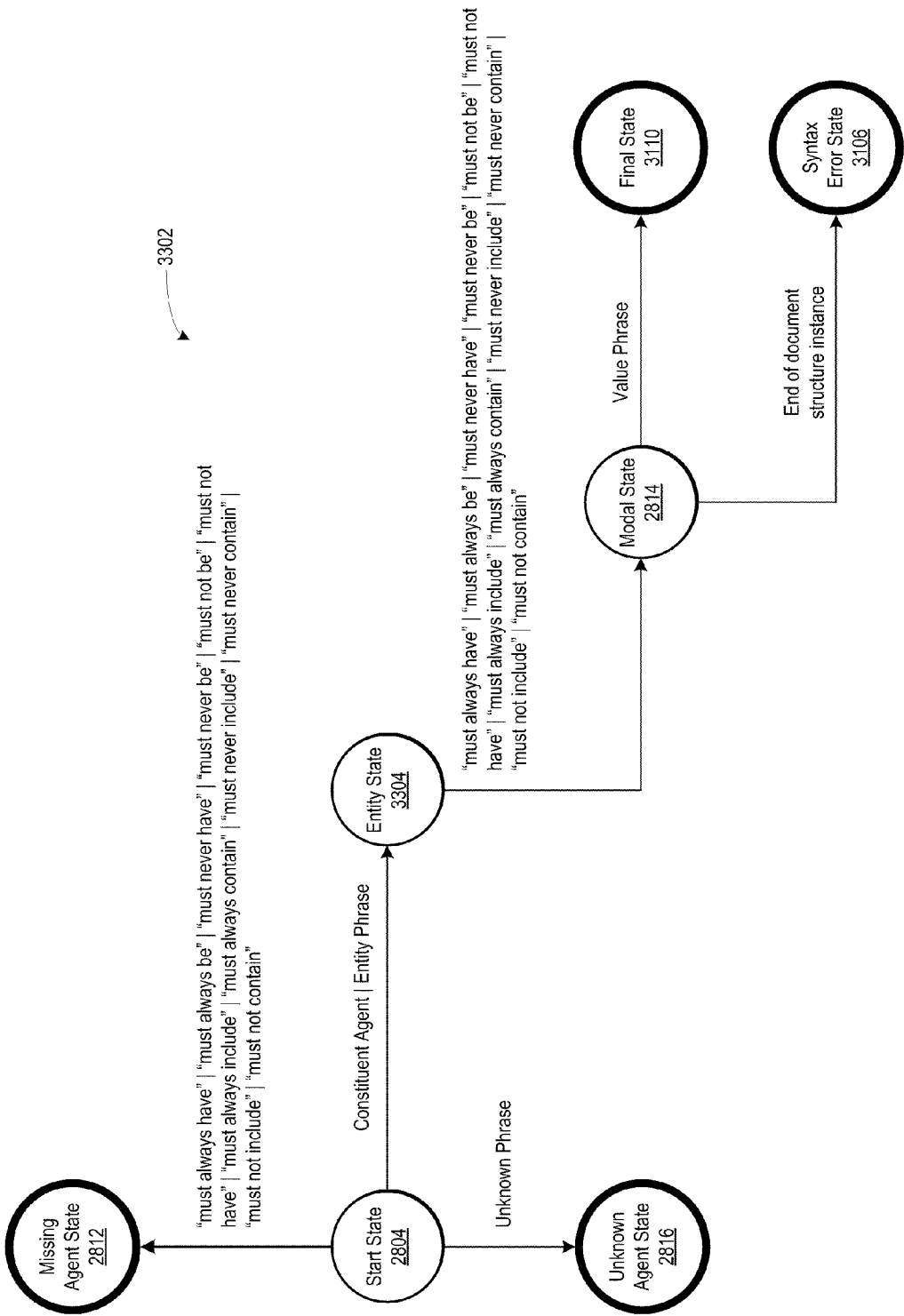
Figure 34:
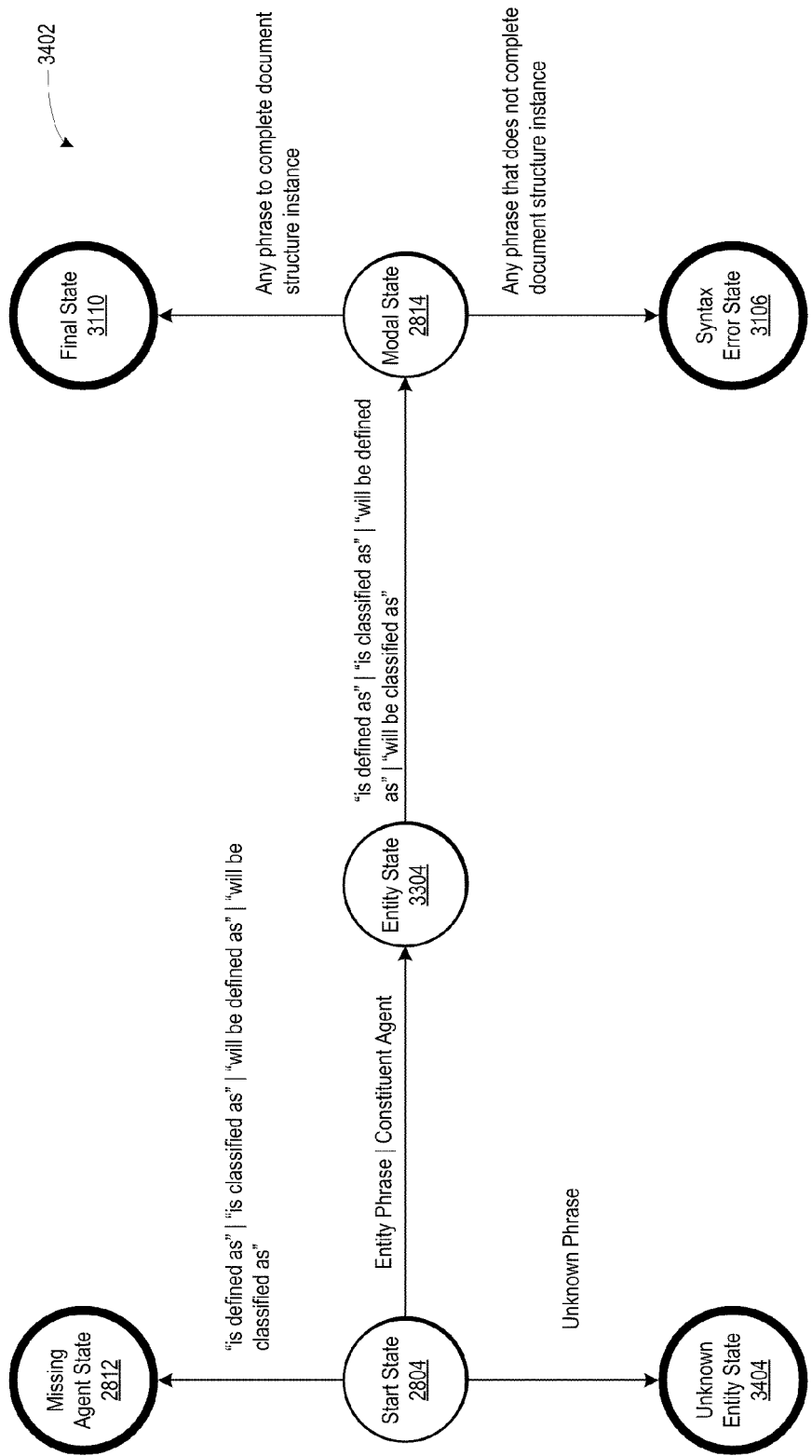
Figure 35:
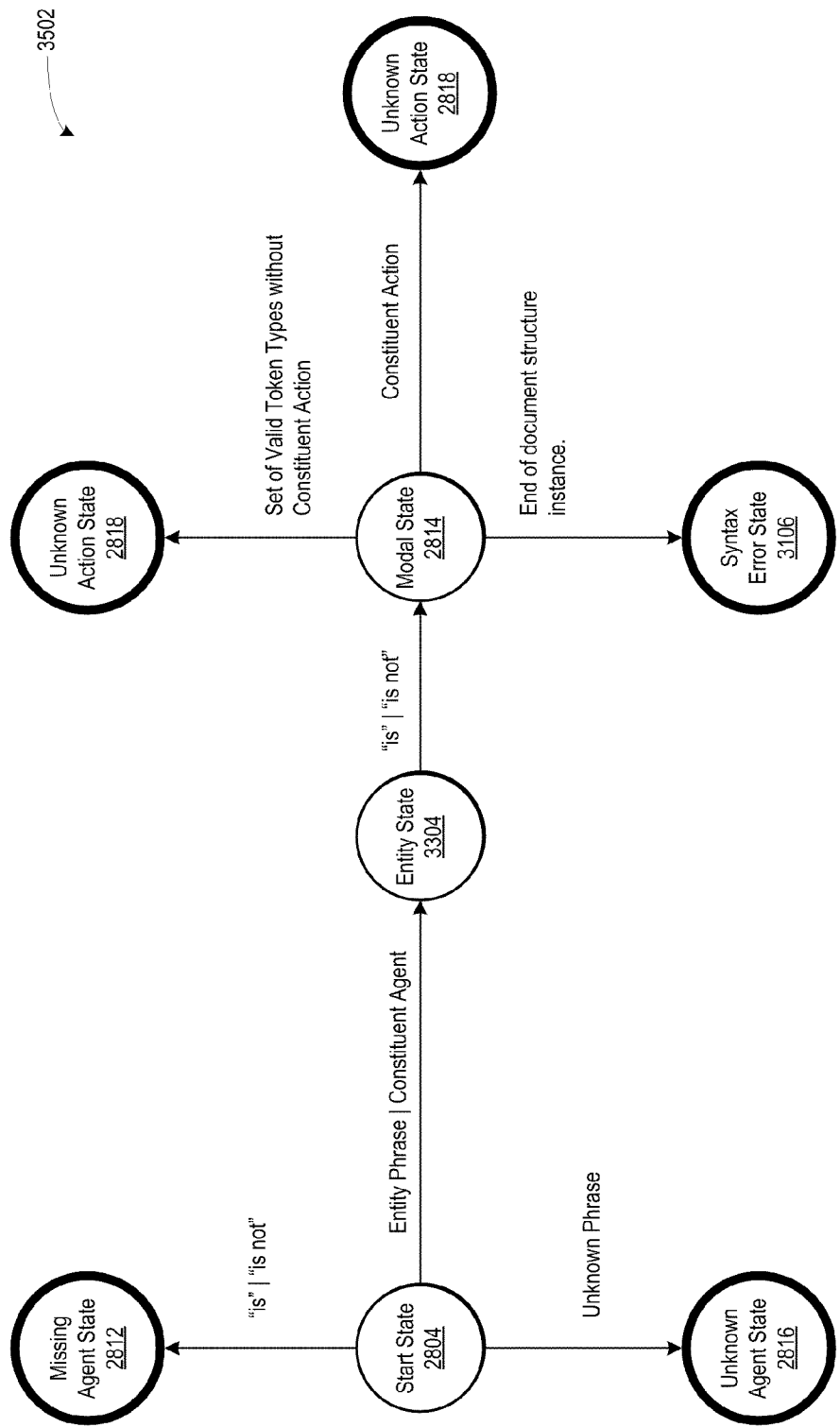

As discussed above, the graphing module 2204 is operative to generate a document specific ontology hierarchy using the document under analysis 112 and the core ontology hierarchy 2302. FIG. 24 illustrates an example of a document specific ontology hierarchy 2402. In the example shown in FIG. 24, the document specific ontology hierarchy 2402 generates the document specific ontology hierarchy 2402 using the following two document structure instances: 1) The Web Server shall encrypt all of its responses using SSH; and 2) The Web Server shall have a response time of 5 milliseconds or less.

The document specific ontology hierarchy 2402 includes hierarchy instance identifiers 2404-2412 that identify and establish relationships between the structure category components of these two document structure instances. For example, the document specific ontology hierarchy 2402 includes an agent hierarchy instance identifier 2404 that identifies the agent "Web Server," a standard requirement hierarchy instance identifier 2406 that identifies the response time of 5 milliseconds, a standard requirement hierarchy instance identifier 2408 that identifies the document requirement that the Web Server agent has an encryption requirement of SSH, response time hierarchy instance identifier 2410 that identifies an instance of the response time parent class, and an encryption hierarchy instance identifier 2412 that identifies an instance of the encryption parent class.

The document specific ontology hierarchy 2402 provides a powerful and informative graphical overview of the relationships between the classes of the core requirement ontology 2302 and the document structure instances 134-136. Given the large size of requirements documents, the graphing module 2204 may provide information about the various systems being referred to in the requirements document.

The requirements graphing system 2202 may interact with any other systems, such as requirements analysis system 702, the requirements commenting system 1002, the ontology analysis system 1900, or any other system, to provide information relating to the document structure instances. For example, the document specific ontology hierarchy 2402 may be queried to provide information about the document structure instances using one or more query languages, such as a SPARQL. In one implementation, the following SPARQL query may be passed to the document specific ontology hierarchy 2402 to determine if there are any relationships between the document structure instances:

```
select ?req1, ?req2 where
 { ?req1 hasRequirementType ?type1
   ?req2 hasRequirementType ?type2 .
   Affects domain ?type1 .Affects range ?type2 .
   ?req2 hasAgent ?agent2 .?req1 hasAgent ?agent1
   filter( ?agent1 = ?agent2)}
```

Although the query to the document specific ontology hierarchy 2402 may be in any language, the above SPARQL query returns all requirements for the same agent that have requirement types that affect each other.

The requirements graphing system 2202, or any of the other systems, may also support additional queries. For example, the requirements graphing system 2202 may support a system-interaction query that identifies systems that interact with each other. The system-interaction query may be configured to return or display all requirements that have a system agent as a primary agent and a system agent as the secondary agent.

Consider the following document structure instance: The Web Server shall send the vendor data to the SAP System. In this document structure instance, the Web Server is the primary agent and the SAP System is the secondary agent. Both of these systems may be classified in the agent glossary 140 so that the requirements graphing system 2202 may determine that these systems are interacting with each other. One example of a system-interaction query is below:

```
select ?req1 ?agent1 ?agent2
where {
       ?req1 hasAgent ?agent2 .
       ?req1 hasSecondaryAgent ?agent2.
       ?agent1 RDF:type System.
       ?agent2 RDF:type System.
       filter( ?agent1 != ?agent2)
}
```

As explained with reference to FIGS. 36-47, the requirements graphing system 2202, or any other system described herein, may generate many different types of maps for visualizing the relationships between entities.

The requirements graphing system 2202 may also support identifying systems that are missing non-functional requirements. In general, there is often the case that a system may require a particular requirement to be identified. The required requirement for the system may not be identified in the requirements document. The requirements graphing system 2202 may accept a non-functional requirement identification query that returns all systems which are missing a certain kind of non-functional requirement. Examples of non-functional requirements include: security, performance, reliability, usability, integration and data requirements. Each of these non-functional requirements may also include additional or sub-requirements that are non-functional requirements.

Figure 36:
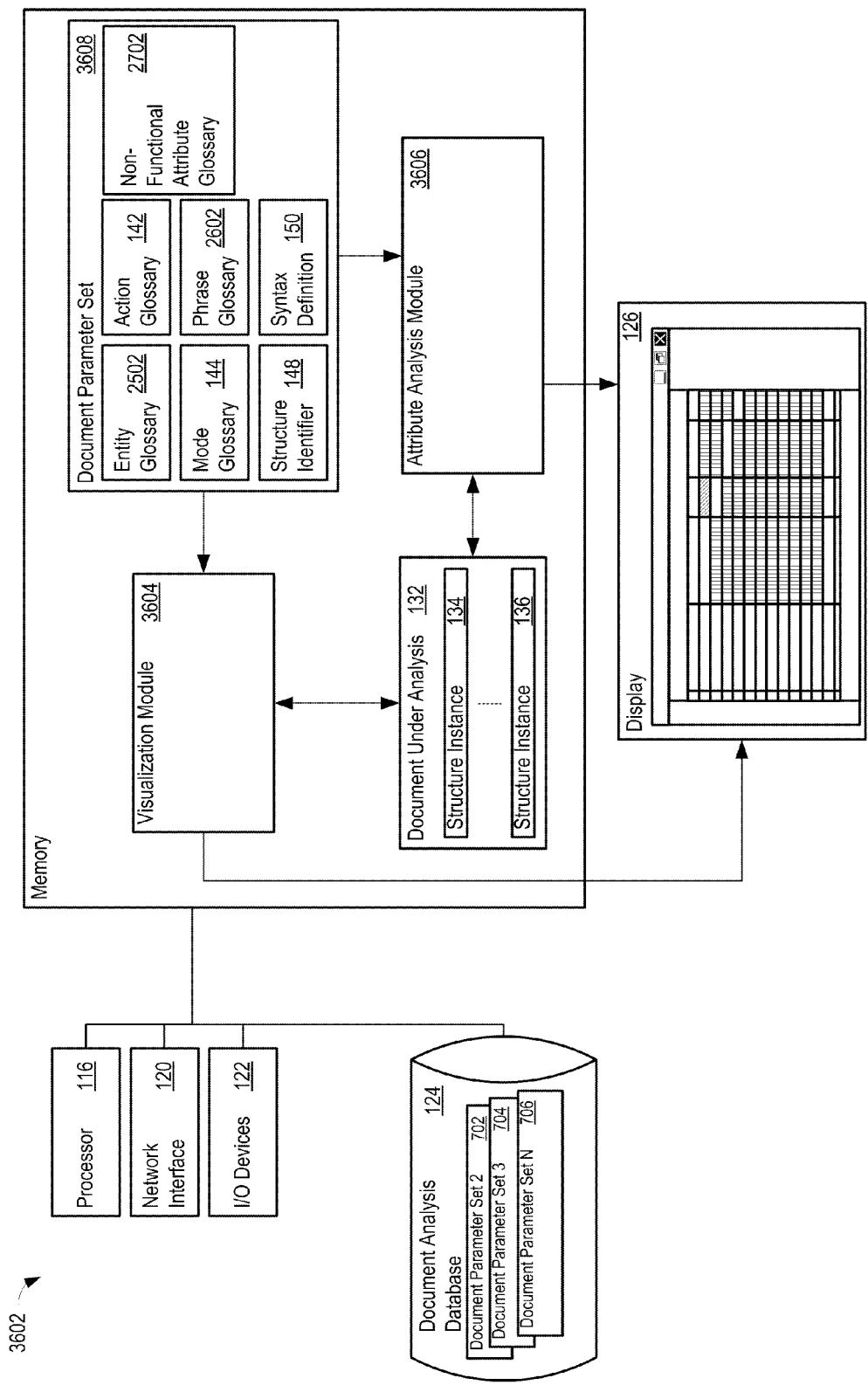
FIG. 36 shows an example of a requirements visualization system.
Figure 48:
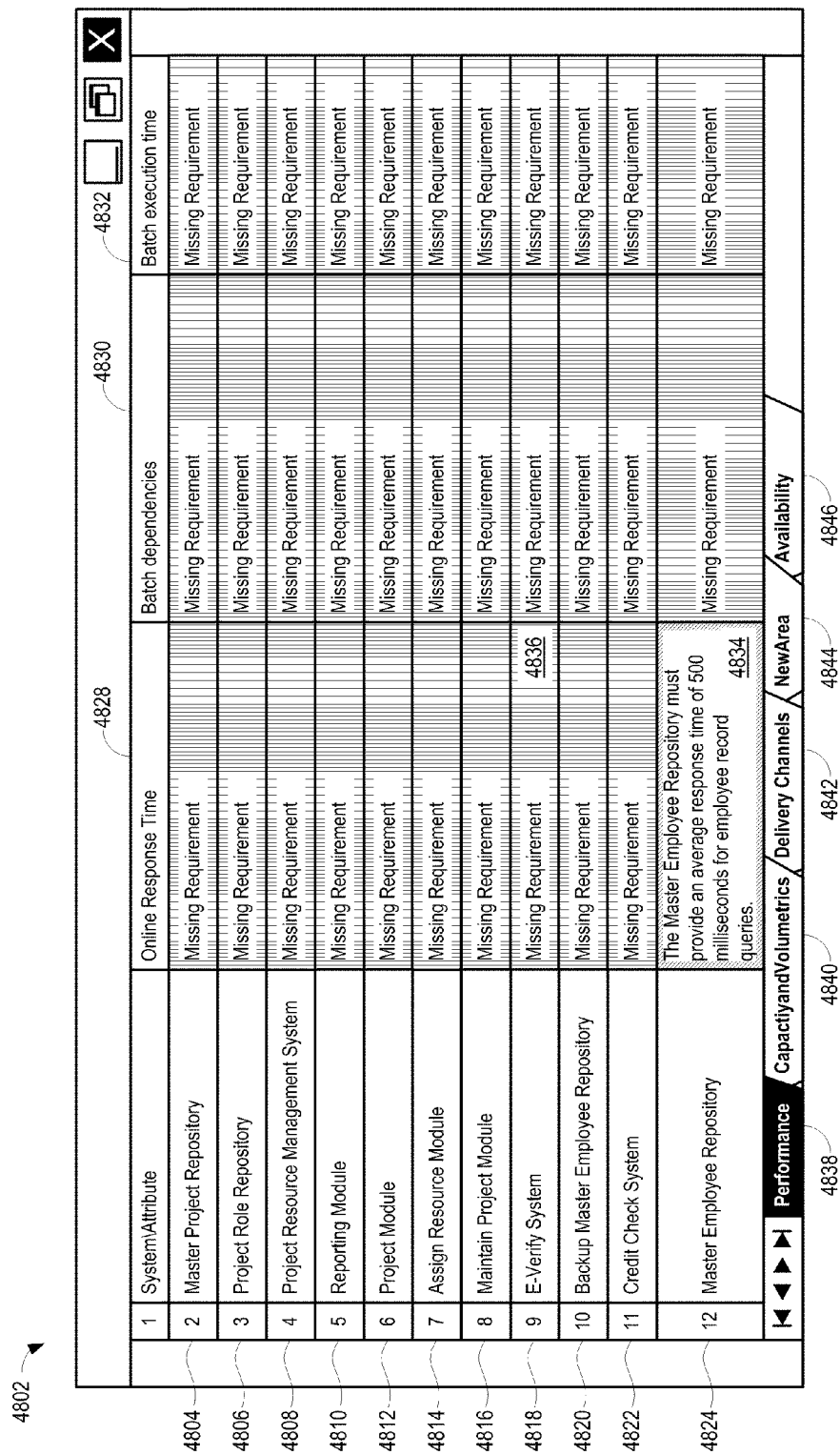
FIG. 48 shows an example of an attribute requirement report.

Other non-functional requirements are also possible. FIGS. 27, 36 and 48 below provide additional detail regarding non-functional requirements, non-functional attributes, and other features directed to a non-functional analysis.

One example of a non-functional requirement identification query is below:

```
Function DetectMissingRequirements
Start
        For each agent in AgentGlossary
                For each NonFunctionalRequirementType in
                RequirementsOntology
                        ExecuteQuery
                                (agent, nonFunctionalRequirementType)
                End For
        End For
End
Function ExecuteQuery (agent, nonFunctionalRequirementType)
Start
        AskQueryString =
                "Ask {" +
                        "req hasAgent agent ;" +
                        "req hasRequirementType
                        nonFunctionalRequirementType"+
                "}"
        Result = Model.executeQuery (AskQueryString)
        If result = false
                Print "Agent" + agent + "is missing non-functional
                requirement type" + nonFunctionalRequirementType
End
```

The requirements graphing system 2202 may also support identifying interacting systems that do not have compatible security profiles. In one implementation, the requirements graphing system 2202 supports a security profile identification query that determines whether interacting systems have similar protocol requirements. For example, consider the case where one system has a requirement for supporting a certain kind of encryption, while an interacting system does not have any requirement for the same kind of encryption. In this example, the requirements graphing system 2202 identifies out that there is the potential for a security-based incompatibility. One example of a security profile identification query is below:

```
select ?agent1 ?agent2
where {
        ?req hasAgent ?agent2 .
        ?req hasSecondaryAgent ?agent2.
        ?agent1 RDF:type System.
        ?agent2 RDF:type System.
        ?agent1 hasRequirementType ?EncryptionReq1.
        ?agent2 hasRequirementType ?EncryptionReq2.
        ?EncryptionReq1 RDF:type Encryption.
        ?EncryptionReq2 RDF:type Encryption.
        ?EncryptionReq1 hasEncryptionTechnique? ?technique1.
        ?EncryptionReq2 hasEncryptionTechnique? ?technique2.
        filter( ?agent1 != ?agent2 and ?technique1 != ?technique2)
}
```

In the query implemented above, the query identifies two interacting system (denoted by "?agent1" and "?agent2" in the SPARQL query) that do not use the same encryption technique. For example, if the first system, that is system 1, (i.e., "?agent1") interacts with the second system, that is system 2, (i.e., "?agent2"), and the first system uses the RSA encryption technique and the second system uses the SSH protocol, then the above query returns "system 1" and "system 2". The above query is one example for identifying security profiles, but other queries are also possible for identifying other security attributes such as authentication, access control, or other attributes.

Note that in addition to these queries, the requirements graphing system 2202, or any other system, may be extended by adding other system-based analyses using additional queries.

In addition to the system-based analyses, the requirements graphing system 2202 may support analyses based on the role of an agent. For example, the requirements graphing system 2202 may be configured to accept queries for a particular domain. In one implementation, the requirements graphing system 2202 is operative to capture information in the domain ontologies about which agents are permitted to perform which actions. This may be used to ensure that all the requirements meet that constraint. Another variation of a similar analysis is "Separation of duty", as outlined in Sarbanes Oxley. The requirements document, or any other document under analysis, may be checked to see if the same agent may perform different roles (e.g. the purchasing manager may be the approving manager).

FIGS. 25-27 present alternative or additional types of glossaries. Although reference is made to system 102, any one of the systems described herein may use any one of the glossaries described herein for analyzing an electronic document or document structure instance.

In addition to, or instead of, using the agent glossary 140 for analyzing a document structure instance, the system 102 may use an entity glossary. In general, an entity glossary defines one or more permissible entities that may be found in a document structure instance.

FIG. 25 shows an example of an entity glossary 2502. Similar to the agent glossary 140, the entity glossary 2502 also defines permissible agents for the document structure instance. However, the entity glossary 2502 may be broader and more flexible than the agent glossary 140 because the entity glossary 2502 allows a user or system to define an entity type for the entity. For example, an entity may be defined as having the entity type "person," "system," "GenericEntity," "GenericAgent," or "GenericPerson." Other types of entity types are also possible. Hence, the entity glossary provides a robust mechanism for defining the entity type of an entity, which may be used by the system 102 to further determine whether a document structure instance comports with a particular syntax definition.

In the example shown in FIG. 25, the entity glossary 2502 defines an entity phrase field 2504, an explanation field 2506, an additional notes field 2508, an entity type field 2510, and a parent field 2512. The phrase field 2504 defines a phrase that denotes a permissible constituent entity for the structure instance syntax. For example, as shown in FIG. 25, one permissible phrase for an entity is "order portal" and another permissible phrase for an entity is "finance department user." Other permissible phrases may include "shipping module," "order details," or other phrases.

The explanation field 2506 may provide diagnostic information relevant to the entity, how the entity performs a particular job or function, or other entity related information. The explanation field 2506 may be used by the system 102 in providing meaningful information about the entity when a document structure instance is analyzed. The additional notes field 2508 may be used to provide additional information about the entity for a user editing or revising the entity glossary 2502 and, in one implementation, may not be used by the system 102 in analyzing a document structure instance. However, the system 102 may be configured to read from the additional notes field 2508 to provide further diagnostic or helpful information about an entity phrase appearing in a document structure instance.

The entity type phrase field 2510 facilitates the selection of the entity type for an entity phrase. As discussed above, in one implementation, the entity type selection options may include "person," "system," "GenericEntity," "GenericPerson," "GenericAgent" or other alternative entity types. As explained below with reference to FIGS. 36-47, the selected entity type may affect the analysis of a document structure instance and how a component visualization relationship map, a system visualization relationship map, or a sub-system visualization relationship map is generated. By providing for an entity type, the system 102 provides additional information regarding the interactions among entities described by the document structure instances.

Each of the entity type selection options may identify a different type of entity for the associated entity phrase. For example, the "person" entity type may define that the associated entity phrase identifies a person, such as a user of another entity described by a document structure instance. The "system" entity type may define that the associated entity phrase identifies a system, such as module, component, machine, or other type of system. The "GenericAgent" entity type may define that the associated entity phrase is neither a system nor a person. The "GenericAgent" entity type may alternatively define that the associated entity phrase is either or both a system and a person. Hence, the "GenericAgent" entity type is a flexible entity type that may be associated with either, both, or neither, a system or a person.

As explained previously with respect to other parent fields, such as the, parent field 206 or parent field 406, the parent field 2512 may be used to build hierarchies of entities.

The entity glossary 2502 may also define entities that are passive entities that are indirect nouns of a document structure instance. For example, a report, a data object, a listing, or other object that is acted upon may be a passive entity. Other types of passive entities are also possible. The entity glossary 2502 may define that the "GenericEntity" entity type identifies a entity phrase as passive entity type. For example, the "order details" entity phrase shown in FIG. 25 is associated with the "GenericEntity" entity type and may be considered by the system 102 as having a passive entity type.

In addition to the entity glossary 2502, the system 102 may employ an alternative problematic phrase glossary other than, or in addition to, the problematic phrase glossary previously described with reference to FIG. 5. FIG. 26 shows an example of an alternative problematic phrase glossary 2602. In one implementation, the alternative problematic phrase glossary 2602 includes a problematic phrase field 2604, an explanation field 2606, a suggestion field 2608, a template field 2610, and a category field 2612.

The alternative problematic phrase glossary 2602 provides a robust mechanism for identifying problematic phrases and for suggesting alternative language to correct for the problematic phrase. The problematic phrase field 2604 identifies one or more problematic phrases. The one or more problematic phrases may be grouped together, such as a where a set of problematic phrases share a common ambiguity, failing, or problem. For example, FIG. 26 shows that the problematic phrases "improved," "better," "faster," and "superior," have been grouped together. Grouping problematic phrases together may enhance the analysis of a document structure instance by providing a common suggestion for correcting a problematic phrase. In addition, grouping problematic phrases together reduces the time a user spends modifying and revising the problematic phrase glossary 2602 because the user may rely on using one suggestion for correcting a common set of problematic phrases. However, a problematic phrase may be stand-alone in the problematic phrase glossary 2602, such as in the case of the problematic phrases "efficiently," "none," and "easy to use." Alternative arrangements of problematic phrases are also possible.

The explanation field 2606 provides an explanation as to how a problematic phrase may be corrected, why a problematic phrase may not be used, or other explanations. The explanation field 2606 may refer the user to a suggestion provided by the suggestion field 2608 or another field of the problematic phrase glossary 2602. The suggestion field 2608 may provide a suggestion text that describes how the problematic phrase may be replaced, such as an alternative word or phrase instead of the problematic phrase. The system 102 may display the suggestion text appearing in the suggestion field 2608 when the system 102 identifies a problematic phrase.

The template field 2610 provides a quick and efficient mechanism for replacing identified problematic phrases. In addition, the words or phrases provided by the template field 2610 do not leave the user guessing as to which words or phrases would be more suitable than the identified problematic phrase. In one implementation, the template field 2610 provides a list of words or phrases that may replace an identified problematic phrase. For example, the words or phrases appearing in the template field 2610 may be displayed to a user, and a user may select one or more of the words or phrases from the template field 2610 for replacing a problematic phrase. Alternatively, or in addition, the system 102 may automatically replace a problematic phrase with one or more words or phrases appearing in the template field 2610 when a problematic phrase is identified.

The category field 2612 provides a mechanism for categorizing a problematic phrase. The system 102 may refer to the category field 2612 for providing metrics to the user as to the number and type of problematic phrases appearing in a document structure instance, in an electronic document, or both. Alternative reporting mechanisms may also refer to the category field 2612.

In addition to the aforementioned glossaries, the system 102 may refer to a non-functional attribute glossary for identifying whether one or more document structure instances provide for an attribute assigned to an entity in the entity glossary 2502. FIG. 27 shows an example of a non-functional attribute glossary 2702. The non-functional attribute glossary 2702 provides centralized management over attributes that should be assigned to one or more entities defined in one or more glossaries, such as entities defined in the entity glossary 2502.

In general, a non-functional attribute refers to a feature, condition, or characteristic of an entity. A non-functional attribute may define the amount of simultaneous users an entity may support, the amount of bandwidth available to an entity, the speed at which an entity is expected to perform an operation, or other non-functional attribute. A non-functional attribute may also be a non-functional requirement, which was previously discussed above. Other types of non-functional attributes are also possible.

The non-functional attribute glossary 2702 may include one or more fields for defining non-functional attributes. In one implementation, the fields of the non-functional attribute glossary 2702 include an area field 2704, a requirement field 2706, a notes field 2708, a sample field 2710, an indicator phrase field 2712, and an activatable element field 2714. Alternative arrangements of attribute fields are also possible.

The area field 2704 stores an attribute area assigned to the attribute requirement of the requirement field 2706. The attribute area of the area field 2704 may be user-defined, predefined within the non-functional attribute glossary 2702, or both. In one implementation, an attribute area is first defined in the requirement field 2706 with an associated attribute area identifier in the area field 2704. For example, FIG. 27 shows that the attribute area "Delivery Channels" first appears in the requirement field 2706 of the first row of the non-functional attribute glossary 2702, and that an associated attribute area identifier, "Non-Functional," identifies that the phrase "Delivery Channels" is an attribute area. Similarly, the attribute area "CapacityVolumetrics" is first defined as an attribute area in the fourth row of the non-functional attribute glossary 2702 by the attribute area identifier "Non-Functional" stored in the area field 2704. In these examples, the phrase "Non-Functional" is used as an attribute area identifier to identify that the phrases "Delivery Channels" and "CapacityVolumetrics" are attribute areas. Alternative attribute area identifiers are also possible. As explained below with reference to FIG. 48, the attribute area stored in the area field 2704 may be used in organizing a report showing whether one or more document structure instances satisfy attribute requirements assigned to an attribute area for an entity.

The requirement field 2706 stores an attribute requirement assignable to at least some of the permissible constituents found in one or more glossaries, such as the entity glossary 2502. An attribute requirement generally describes an attribute that an entity should possess. The attribute requirement may be categorized by one or more of the attribute areas stored in the area field 2704. For example, FIG. 27 shows that the attribute requirement "Connectivity Requirement" is categorized as a "Delivery Channels" attribute area. Another attribute requirement categorized as a "Delivery Channels" attribute area includes the "Delivery Channels" attribute requirement. Additional or alternative attribute requirements are also possible.

The notes field 2708 stores text describing the attribute requirement of the attribute field 2706. In one implementation, the attribute notes text may be displayed in a report describing whether the document structure instances of an electronic document satisfy an attribute requirement. Alternatively or in addition, the attribute notes text may be displayed when a user is modifying or editing the non-functional glossary 2702. The attribute notes text of the notes field 2708 provides additional descriptive information regarding the associate attribute requirement.

The sample field 2710 stores a sample document structure instance satisfying the attribute requirement of the requirement field 2706. The sample field 2710 may store one or more document structure instances. In one implementation, the sample field 2710 includes a valid document requirements statement. Other types of statements are also possible. The attribute sample text of the sample field 2710 may be displayed during the editing or modifying of the non-functional glossary 2702. Alternatively, the attribute sample text of the sample field 2710 may be displayed to assist a user in revising or developing a document structure instance to satisfy the attribute requirement of the requirement field 2706. For example, in preparing a document structure instance that satisfies the attribute requirement of the requirement field 2706, the attribute sample text may be displayed as a guide to assist the user in preparing a better, valid, or more focused document structure instance. However, the attribute sample text may be displayed at any time.

The indicator phrase field 2712 stores one or more attribute phrases that identify an associated attribute requirement of the requirement field 2706. For example, as shown in FIG. 27, the attribute indicator phrases "delivery channels," "delivery channel," "browsers," "browser," and "Internet Explorer" are each attribute indicator phrases for the attribute requirement "Delivery Channels." In these examples, these attribute indicator phrases signify that a document structure instance should contain at least one of these phrases if the document structure instance is to satisfy the "Delivery Channels" attribute requirement. Where an electronic document does not contain a document structure instance having at least one attribute indicator phrase from the indicator phrase field 2712, the attribute requirement associated with the attribute indicator phrase may be identified as not being satisfied. Similarly, where an electronic document does contain a document structure instance having at least one attribute indicator phrase from the indicator phrase field 2712, the attribute requirement associated with the attribute indicator phrase may be identified as being satisfied.

Satisfying the attribute requirement associated with an attribute requirement phrase may include matching one or more target phrases from a document structure instance with the attribute requirement phrase. In one implementation, satisfying an attribute requirement phrase includes establishing a one-to-one correspondence of the words appearing in the target phrase with the words appearing in the attribute indicator phrase. In this implementation, a document structure instance satisfies the attribute requirement "Delivery Channels" when the phrase "delivery channel" appears in the document structure instance. In an alternative implementation, satisfying an attribute requirement phrase includes a partial match of the words appearing in a target phrase with the words appearing in at least one attribute indicator phrase. In yet another implementation, matching synonyms of the target phrase with one or more attribute indicator phrases satisfies the one or more attribute indicator phrases. Other arrangements for satisfying one or more attribute indicator phrases is also possible.

The activatable element field 2714 includes an activatable element for enabling an attribute requirement. The activatable element field 2714 provides a flexible mechanism for controlling whether an electronic document should contain a document structure instance that satisfies an attribute requirement. The activatable element field 2714 may contain an activatable element 2716 that controls whether an attribute requirement is enabled. In one implementation, activating the activatable element 2716 to enable an attribute requirement signifies that an electronic document should contain at least one document structure instance that satisfies the corresponding attribute requirement. However, enabling the attribute requirement may also signify that a greater number of document structure instances should satisfy the corresponding attribute requirement. Determining whether an attribute requirement is to be satisfied may be based on whether the activatable element 2716 is activated. Alternatively, determining whether an attribute requirement is to be satisfied may be based on whether the activatable element 2716 is not activated.

In one implementation, the activatable element 2716 is a checkbox, and an attribute requirement is enabled when a checkmark appears in the checkbox. Alternatively, the attribute requirement may be enabled when a checkmark does not appear in the checkbox. However, the activatable element 2716 may be an alternative type of activatable element, such as a radio button, text field, or any other type of activatable element.

Turning next to FIGS. 28-35, examples of state machines 2802-3502 are shown that may be employed by the document analysis, commenting, and reporting system 102 ("system 102") in evaluating one or more document structure instances. The state machines 2802-3502 shown in FIGS. 28-35 provide a streamlined mechanism for evaluating document structure instances and for determining whether a document structure instance conforms to one or more document structure instance syntaxes. The state machines 2802-3502 evaluate and analyze a document structure instance by the phrases of the document structure instance, where a phrase is generally one or more words from the document structure instance. A phrase may be a constituent from one or more glossaries, such as the agent glossary 140 or the entity glossary 2502, or the phrase may be one or more words not appearing in any of the glossaries. Other types of phrases are also possible.

As previously discussed with reference to the syntax definition 150, the syntax definition 150 may define controlled document structure instance syntaxes. Each of the state machines 2802-3502 shown in FIGS. 28-35 may be used in evaluating one or more controlled document structure instance syntaxes recognized by the system 102. The system 102 may select a state machine for processing a document structure instance based on a document structure instance identifier associated with the document structure instance that identifies the controlled document structure instance syntax to which the document structure instance should conform. Table 6 below describes examples of additional controlled document structure instance syntaxes that may correspond to one or more of the state machines shown in FIGS. 28-35.

TABLE 6

| Syntax Type | Document Structure Instance Identifier | Syntax Definition Example | Brief Explanation |
|---|---|---|---|
| Solution | SA | [Agent]["shall"\|"must"\|"will"] Action] | The solution syntax may express that someone, some system, or both may be responsible for performing some action. |
| Enablement | ER | [Agent] ["shall"\|"must"\|"will"] ["be able to"][Action]; or [Agent] ["shall"\|"must"\|"will"] ["allow"\|"permit"] [Agent]["to"][Action] | The enablement syntax may express a capability that the proposed system may provide, but may not specify what/who provides this capability. There may be two types of enablement syntaxes: 1) an enablement syntax that does not mention a system; and 2) an enablement syntax that mentions a high level capability provided by a system to a user. |
| Action Constraint | AC | [Agent]["shall"\|"will"\|"may"]["only"\|"not"][Action] ["when\|if"] [Condition]; or ["Only"][Agent] ["may"\|"may be"] [Action]. | The action constraint syntax may express a constraint on how a system or a component of the system is expected to behave. There may be two types of action constraint syntaxes: 1) an action constraint syntax that expresses a constraint on how a system, or a component of the system, is allowed to behave; and, 2) an action constraint syntax that expresses a business rule that constrains how an agent in a business takes an action. |
| Attribute Constraint | ATR | [Entity\|Agent] ["must"] ["always"\|"never"\|"not"]["be"\|"have"][Value]. | The attribute constraint syntax may express a constraint on attributes and/or attribute values. |
| Definition | DEF | [Entity\|Agent]["is"\|"will be"]["defined as"\|"classified as"] [Entity]. | The definition syntax may express a definition of a non-agent entity. |
| Policy | P | [Entity\|Agent]["is"\|"is not"][Action]. | The policy syntax may express a policy that should be adhered to by a system. |

Alternatively, system 102 may select a state machine for processing a document structure instance based on one or more modal phrases identified in the document structure instance. The one or more modal phrases may identify the controlled document structure instance syntax of the document structure instance, and, based on the identified controlled document structure instance syntax, the system 102 may select one or more state machines for processing the document structure instance. Table 7 below lists examples of modal phrases that correspond to controlled document structure instance syntaxes. Other modal phrases corresponding to other controlled document structure instance syntaxes are also possible.

TABLE 7

| Syntax Type | Modal Phrase |
| --- | --- |
| Solution | shall |
|  | must |
|  | will |
| Enablement | shall be able to |
|  | must be able to |
|  | will be able to |
|  | shall permit |
|  | shall allow |
|  | must permit |
|  | must allow |
|  | will permit |
|  | will allow |
| Action Constraint | shall only |
|  | shall not |
|  | will only |
|  | will not |
|  | may only |
|  | may not |
|  | may be |
|  | may |
| Attribute Constraint | must always have |
|  | must always be |
|  | must never be |
|  | must never have |
|  | must not be |
|  | must not have |
|  | must always include |
|  | must never include |
|  | must not include |
|  | must always contain |
|  | must never contain |
|  | must not contain |
| Definition | will be classified as |
|  | will be defined as |
|  | is classified as |
|  | is defined as |
| Policy | is |
|  | is not |

Table 8 below lists examples of document structure instances that conform to one or more of the controlled document structure instance syntaxes described in Table 6 and Table 7. Although the document structure instances listed below are shown as conforming to one controlled document structure instance syntax, a document structure instance may conform to more than one controlled document structure instance syntax.

TABLE 8

| Syntax Type | Exemplary Document Structure Instance |
| --- | --- |
| Solution | SA1: The Order Processing System shall process orders every 2 hours. |
|  | SA2: The Web Server must inform administrator of failed login attempts. |

TABLE 8-continued

| Syntax Type | Exemplary Document Structure Instance |
| --- | --- |
| Enablement | ER1: The user must be able to display the PDF rendition of associated documents. |
|  | ER2: The payroll system shall be able to deduct loan amounts from paychecks. |
|  | ER3: Inventory management system shall allow users to add items. |
|  | ER4: Payroll system shall permit users to change direct deposit profiles. |
|  | ER5: Order Processing System must permit administrator to view daily transactions. |
| Action Constraint | AC1: The account management system shall only close an account if the current balance is zero |
|  | AC2: The authentication system shall not grant access when identity-verification level is less than 8.9. |
|  | AC3: Only child-friendly pets may be placed in old age homes. |
|  | AC4: Only payroll employees may access the payroll database. |
| Attribute Constraint | ATR1: Customer standing must always be one of the following: 1) Gold 2) Silver 3) Bronze. |
|  | ATR2: Chemical containers must not be stored in subzero temperature. |
|  | ATR3: The customer must never have non US address in records. |
| Definition | DEF1: Total sales value is defined as total item value plus sales tax. |
|  | DEF2: A graduate student with a grade-point average above 3.5 is classified as an honors student. |
| Policy | P1: Sales tax is computed on in-state shipments. |
|  | P2: Sales tax is not computed on interstate shipments. |

Table 9 below lists the state machines shown in FIGS. 28-35 and the controlled document structure instance syntax corresponding to the state machine. Although Table 9 lists one state machine for evaluating a controlled document structure instance syntax, more than one state machine may evaluate a single controlled document structure instance syntax, a state machine may evaluate one or more controlled document structure syntax, or any other arrangement of state machines and controlled document structure syntaxes.

TABLE 9

| State Machine and Reference Number | Syntax Type |
| --- | --- |
| solution state machine 2802 | Solution |
| enablement state machine 2902 | Enablement |
| action state machine 3102 | Action Constraint |
| action state machine 3202 |  |
| attribute state machine 3302 | Attribute Constraint |
| definition state machine 3402 | Definition |
| policy state machine 3502 | Policy |

Each of the state machines 2802-3502 may be defined according to a state machine equation. The state machine equation may be represented as a six-tuple as $(\Sigma, S, s_0, \delta, F, E)$ where, "$\Sigma$" is an alphabet that includes at least one modal constituent and one or more constituents from the entity glossary 2502, the action glossary 142, or any other glossary;

"S" a set of states defining the state machine representing the controlled document structure instance;

"$s_0$" is a start state;

"$\delta$" is a transition function and may be evaluated according to whether a document structure instance includes a particular constituent;

"F" is a set of final states indicating that a document structure instance conforms to a particular controlled document structure instance syntax; and, "E" is the set of error states indicating that a document structure instance does not conform to the controlled document structure instance syntax represented by the state machine.

State machines 2802-3502 facilitate and expedite the processing of a document structure instance. In addition, the state machines 2802-3502 expeditiously identify errors that may be present in a document structure instance. For example, state machine 2802 facilitates the identification of at least five possible errors that may occur in a document structure instance conforming to the solution type controlled document structure instance syntax. The five possible errors include finding a non-agent entity (represented by Non-Agent Entity State 2810), recognizing a missing agent (represented by Missing Agent State 2812), recognizing the presence of an unknown agent (represented by Unknown Agent State 2816), recognizing the presence of an unknown action (represented by Unknown Action State 2818), and identifying a missing action (represented by Missing Action State 2822). The other state machines 2902-3502 may identify similar or alternative errors.

Table 10 lists possible states found in state machines 2802-3502 and a brief description of each of the states. Alternative states are also possible.

TABLE 10

| State and Reference Number | Type of State | Brief Description |
| --- | --- | --- |
| Start 2804 | Start | A starting state for a state machine. |
| "To" State 3014 | Transition | A state indicating that an expected "to" phrase was found in the document structure instance. |
| Agent State 2808 | Transition | A state indicating that an agent constituent was found in the document structure instance. |
| Branch Agent State 3008 | Transition | A state indicating that an expected constituent agent was found in the document structure instance. |
| Branch Model State 3010 | Transition | A state indicating that an expected constituent modal was found in the document structure instance. |
| Conditional State 3108 | Transition | A state indicating that an expected introducing conditional phrase was found in the document structure instance. |
| Entity State 3304 | Transition | A state indicating that an expected constituent agent or entity phrase was found in the document structure instance. |
| Modal State 2814 | Transition | A state indicating that an expected modal constituent was found in the document structure instance. |
| Non-Entity State 2806 | Transition | A state indicating that a non-entity phrase was found in the document structure instance. |
| Only State 3204 | Transition | A state indicating that an expected phrase with the word "only" was found in the document structure instance. |
| Missing "To" State 3012 | Error | A state indicating that an expected "to" phrase was not found in the document structure instance. |

TABLE 10-continued

| State and Reference Number | Type of State | Brief Description |
| --- | --- | --- |
| Missing Action State 2822 | Error | A state indicating that the document structure instance ended and no unevaluated phrases remain in the document structure instance. |
| Missing Agent State 2812 | Error | A state indicating that a modal constituent was found, but an expected agent constituent was not found. |
| Missing Conditional State 3104 | Error | A state indicating that an expected conditional was not found in the document structure instance. |
| Non-Agent Entity State 2810 | Error | A state indicating than an entity constituent was found in the document structure instance, but that the entity constituent is not an agent constituent. |
| Syntax Error State 3106 | Error | A state indicating that a syntax error occurred in the document structure instance. |
| Unknown Action State 2818 | Error | A state indicating that a phrase was found in the document structure instance, but the phrase is not an expected action constituent. |
| Unknown Agent State 2816 | Error | A state indicating that an expected agent constituent was not found in the document structure instance. |
| Unknown Entity State 3404 | Error | A state indicating that an expected entity phrase or constituent agent was not found in the document structure instance. |
| Action State 2820 | Final | A state indicating that an expected constituent was found in the document structure instance. |
| Final State 3110 | Final | A state indicating that the controlled document structure instance syntax for a document structure instance was evaluated successfully. |

As the controlled document structure instance syntax for a document structure instance is being evaluated, the evaluation of the controlled document structure instance syntax may result in an error, which is shown above in Table 10 as one or more error states. When an error state is encountered, an error message may be displayed that describes the error and may provide a suggestion as to how the error may be corrected. An error state may be associated with one or more error messages. Table 11 below lists exemplary error messages associated with one or more error states and the type of error message displayed. Categorizing error messages according to an error type may be used in evaluating the number of errors occurring in a document structure instance, the number of different types of errors occurring in a document structure instance, or other error-related information. Moreover, the number of errors and the number of different types of errors may be reported for an entire electronic document that is comprised of document structure instances. Other combinations of evaluating errors in an electronic document or document structure instance are also possible.

TABLE 11

| Error State | Error Message |
| --- | --- |
| Missing Agent State | This requirement lacks an agent before <variable at which error occurs>. It can be confusing to leave the agent implicit. |
| Unknown Action State | This requirement contains '<variable at which error occurs>' where an action is expected, but '<variable at which fault occurs>' is not in the action glossary. |
| Unknown Agent State | This requirement contains '<variable at which error occurs>' where an agent is expected, but '<variable at which fault occurs>' is not in the entity glossary. |
| Non Agent Entity State | This requirement contains '<variable at which error occurs>' where an agent is expected. '<variable at which error occurs>' is in the entity glossary but is not designated as an agent. |
| Missing Action State | This requirement lacks an action before '<variable at which error occurs>'. It can be confusing to leave the action implicit. |

Turning next to FIG. 36, an example of a requirements visualization system 3602 is shown. Where similar objects appear in the requirements visualization system 3602 that have been previously described for one or more systems, a description of those objects has been omitted for brevity.

In the example shown in FIG. 36, the requirements visualization system 3602 includes a syntax-based document visualization module 3604 and a syntax-based document attribute analysis module 3606. The requirements visualization system 3602 may also include the entity glossary 2502, the problematic phrase glossary 2602, and the non-functional attribute glossary 2702 as part of a document parameter set 3608. As with previously described systems, the document parameter set 3608 may also include the mode glossary 144, document structure instance identifiers 148, the action glossary 142, and one or more document structure instance syntax definitions 150. The syntax-based document visualization module 3604 and the syntax-based document attribute analysis module 3606 may be in communication with a document under analysis 132 and the document specific parameter set 3608. The requirements visualization system 3602 may also be in communication with the document analysis database 124 to retrieve one or more document specific parameter sets 702-706.

In addition to the document parameter set 3608 and the document under analysis 132, the syntax-based document visualization module 3604 and the syntax-based document attribute analysis module 3606 may be in communication with other components. For example the syntax-based document visualization module 3604 and the syntax-based document attribute analysis module 3606 may be in communication with the processor 116, the network interface 120, and various input/output devices 122. As shown in FIG. 36, the syntax-based document visualization module 3604 and the syntax-based attribute analysis module 3606 are in communication with the display 126, and the modules 3604-3606 may display various graphical representations from analyzing the document under analysis 132, such as a component visualization relationship map, a system visualization relationship map, a sub-system visualization relationship map, an attribute requirement report, or any other type of graphical representations of analyzing the document under analysis 132.

Although the syntax-based document visualization module 3604 and the syntax-based document attribute analysis module 3606 are shown as integrated as part of the requirements visualization system 3602, the syntax-based document visualization module 3604 and the syntax-based document attribute analysis module 3606 may be integrated as part of any other system. For example, the syntax-based document visualization module 3604 and the syntax-based document attribute analysis module 3606 may be incorporated into the document analysis, commenting, and reporting system 102, the requirements analysis system 702, the requirements commenting system 1002, the report generator system 1302, the ontology analysis system 1900, or the requirements graphing system 2202. In other implementations, the syntax-based document visualization module 3604 and the syntax-based document attribute analysis module 3606 are accessed through remote procedure calls, web services, or other interfaces to render a graphical representation on the display 126.

Figure 37:
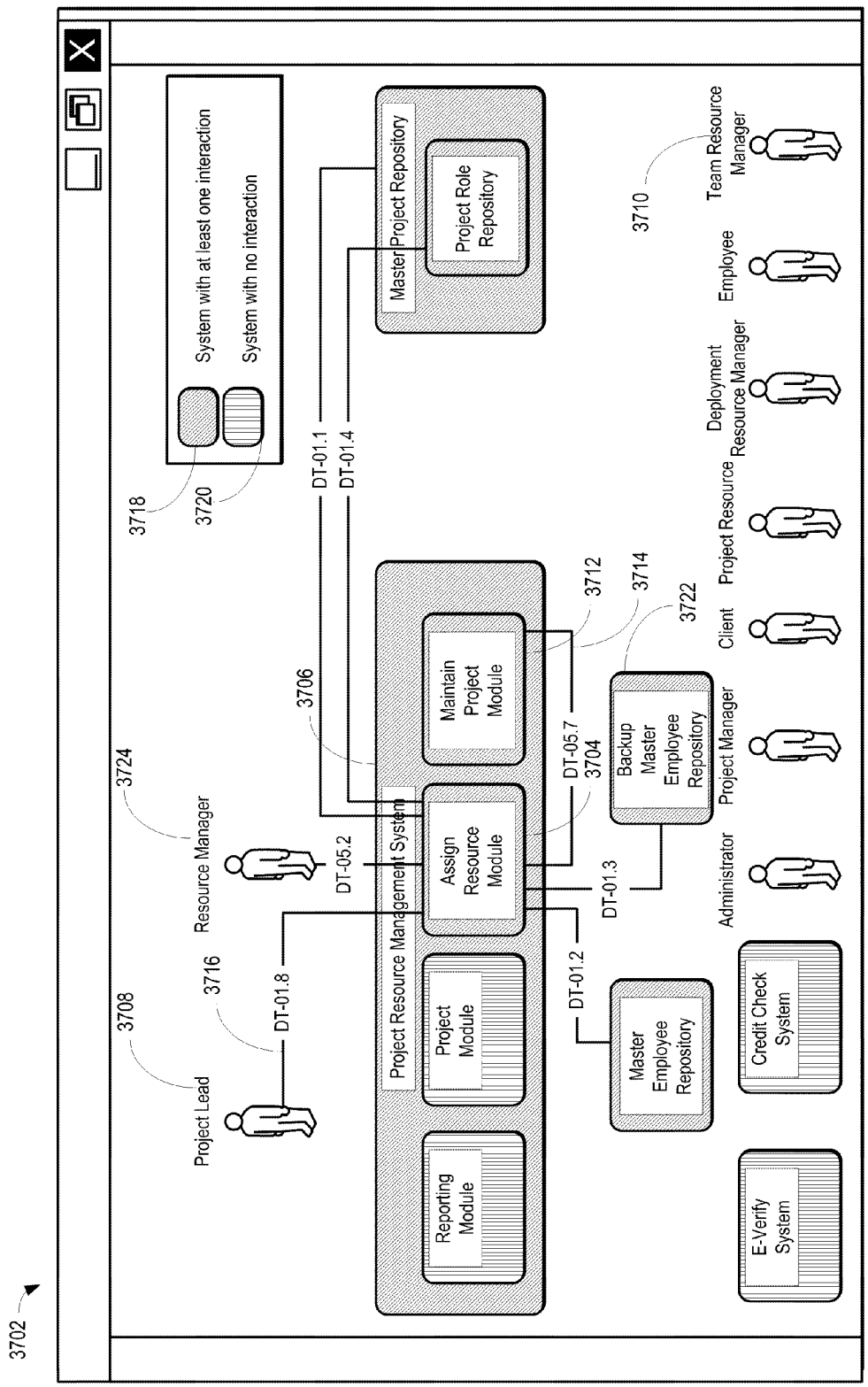
FIG. 37 shows an example of a component visualization relationship map.

In one implementation, the syntax-based document visualization module 3604 is operative to generate a component visualization relationship map. FIG. 37 shows one example of a component visualization relationship map 3702. The component visualization relationship map 3702 may represent the interaction of a component with another component for one or more document structure instances. In general, a component may be an agent, an entity, a system, a person, or any constituent from the agent glossary 140 or the entity glossary 2502.

The component visualization relationship map 3702 focuses on the interactions between a first constituent in a document structure instance and other constituents identified as interacting with the first constituent. The component visualization relationship map 3702 provides a unique analysis of a set of document structure instances by identifying the interactions between the first constituent and other constituents of the set of document structure instances and displaying a visual representation of the interactions between the first constituent and the other constituents. The component visualization relationship map 3702 may also provide a visual representation of constituents that are non-interacting to help identify where a set of document structure instances may be deficient with respect to the non-interacting constituents. For example, the component visualization relationship map 3702 may help pinpoint and identify non-interacting constituents that may, in fact, be interacting constituents.

In generating the component visualization relationship map 3702, the syntax-based document visualization module 3604 may perform a recognition process to recognize that one or more document structure instances conforms to an interaction syntax. The interaction syntax may be a controlled document structure instance syntax and may, or may not, be associated with a document structure instance identifier. The syntax-based document visualization module 3604 may parse and/or analyze a document structure instance to identify interacting constituents and non-interacting constituents according to the interaction syntax.

In one implementation, the interaction syntax is defined as "any requirement that has agent that is a system or a person and a secondary that is a system or a person." Alternatively, the interaction syntax may be a conditional statement, which may be defined as:

InteractionRequirement(R)=Requirement(R) & hasEntity(R,A) & ((System(A) or Person(A)) & SecondaryAgent(B) & ((System(B) or Person(B)), where:

R is a document structure instance;
A is a first phrase from the requirement statement;
B is a second phrase from the requirement statement;
Requirement(X) is a function that determines whether a document structure instance X is a requirement statement;

hasEntity(X,Y) is a function that determines whether the phrase Y is an entity within the document structure instance X;

System(Y) is a function that determines whether the phrase Y is an entity having the entity type of "system";

Person(Y) is a function that determines whether the phrase Y is an entity having the entity type of "person"; and, SecondaryAgent(Y) is a function that determines whether the phrase Y is a secondary agent of the requirement statement X. A phrase Y may be a secondary agent where it is identified as being a direct object for another subject phrase.

After identifying document structure instances from a set of document structure instances that conform to the interaction syntax, the syntax-based document visualization module 3604 may then identify whether one or more phrases from the identified set of document structure instances are interacting constituents or non-interacting constituents. In one implementation, the syntax-based document visualization module 3604 employs an interacting agent conditional statement to identify those constituents as interacting or non-interacting. The interacting agent conditional statement may be written as a conditional statement defined as "any system or user that is the agent or secondary agent of an interaction requirement." In a conditional language format, the interacting agent conditional statement may be defined as:

InteractingAgent(A)=(System(A) or Person(A)) & InteractionRequirement(R) & (Agent(A) or SecondaryAgent(A)),
where:

R is a document structure instance;

A is a first phrase from the requirement statement;

B is a second phrase from the requirement statement;

InteractionRequirement(X) is a function that determines whether a document structure instance X is an interaction requirement;

Agent(Y) is a function that determines whether the phrase Y is an agent;

System(Y) is a function that determines whether the phrase Y is an entity having the entity type of "system";

Person(Y) is a function that determines whether the phrase Y is an entity having the entity type of "person"; and, SecondaryAgent(Y) is a function that determines whether the phrase Y is a secondary agent of the requirement statement X. A phrase Y may be a secondary agent where it is identified as being a direct object for another subject phrase.

In addition, the syntax-based document visualization module 3604 may identify whether a constituent is an interacting agent based on whether the constituent has a child, or sub-component, that is an interacting agent. Examples of child agents include a billing module defined as a sub-system of an order processing system or a shipping module defined as a sub-system of the order processing system. Other types of child agents are also possible. For determining whether a constituent is an interacting agent based on one or more children, the syntax-based document visualization module 3604 may employ an interacting child agent conditional statement defined as "any system or user, whose child is an interacting agent." The interacting child agent conditional statement may also be written in a conditional language format defined as:

InteractingAgent(A)=(System(A) or Person(A)) & child (A,B) & InteractingAgent(B), where:

A is a first phrase from a document structure instance;

B is a second phrase from the document structure instance;

System(Y) is a function that determines whether the phrase Y is an entity having the entity type of "system";

Person(Y) is a function that determines whether the phrase Y is an entity having the entity type of "person"; and, Child(X,Y) is a function that determines whether the phrase B is a child (or sub-component) of the phrase A.

In evaluating each of the functions identified above, the syntax-based visualization module 3604 may refer to one or more glossaries, such as the entity glossary 2502, the relationship glossary 2102, the agent glossary 140, or any other glossary previously discussed.

FIG. 37 shows that the component visualization relationship map 3702 includes several visualization relationship objects and several visualization interaction objects. In general, a visualization relationship object refers to a visual representation of a constituent from a document structure instance or a set of document structure instances. The visualization relationship object may represent a constituent in a document structure instance of an electronic document matching a permissible constituent found one or more of the glossaries, such as the entity glossary 2502, the agent glossary 140, or any other glossary. In addition, a visualization interaction object generally refers to a visual representation of an interaction, or non-interaction, between one or more visualization relationship objects. Moreover, visualization relationship objects may be interacting visualization relationship objects or non-interacting visualization relationship objects, and a visualization interaction object may identify or illustrate an interaction established between one or more visualization relationship objects defined by one or more document structure instances.

The exemplary component visualization relationship map 3702 represents a component visualization relationship map for a project resource management system 3706. As shown in the FIG. 37, the project resource management system 3706 has several sub-systems, including an assign resource module 3704 and a maintain project module 3712. Because the assign resource module 3704 and the maintain project module 3712 are "children" of the project resource management system 3706, the component visualization relationship map 3702 may also illustrate interactions of the assign resource module 3704 and the maintain project module 3712. However, the visualization module 3604 may be instructed or configured to generate a component visualization relationship maps for other constituents of an electronic document or a document structure instance. For example, the visualization module 3604 may be instructed or configured to generate a component visualization relationship map for the assign resource module 3704, the maintain project module 3712, the project lead 3708, the team resource manager 3710, or any other constituents.

The visualization relationship object representing a constituent may be represented as a graphical iconic image. The graphical iconic image of the component visualization relationship map 3702 representing the assign resource module 3704 is one example of a visualization relationship object. Similarly, the graphical iconic image of the component visualization relationship map 3702 representing the project resource management system 3706 is another example of a visualization relationship object. Likewise, the graphical iconic image of the component visualization relationship map 3702 representing the project lead 3708 is a further example of a visualization relationship object. As discussed below with reference to FIG. 38, other representations of the visualization relationship objects are also possible.

As discussed above, the component visualization relationship map 3702 includes visualization interaction objects that represent interactions among one or more of the visualization relationship objects. The component visualization relationship map 3702 shows that the visualization interaction object represented by the graphical iconic image 3714 illustrates an interaction, established by one or more document structure instances, between the assign resource module 3704 and the maintain project module 3712. The component visualization relationship map 3702 also shows other visualization interaction objects, such as a visualization interaction object, represented by the graphical iconic image 3716, between the assign resource module 3704 and the project lead 3708. Depending on the selected constituent for which the component visualization relationship map 3702 was generated, and the interactions established by one or more document structure instances that include the selected constituent, a component visualization relationship map may include none, one, or more than one visualization interaction objects.

In addition, one or more visualization interaction objects may include an interaction document structure instance identifier that identifies the document structure instance that establishes the interaction, or non-interaction, between a constituent and other constituents. For example, the graphical iconic image 3716 includes the interaction document structure instance identifier "DT-01.8," which identifies that the document structure instance having the document structure instance identifier "DT-01.8" establishes an interaction between the assign resource module 3704 and the project lead 3708. Other examples of interaction document structure instance identifiers include the interaction document structure instance identifier "DT-01.2," the interaction document structure instance identifier "DT-01.3," and the interaction document structure instance identifier "DT-05.7." By including interaction document structure instance identifiers in the component visualization relationship map 3702, the visualization module 3604 assists in identifying problematic or proper document structure instances. For example, by reviewing the visualization interaction objects labeled with interaction document structure instance identifiers, a user or other system can quickly refer to the identified document structure instance and determine whether the interaction, or non-interaction, established by the document structure instance is a proper, or desired, interaction or non-interaction.

In evaluating a set of document structure instances, the component visualization relationship map 3702 may include a color schema having one or more assignable display states that displays interactions between constituents of a document structure instance or an electronic document. The color schema may include a first display state that displays that an interaction is established between a first constituent and a second constituent, a second display state that displays that a non-interaction is established between the first constituent and the second constituent, or any other types of display states.

In FIG. 37, the component visualization relationship map 3702 includes a first display state 3718 that displays that a constituent has at least one interaction, and a second display state 3720 that displays that a constituent does not have an interaction. The display states may be based on one or more assignable characteristics of a visualization relationship object, such as color, shading, orientation, position, or any other characteristic. In one implementation, the color schema includes a first color assignable to the first display state 3718, and a second color different than the first color assignable to the second display state 3720. However, other implementations are also possible. Based on the color schema, the visualization module 3604 assigns visualization relationship objects display states depending on whether a document structure instance has established an interaction for the constituent.

Figure 38:
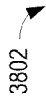
FIG. 38 shows an alternative example of a component visualization relationship map.

Although the visualization module 3604 may be instructed or configured to generate the component visualization relationship map 3702, the visualization module 3604 may generate alternative component visualization relationship maps. FIG. 38 shows an alternative example of a component visualization relationship map 3802. The component visualization relationship map 3802 represents an entity-specific component visualization relationship map and more particularly, a system component visualization relationship map, that illustrates the interactions between the project resource management system 3706 and constituents having the entity type "System." However, other types of component visualization relationship maps may include constituents having an entity type other than "System," such as "Person," "GenericEntity" or other entity type. A component visualization relationship map that includes interactions between a selected constituent and other constituents of mixed entity types is also possible.

The system component visualization relationship map 3802 includes an entity type identifier cell 3804 that identifies the interacting entity types, a set of rows 3808-3826 for the constituents identified in the electronic document and a set of columns 3828-3830 for the constituents identified in the electronic document having the entity type "System." In one implementation, each of the rows 3806-3826 and each of the columns 3828-3830 match at least one permissible constituent of a glossary, such as the entity glossary 2502 or the agent glossary 140. In an alternative implementation, a row and/or a column may represent an impermissible constituent or impermissible phrase. Other arrangements of permissible and impermissible constituents and phrases are also possible.

In one implementation, each row 3806-3826 and the each column 3828-3830 represents a visualization relationship object for the system component visualization relationship map 3802. In addition, the system component visualization relationship map 3802 also includes visualization interaction objects. With respect to the system component visualization relationship map 3802, a visualization interaction object may be an intersection cell between a row and a column where a document structure instance establishes an interaction between the constituent represented by the row and the constituent represented by the column. As one example, the intersection cell 3830 between the row 3820 and the column 3828 represents a visualization interaction object. The intersection cell 3832 illustrates that a document structure instance identified by the syntax-based document visualization module 3604 establishes an interaction between the assign resource module 3704 and the maintain project module 3712. Alternatively, a visualization interaction object may be an intersection cell between a row and a column where an interaction is not established between the constituent represented by the row and the constituent represented by the column. As one example, the intersection cell 3834 between the row 3806 and the column 3828 represents a visualization interaction object where a document structure instance has not established an interaction between the assign resource module 3704 and the backup master employee repository 3722.

FIG. 39 shows an alternative example of a component visualization relationship map 3902. The component visualization relationship map 3802 represents an entity-specific component visualization relationship map and more particularly, a person component visualization relationship map, that illustrates the interactions between the project resource management system 3706 and constituents having the entity type "Person." However, other types of component visualization relationship maps may include constituents having an entity type other than "Person," such as "System," "GenericAgent," "GenericEntity" or other entity type. A component visualization relationship map that includes interactions between a selected constituent and other constituents of mixed entity types is also possible.

The person component visualization relationship map 3902 includes an entity type identifier cell 3904 that identifies the interacting entity types, a set of rows 3906-3916 for the constituents identified in the electronic document and a set of columns 3918-3920 for the constituents identified in the electronic document having the entity type "Person." In one implementation, each of the rows 3906-3916 and each of the columns 3918-3920 match at least one permissible constituent of a glossary, such as the entity glossary 2502 or the agent glossary 140. In an alternative implementation, a row and/or a column may represent an impermissible constituent or impermissible phrase. Other arrangements of permissible and impermissible constituents and phrases are also possible.

In one implementation, each row 3906-3916 and each column 3918-3920 represents a visualization relationship objects for the person component visualization relationship map 3902. In addition, the person component visualization relationship map 3902 also includes visualization interaction objects. With respect to the person component visualization relationship map 3902, a visualization interaction object may be an intersection cell between a row and a column where a document structure instance establishes an interaction between the constituent represented by the row and the constituent represented by the column. As one example, the intersection cell 3922 between the row 3908 and the column 3918 represents a visualization interaction object. The intersection cell 3922 illustrates that at least one document structure instance identified by the visualization interaction object establishes an interaction between the project resource management system 3706 and the resource manager 3724. Alternatively, a visualization interaction object may be an intersection cell between a row and a column where an interaction is not established between the constituent represented by the row and the constituent represented by the column. As one example, the intersection cell 3924 between the row 3912 and the column 3918 represents a visualization interaction object where a document structure instance has not established an interaction between the assign resource module 3704 and the resource manager 3724.

Figure 40:
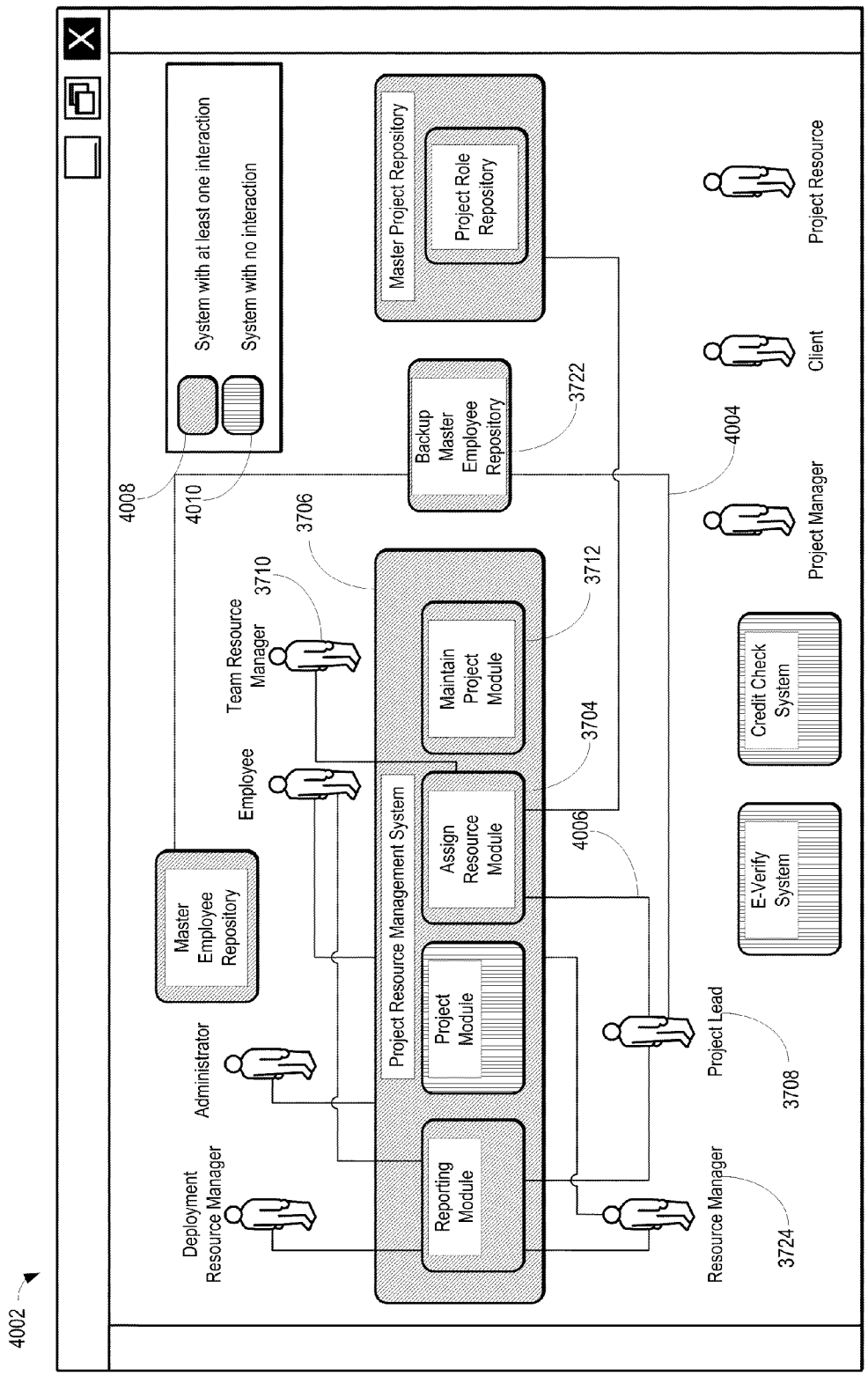
FIG. 40 shows an example of a system visualization relationship map.

In another implementation, the syntax-based document visualization module 3604 is operative to generate a system visualization relationship map. FIG. 40 shows one example of a system visualization relationship map 4002. The system visualization relationship map 4002 may represent the interactions among constituents identified in a document structure instance, a set of document structure instances, or an electronic document. The system visualization relationship map 4002 provides a comprehensive visualization of the interactions and non-interactions that occur among constituents. The system visualization relationship map 4002 assists in the identification of proper and improper interactions, and helps identify whether a constituent has any interaction. The system visualization relationship map 4002 may help pinpoint and identify non-interacting constituents that should, in fact, be interacting constituents.

In generating the system visualization relationship map 4002, the syntax-based document visualization module 3604 may perform a recognition process to recognize that one or more document structure instances conforms to an interaction syntax. As discussed the interaction syntax may be a controlled document structure instance syntax and may, or may not, be associated with a document structure instance identifier. The syntax-based document visualization module 3604 may parse and/or analyze a document structure instance to identify interacting constituents and non-interacting constituents according to the interaction syntax. In recognizing whether a document structure instance conforms to an interaction syntax for generating the system visualization relationship map 4002, the syntax-based document visualization module 3604 may employ any one of the syntaxes previously discussed.

Similar to the component visualization relationship map 3702, the system visualization relationship map 4002 includes several system visualization relationship objects and several system visualization interaction objects. In general, a system visualization relationship object refers to a visual representation of a constituent from a document structure instance or a set of document structure instances. The system visualization relationship object may represent a constituent in a document structure instance of an electronic document matching a permissible constituent found one or more of the glossaries, such as the entity glossary 2502, the agent glossary 140, or any other glossary. In addition, a system visualization interaction object generally refers to a visual representation of an interaction, or non-interaction, between one or more visualization relationship objects. Moreover, system visualization relationship objects may be interacting system visualization relationship objects or non-interacting system visualization relationship objects, and a system visualization interaction object may identify or illustrate an interaction established between one or more system visualization relationship objects defined by one or more document structure instances.

The exemplary system visualization relationship map 4002 represents a system visualization relationship map for several constituents including the assign resource module 3704, project resource management system 3706, the project lead 3708, the team resource manager 3710, the maintain project module 3712, the backup master employee repository 3722, and the resource manager 3724.

The system visualization relationship object representing a constituent may be represented as a graphical iconic image. The graphical iconic image of the system visualization relationship map 4002 representing the assign resource module 3704 is one example of a system visualization relationship object. Similarly, the graphical iconic image of the system visualization relationship map 4002 representing the project resource management system 3706 is another example of a system visualization relationship object. Likewise, the graphical iconic image of the system visualization relationship map 4002 representing the project lead 3708 is a further example of a system visualization relationship object. As discussed below with reference to FIG. 41, other representations of the system visualization relationship objects are also possible.

As discussed above, the system visualization relationship map 4002 includes system visualization interaction objects that represent interactions among one or more of the system visualization relationship objects. The system visualization relationship map 4002 shows that the system visualization interaction object 4004 illustrates an interaction, established by one or more document structure instances, between the backup master employee repository 3722 and the project lead 3708. The system visualization relationship map 4002 also shows other visualization interaction objects, such as a visualization interaction object, represented by the graphical iconic image 4006, between the assign resource module 3704 and the project lead 3708. Depending on the document structure instance or the document structure instances of an electronic document, a system visualization relationship map may include none, one, or more than one system visualization interaction objects.

In evaluating a set of document structure instances, the system visualization relationship map 4002 may include a color schema having one or more assignable display states that displays interactions between constituents of a document structure instance or an electronic document. The color schema may include a first display state that displays that an interaction is established between a first constituent and a second constituent, a second display state that displays that a non-interaction is established between the first constituent and the second constituent, or any other types of display states.

In FIG. 40, the system visualization relationship map 4002 includes a first display state 4008 that displays that a constituent has at least one interaction, and a second display state 4010 that displays that a constituent does not have an interaction. The display states may be based on one or more assignable characteristics of a visualization relationship object, such as color, shading, orientation, position, or any other characteristic. In one implementation, the color schema includes a first color assignable to the first display state 4008, and a second color different than the first color assignable to the second display state 4010. However, other implementations are also possible. Based on the color schema, the visualization module 3604 assigns system visualization relationship objects display states depending on whether a document structure instance has established an interaction for the constituent.

Figure 41:
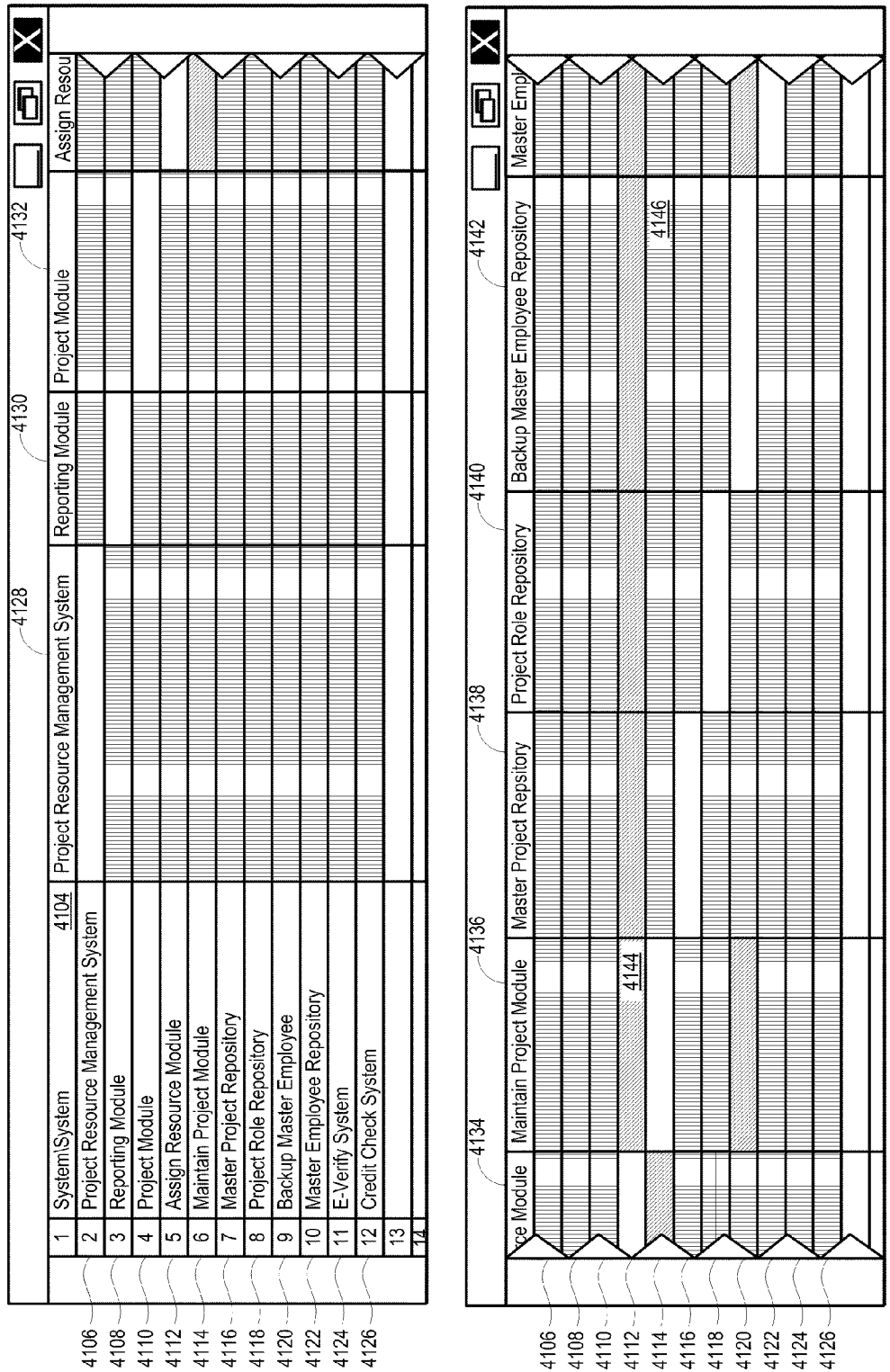
FIG. 41 shows an alternative example of a system visualization relationship map.

Although the visualization module 3604 may be instructed or configured to generate the system visualization relationship map 4002, the visualization module 3604 may generate alternative system visualization relationship maps. FIG. 41 shows an alternative example of a system visualization relationship map 4102. The system visualization relationship map 4102 represents an entity-specific system visualization relationship map and more particularly, a system visualization relationship map that illustrates the interactions between a first set of constituents having an entity type of "System" and a second set of constituents having an entity type "System." However, other types of system visualization relationship maps may include constituents having an entity type other than "System," such as "Person," "GenericEntity" or other entity type. A system visualization relationship map that includes interactions between constituents of mixed entity types is also possible.

The system visualization relationship map 4102 includes an entity type identifier cell 4104 that identifies the interacting entity types, a set of rows 4106-4126 for the constituents identified in the electronic document having the entity type "System" and a set of columns 4128-4142 for the constituents identified in the electronic document having the entity type "System." In one implementation, each of the rows 4106-4126 and each of the columns 4128-4142 match at least one permissible constituent of a glossary, such as the entity glossary 2502 or the agent glossary 140. In an alternative implementation, a row and/or a column may represent an impermissible constituent or impermissible phrase. Other arrangements of permissible and impermissible constituents and phrases are also possible.

In one implementation, each row 4106-4126 and each column 3828-3830 represents a system visualization relationship object for the system visualization relationship map 4102. In addition, the system visualization relationship map 4102 also includes system visualization interaction objects. With respect to the system visualization relationship map 4102, a system visualization interaction object may be an intersection cell between a row and a column where a document structure instance establishes an interaction between the constituent represented by the row and the constituent represented by the column. As one example, the intersection cell 4144 between the row 4112 and the column 4136 represents a system visualization interaction object. The intersection cell 4144 illustrates that a document structure instance identified by the visualization interaction object establishes an interaction between the assign resource module 3704 and the maintain project module 3712. Alternatively, a system visualization interaction object may be an intersection cell between a row and a column where an interaction is not established between the constituent represented by the row and the constituent represented by the column. As one example, the intersection cell 4146 between the row 4114 and the column 4142 represents a visualization interaction object where a document structure instance has not established an interaction between the maintain project module 3712 and the backup master employee repository 3722.

Figure 42:
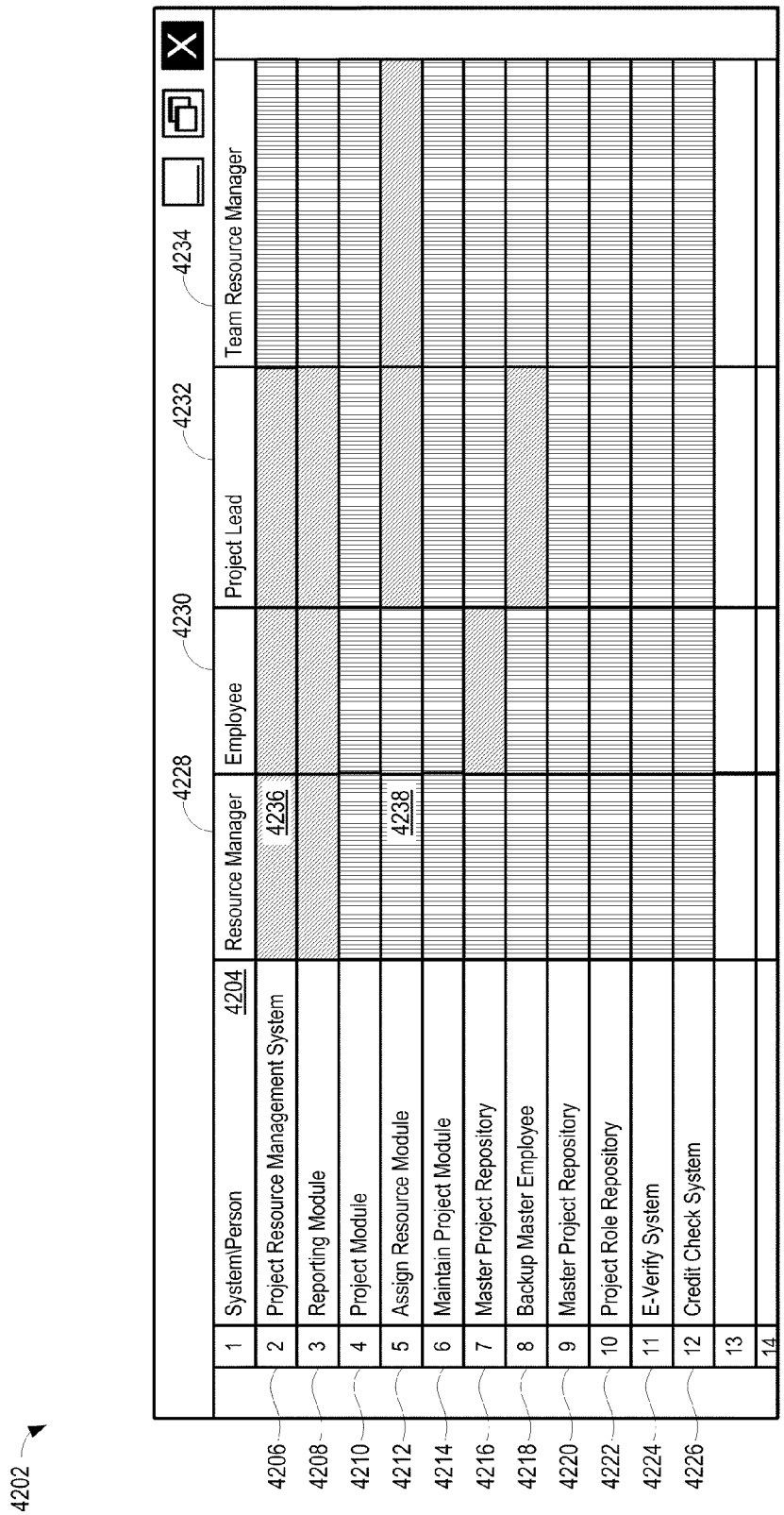
FIG. 42 shows yet another example of a system visualization relationship map.

FIG. 42 shows an alternative example of a system visualization relationship map 4202. The system visualization relationship map 4202 represents an entity-specific system visualization relationship map and more particularly, a person visualization relationship map that illustrates the interactions between a first set of constituents having an entity type of "System" and constituents having the entity type "Person." However, other types of system visualization relationship maps may include constituents having an entity type other than "Person" or "System," such as "GenericAgent," "GenericEntity," or other entity type. A system visualization relationship map that includes interactions established between constituents of mixed entity types is also possible.

The system visualization relationship map 4202 includes an entity type identifier cell 4204 that identifies the interacting entity types, a set of rows 4206-4226 for the constituents identified in the electronic document having the entity type "System," and a set of columns 4228-4234 for the constituents identified in the electronic document having the entity type "Person." In one implementation, each of the rows 4206-4226 and each of the columns 4228-4234 match at least one permissible constituent of a glossary, such as the entity glossary 2502 or the agent glossary 140. In an alternative implementation, a row and/or a column may represent an impermissible constituent or impermissible phrase. Other arrangements of permissible and impermissible constituents and phrases are also possible.

In one implementation, each row 4206-4226 and each column 4228-4234 represents a system visualization relationship objects for the system visualization relationship map 4202. In addition, the system visualization relationship map 4202 may include system visualization interaction objects. With respect to the system visualization relationship map 4202, a system visualization interaction object may be an intersection cell between a row and a column where a document structure instance establishes an interaction between the constituent represented by the row and the constituent represented by the column. As one example, the intersection cell 4236 between the row 4206 and the column 4228 represents a system visualization interaction object. The intersection cell 4236 illustrates that at least one document structure instance identified by the syntax-based document visualization module 3604 establishes an interaction between the project resource management system 3706 and the resource manager 3724. Alternatively, a system visualization interaction object may be an intersection cell between a row and a column where an interaction is not established between the constituent represented by the row and the constituent represented by the column. As one example, the intersection cell 4238 between the row 4212 and the column 4228 represents a system visualization interaction object where a document structure instance has not established an interaction between the assign resource module 3704 and the resource manager 3724.

Figure 43:
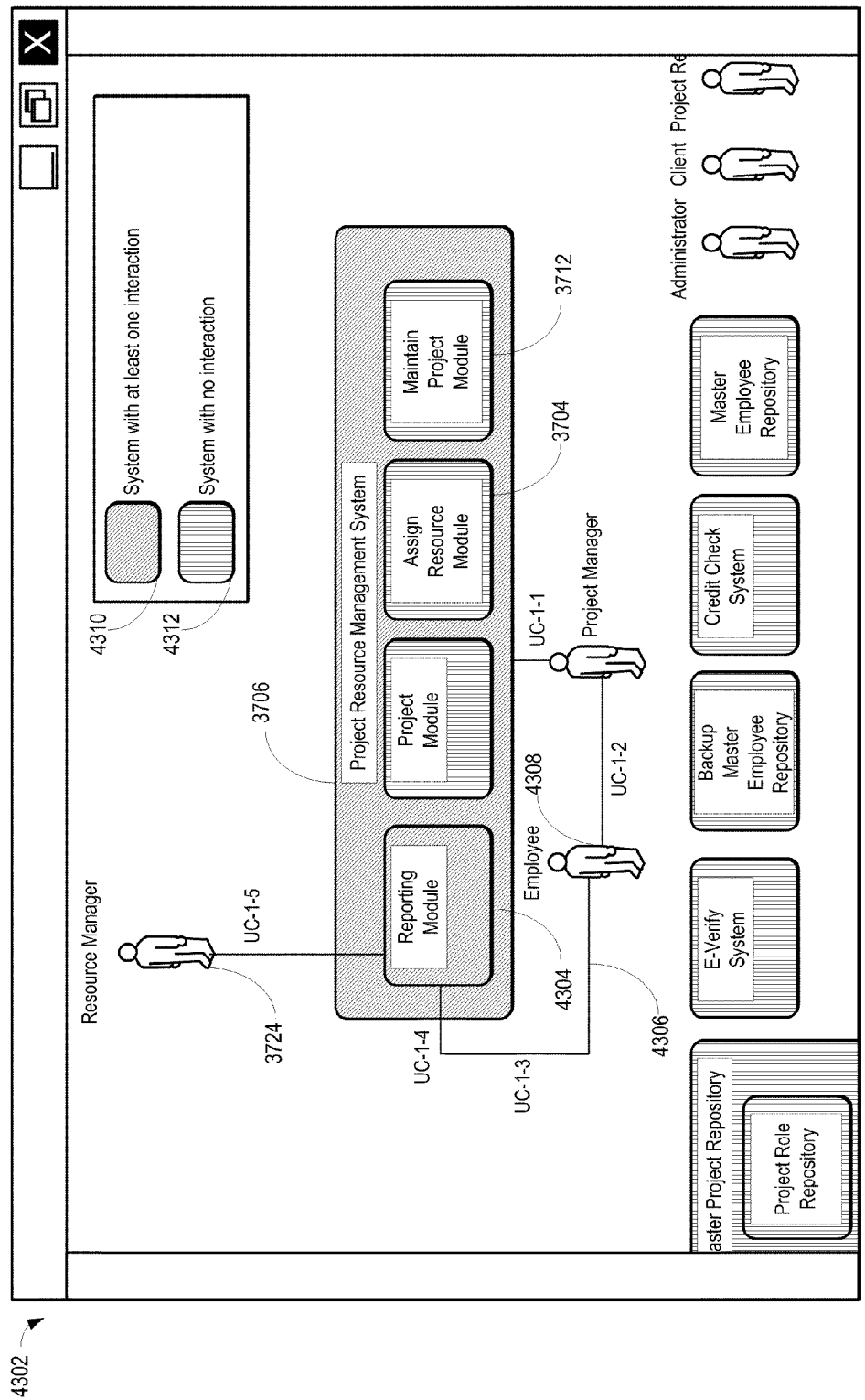
FIG. 43 shows an example of a sub-system visualization relationship map.

In another implementation, the syntax-based document visualization module 3604 is operative to generate a sub-system visualization relationship map. FIG. 43 shows one example of a sub-system visualization relationship map 4302. The sub-system visualization relationship map 4302 may represent the interactions among constituents identified in a document structure instance or a subset of document structure instances from a set of document structure instances. In one implementation, the sub-system visualization relationship map 4302 provides a visualization of the interactions between a subset of document structure instances that set out requirements for achieving an objective, such as a particular goal, use, or other type of objective. A subsystem visualization relationship map 4302 may also provide a visualization of the interactions between a subset of document structure instance that set out requirements for achieving more than one objective. For example, the subset of document structure instances may set out the requirements for adding a new user to a system or provisioning a new service. The sub-system visualization relationship map 4302 assists in the identification of proper and improper interactions among requirements identified for a particular objective, and helps identify whether a constituent has any interaction in towards achieving the particular objective. The sub-system visualization relationship map 4302 may help pinpoint and identify non-interacting constituents that should, in fact, be interacting constituents.

In generating the sub-system visualization relationship map 4302, the syntax-based document visualization module 3604 may perform a recognition process to recognize that one or more document structure instances conforms to an interaction syntax. As discussed previously, the interaction syntax may be a controlled document structure instance syntax and may, or may not, be associated with a document structure instance identifier. The syntax-based document visualization module 3604 may parse and/or analyze a document structure instance to identify interacting constituents and non-interacting constituents according to the interaction syntax. In recognizing whether a document structure instance conforms to an interaction syntax for generating the sub-system visualization relationship map 4302, the syntax-based document visualization module 3604 may employ any one of the syntaxes previously discussed.

In addition, the syntax-based document visualization module 3604 may identify a document structure instance for inclusion in the sub-system visualization relationship map 4302 based on a type-of-use identifier associated with the document structure instance. A type-of-use identifier may identify a use achievable by the document structure instance. For example, the type-of-use identifier may identify that a document structure instance is a first step or first action towards achieving a particular objective.

The type-of-use identifier may also distinguish the document structure instance from a set of document structure instance. Moreover, document structure instances with similar type-of-use identifiers may be grouped together as a subset of document structure instances. For example, a first type-of-use identifier may identify that a first document structure instance is a first step or first action towards achieving a particular objective, and a second type-of-use identifier may identify that a second document structure instance is a second step or second action towards achieving the same particular objective. Other arrangements of type-of-use identifiers are also possible.

Similar to the component visualization relationship map 3702, the sub-system visualization relationship map 4302 includes several system visualization relationship objects and several system visualization interaction objects. With respect to the sub-system visualization relationship map 4302, the system visualization relationship objects may represent a constituents from a subset of document structure instances, such as where the subset of document structure instances are distinguishable by one or more type-of-use identifiers. Similarly, the system interaction objects of the sub-system visualization relationship map 4302 may be a visual representation of an interaction, or non-interaction, between one or more of the visualization relationship objects.

The sub-system visualization relationship map 4302 represents a sub-system visualization relationship map for several constituents identified in document structure instances having a type-of-use identifier. Examples of constituents shown in the sub-system visualization relationship map 4302 include a reporting module 4304, the assign resource module 3704, the maintain project module 3712, the resource manager 3724 and the project resource management system 3706.

In one implementation, the visualization interaction objects of the sub-system visualization relationship map 4302 are identified by the type-of-use identifier associated with the document structure instance establishing the interaction, or non-interaction, between constituents. For example, the graphical iconic image 4306 includes the type-of-use identifier "UC-1-3," which identifies that the document structure instance having the type-of-use identifier "UC-1-3" establishes an interaction between an employee 4308 and the reporting module 4304. Other examples of type-of-use identifiers include the type-of-use identifier "UC-1-4," the type-of-use identifier "UC-1-2," and the type-of-use identifier "UC-1-1." By including the type-of-use identifiers in the sub-system visualization relationship map 4302, the visualization module 3604 assists in identifying the document structure instances that recite constituents used in achieving a particular objective, use, or goal. For example, by reviewing the system visualization interaction objects labeled with type-of-use identifiers, a user or other system can quickly refer to the identified document structure instance and determine whether the interaction, or non-interaction, established by the document structure instance is a proper, or desired, interaction or non-interaction.

Like the system visualization relationship map 4002, the sub-system visualization relationship map 4302 includes system visualization interaction objects that represent interactions among one or more of the system visualization relationship objects. The sub-system visualization relationship map 4302 shows that the system visualization interaction object 4306 illustrates an interaction, established by one or more document structure instances, between the employee 4308 and the reporting module 4304. Depending on the type-of-use identifier associated with a document structure instance or the type-of-use identifiers associated with a subset of document structure instances of an electronic document, a sub-system visualization relationship map may include none, one, or more than one system visualization interaction objects.

In evaluating a set of document structure instances, the sub-system visualization relationship map 4302 may also include a color schema having one or more assignable display states that displays interactions, or non-interactions, between constituents of a document structure instance or an electronic document. In FIG. 43, the sub-system visualization relationship map 4302 includes a first display state 4310 that displays that a constituent has at least one interaction, and a second display state 4312 that displays that a constituent does not have an interaction. The display states 4310-4312 may be based on one or more assignable characteristics of a visualization relationship object, such as a color, shading, orientation, position, or any other characteristic. In one implementation, the color schema includes a first color assignable to the first display state 4310, and a second color different than the first color assignable to the second display state 4312. However, other implementations are also possible. Based on the color schema, the visualization module 3604 assigns system visualization relationship objects display states depending on whether a document structure instance has established an interaction for the constituent.

Although the visualization module 3604 may be instructed or configured to generate the system visualization relationship map 4302, the visualization module 3604 may generate alternative system visualization relationship maps. FIG. 44 shows an alternative example of a sub-system visualization relationship map 4402. The system visualization relationship map 4402 represents an entity-specific sub-system visualization relationship map and more particularly, a sub-system visualization relationship map that illustrates the interactions between a first set of constituents having an entity type of "System" and a second set of constituents having an entity type "System." However, other types of sub-system visualization relationship maps may include constituents having an entity type other than "System," such as "Person," "GenericEntity" or other entity type. A sub-system visualization relationship map that includes interactions between constituents of mixed entity types is also possible.

The sub-system visualization relationship map 4302 includes an entity type identifier cell 4404 that identifies the interacting entity types, a set of rows 4406-4426 for the constituents identified in the electronic document having the entity type "System" and a set of columns 4428-4432 for the constituents identified in the electronic document having the entity type "System." In one implementation, each of the rows 4405-4426 and each of the columns 4428-4432 match at least one permissible constituent of a glossary, such as the entity glossary 2502 or the agent glossary 140. In an alternative implementation, a row and/or a column may represent an impermissible constituent or impermissible phrase. Other arrangements of permissible and impermissible constituents and phrases are also possible.

In one implementation, each row 4406-4426 and each column 4428-4432 represents a system visualization relationship object for the sub-system visualization relationship map 4402. In addition, the sub-system visualization relationship map 4402 also includes system visualization interaction objects. With respect to the sub system visualization relationship map 4402, a system visualization interaction object may be an intersection cell between a row and a column where a document structure instance establishes an interaction between the constituent represented by the row and the constituent represented by the column. As one example, the intersection cell 4434 between the row 4406 and the column 4430 represents a system visualization interaction object. The intersection cell 4434 illustrates that a document structure instance identified by the syntax-based document visualization module 3604 establishes an interaction between the project resource management system 3706 and the reporting module 4304. Alternatively, a system visualization interaction object may be an intersection cell between a row and a column where an interaction is not established between the constituent represented by the row and the constituent represented by the column. As one example, the intersection cell 4436 between the row 4414 and the column 4430 represents a visualization interaction object where a document structure instance has not established an interaction between the maintain project module 3712 and the reporting module 4304.

FIG. 45 shows an alternative example of a sub-system visualization relationship map 4502. The sub-system visualization relationship map 4502 represents an entity-specific sub-system visualization relationship map and more particularly, a sub-system visualization relationship map that illustrates the interactions between a first set of constituents having an entity type of "System" and constituents having the entity type "Person." However, other types of sub-system visualization relationship maps may include constituents having an entity type other than "Person" or "System," such as "GenericAgent," "GenericEntity," or other entity type. A sub-system visualization relationship map that includes interactions established between constituents of mixed entity types is also possible.

The sub-system visualization relationship map 4502 includes an entity type identifier cell 4506 that identifies the interacting entity types, a set of rows 4506-4526 for the constituents identified in subset of document structure instances having the entity type "System," and a set of columns 4528-4534 for the constituents identified in a subset of document structure instances having the entity type "Person." In one implementation, each of the rows 4506-4526 and each of the columns 4528-4534 correspond to at least one permissible constituent of a glossary, such as the entity glossary 2502 or the agent glossary 140. In an alternative implementation, a row and/or a column may represent an impermissible constituent or impermissible phrase. Other arrangements of permissible and impermissible constituents and phrases are also possible.

In one implementation, each row 4506-4526 and each column 4528-4534 represents a system visualization relationship objects for the sub-system visualization relationship map 4502. In addition, the sub-system visualization relationship map 4502 may include system visualization interaction objects. With respect to the sub-system visualization relationship map 4502, a system visualization interaction object may be an intersection cell between a row and a column where a document structure instance establishes an interaction between the constituent represented by the row and the constituent represented by the column. As one example, the intersection cell 4538 between the row 4510 and the column 4532 represents a system visualization interaction object. The intersection cell 4538 illustrates that at least one document structure instance identified by the syntax-based document visualization module 3604 establishes an interaction between the project resource management system reporting module 4304 and the resource manager 3724. Alternatively, a system visualization interaction object may be an intersection cell between a row and a column where an interaction is not established between the constituent represented by the row and the constituent represented by the column. As one example, the intersection cell 4538 between the row 4512 and the column 4532 represents a system visualization interaction object where a document structure instance has not established an interaction between the assign resource module 3704 and the resource manager 3724.

The syntax-based document visualization module 3604 may also generate a sub-system visualization relationship map that includes one or more document structure instances that establish the interaction, or non-interaction, between two constituents. Referring to FIG. 46 is an alternative example of a entity-specific sub-system visualization relationship map 4602 that includes a visualization interaction object 4604 having a document structure instance. The document structure instance "UC 1-4: Project resource management system sends data to reporting module" establishes an interaction between the reporting module 4304 and the project resource management system 3706. The document structure instance of the visualization interaction object 4604 includes a type-of-use identifier, "UC 1-4," which indicates to the syntax-based document visualization module 3604 that the document structure instance should be included in a subset of document structure instances relating to a particular objective. For example, other type-of-use identifiers may also include the prefix "UC," which indicates to the syntax-based document visualization module 3604 that the document structure instance associated with the type-of-use identifier having the prefix "UC" should be included in the subset with the document structure instance associated with the type-of-use identifier "UC 1-4." Other type-of-use identifiers are also possible.

FIG. 47 is yet another example of an entity-specific sub-system visualization relationship map 4702 that includes visualization interaction objects 4704-4706 having at least one document structure instance. As shown in FIG. 47, a first visualization interaction object 4704 includes one document structure instance, whereas a second visualization interaction object 4706 includes more than one document structure instance. By including document structure instances in the entity-specific sub-system visualization relationship map 4602 and the entity-specific sub-system visualization relationship map 4702, the syntax-based document visualization module 3604 facilitates rapid identification of the document structure instances that establish the interaction between constituents. Inclusion of the document structure instances in the entity-specific sub-system visualization relationship maps 4602-4702 reduces time and resources spent in reviewing an electronic document to identify the document structure instances that establish the interactions between constituents.

FIG. 48 shows one example of an attribute requirement report 4802 generated by the syntax-based document attribute analysis module 3606. With reference to FIG. 27, the syntax-based document attribute analysis module 3606 refers to the non-functional attribute glossary 2702 to determine whether one or more document structure instances satisfy an attribute for a constituent in the document structure instance.

For instance, the syntax-based document attribute analysis module 3606 may first identify a constituent in a document structure instance that matches a first permissible constituent found in one or more glossaries, such as the entity glossary 2502 or the agent glossary 140. The syntax-based document attribute analysis module 3606 may then analyze the document structure instance, such as by parsing the words and phrases of the document structure instance, for a document structure instance phrase that satisfies an attribute requirement associated with the constituent. As previously discussed, satisfying an attribute requirement may include satisfying one or more target phrases from a document structure instance with an attribute requirement phrase. The syntax-based document attribute analysis module 3606 may then generate the attribute requirement report 4802 which may indicate whether an attribute for constituent was satisfied by one or more document structure instances.

In general, an attribute requirement report organizes major categories of non-functional attributes by system and sub-system. In alternative implementations, an attribute requirement report may organize minor categories, alternative categories, or any other type of categories. The attribute requirement report 4802 is an example of a category-specific attribute requirement report for a performance category of non-functional attributes. Category handles 4838-4846 may allow a user or system to select an alternative category-specific attribute requirement report for another category, such as a capacity and volumetrics category, a delivery channels category, a new area category, and an availability. However, the attribute requirement report 4802 may also be implemented as a cross-category attribute requirement report that identifies whether document structure instances satisfy attributes for more than one attribute category.

The organization of the attribute requirement report 4802 facilitates identifying if a category (such as a performance category, a capacity and volumetrics category, a delivery channels category, or other category) of a non-functional attribute is not specified for any system and/or sub-system. As shown in FIG. 48, the attribute requirement report 4802 identifies that a number of attributes have not been satisfied for the performance category.

In one implementation, the attribute requirement report 4802 includes a set of rows 4804-4824, wherein each row represents a constituent identified by the syntax-based document attribute analysis module 3606. The attribute requirement 4802 may also include a set of columns 4828-4832, wherein each column represents an attribute requirement contained within the non-functional attribute glossary 2702. However, other arrangements of rows and columns are possible. Moreover the attribute requirement report 4802 may be represented by any type of report, such as a pie chart, a bar chart, a step chart, or any other type of chart.

The attribute requirement report 4802 may further include an intersection cell that between a row and column that identifies whether a document structure instance satisfies an attribute requirement assigned to a constituent. As shown in FIG. 48, the attribute requirement report 4802 includes an intersection cell 4834 that identifies that a document structure instance satisfies the online response time attribute for the master employee repository constituent. In this example, the document structure instance that satisfies the online response time attribute is "The Master Employee Repository must provide an average response time of 500 milliseconds for employee record queries." However, other document structure instances that satisfy the online response time attribute for the master employee repository constituent are also possible.

Moreover, the attribute requirement report 4802 may include an intersection cell 4836 that identifies that a document structure instance does not satisfy an attribute requirement assigned to a constituent. Alternatively, the intersection cell 4836 may identify that no document structure instances from an electronic satisfies an attribute requirement assigned to a constituent. In the attribute requirement report 4802, the intersection 4836 identifies that no document structure instances satisfies the online response time attribute assigned to the E-verify system constituent. In this example, the document structure instance that satisfies the online response time attribute is "The Master Employee Repository must provide an average response time of 500 milliseconds for employee record queries."

The systems, components, and logic described above may be implemented in many different ways, including a combination of hardware and software, or as software for installation on any desired operating system including Linux, Unix, or Windows. The functionality may be implemented in a single system or functionally partitioned across multiple systems. As another example, the components, systems, and logic may be implemented as computer-executable instructions or as data structures in memory and may be stored on, distributed across, or read from many different types of machine-readable media. The machine-readable media may include RAM, ROM, hard disks, floppy disks, CD-ROMs, flash memory or other machine-readable medium. The components, systems and logic may also be encoded in a signal, such as a signal received from a network or partitioned into sections and received in multiple packets communicated across a network.

The systems may be implemented in software, hardware, or a combination of software and hardware. The systems may be implemented in a computer programming language, such as C# or Java, or in a query language, such as the SPARQL Protocol and RDF Query Language ("SPARQL"). The systems may also use one or more metadata data models, such as the Resource Description Framework ("RDF"). Moreover, the systems may use a knowledge representation language, such as the Web Ontology Language ("OWL") in conjunction with a semantic framework, such as Jena.

Furthermore, the systems may be implemented with additional, different, or fewer components. As one example, a processor or any other logic or component may be implemented with a microprocessor, a microcontroller, a DSP, an application specific integrated circuit (ASIC), program instructions, discrete analog or digital logic, or a combination of other types of circuits or logic. As another example, memories may be DRAM, SRAM, Flash or any other type of memory. The systems may be distributed among multiple components, such as among multiple processors and memories, optionally including multiple distributed processing systems.

Logic, such as programs or circuitry, may be combined or split among multiple programs, distributed across several memories and processors, and may be implemented in or as a function library, such as a dynamic link library (DLL) or other shared library. The DLL, for example, may store code that implements functionality for a specific module as noted above. As another example, the DLL may itself provide all or some of the functionality of the system. In one implementation, the system is implemented using Visual Basic for Applications as a Word™ application plug-in.

Interfaces between the systems and the logic and modules within systems may be implemented in numerous ways. For example, interfaces between systems may be Web Services, Simple Object Access Protocol, or Enterprise Service Bus interfaces. Other examples of interfaces include message passing, such as publish/subscribe messaging, shared memory, and remote procedure calls.

While various embodiments of the invention have been described, it will be apparent to those of ordinary skill in the art that many more embodiments and implementations are possible within the scope of the invention. Accordingly, the invention is not to be restricted except in light of the attached claims and their equivalents.

We claim:

1. A syntax-based document analysis system comprising:
a memory comprising:
a document type specific syntax definition for syntactically correct document structure, the syntax definition comprising a first structure category component for the document structure;
a first editable electronic spoken language glossary comprising permissible constituents associated with the first structure category component;
executable instructions that define:
a syntax-based document visualization module, the syntax-based document visualization module operative to:
identify a first constituent in a document structure instance of an electronic document matching a first permissible constituent found in the first editable electronic spoken language glossary;
identify a second constituent in the document structure instance matching a second permissible constituent found in the first editable electronic spoken language glossary;
determine whether the document structure instance establishes an interaction between the first constituent and the second constituent;
generate a component visualization relationship map comprising:
a first visualization relationship object that represents the first constituent;
a second visualization relationship object that represents the second constituent; and
a visualization interaction object that represents whether the document structure instance establishes the interaction between the first constituent and the second constituent; and
output the component visualization relationship map; and
a processor operative to execute the executable instructions.

2. The syntax-based document analysis system of claim 1, wherein:
the electronic document comprises a set of document structure instances; and
the syntax-based document visualization module is further operative to:
identify a constituent in at least some of the document structure instances that matches a corresponding permissible constituent found in the first editable electronic spoken language glossary;
generate a system visualization relationship map comprising:
a set of system visualization relationship objects, wherein each system visualization relationship object represents a corresponding matching constituent of each of the document structure instances; and
a set of system visualization interaction objects representing interactions among at least some of the system visualization relationship objects, wherein at least one system visualization interaction object represents an interaction between two or more system visualization relationship objects of the set of system visualization relationship objects; and
output the system visualization relationship map.

3. The syntax-based document analysis system of claim 1, wherein:
the electronic document comprises a set of document structure instances;
the set of document structure instances comprises a subset of document structure instances, wherein a document structure instance of the subset of document structure instances is identified by a type-of-use identifier that identifies a use achievable by the document structure instance; and
the syntax-based document visualization module is further operative to:
identify a constituent in at least some of the document structure instances from the subset of document structure instances, wherein the constituent matches a corresponding permissible constituent found in the first editable electronic spoken language glossary;

generate a sub-system visualization relationship map comprising:
a set of system visualization relationship objects that each represent a corresponding constituent in at least some of the document structure instances from the subset of document structure instances; and
a set of system visualization interaction objects representing interactions among at least some of the system visualization relationship objects, wherein at least one system visualization interaction object represents an interaction between two or more system visualization relationship objects of the set of system visualization relationship objects; and
output the sub-system visualization relationship map.

4. The syntax-based document analysis system of claim 1, wherein:
the component visualization relationship map comprises:
a set of rows for the constituents identified in the electronic document, wherein:
at least one row matches a permissible constituent of the first editable electronic spoken language glossary; and
the first visualization relationship object is one of the rows of the component visualization relationship map;
a set of columns for the constituents identified in the electronic document, wherein:
at least one column matches a permissible constituent of the first editable electronic spoken language glossary; and
the second visualization relationship object is one of the columns of the component visualization relationship map; and
an intersection cell representing an intersection between the first visualization object and the second visualization object, wherein the intersection cell comprises the visualization interaction object.

5. The syntax-based document analysis system of claim 1, wherein:
the component visualization relationship map comprises a color schema comprising:
a first assignable display state that displays that the interaction is established between the first constituent and the second constituent; and
a second assignable second display state that displays that no interaction is established between the first constituent and the second constituent; and
the first visualization relationship object is assigned the first assignable display state when the syntax-based document visualization module determines that the document structure instance establishes the interaction between the first constituent and the second constituent.

6. The syntax-based document analysis system of claim 5, wherein:
the first assignable display state comprises a first color; and
the second assignable display state comprises a second color different than the first color.

7. The syntax-based document analysis system of claim 1, wherein:
the component visualization relationship map comprises:
a first graphical iconic image comprising the first visualization relationship object;
a second graphical iconic image comprising the second visualization relationship object; and
a third graphical interaction iconic image comprising the visualization interaction object when the document structure instance establishes the interaction between the first constituent and the second constituent.

8. The syntax-based document analysis system of claim 1, where the document type specific syntax definition further comprises at least one of:
a second structure category component for the document structure;
a third structure category component for the document structure; and
a fourth structure category component for the document structure.

9. The syntax-based document analysis system of claim 8, where:
the second structure category component comprises a mode category component;
the third category component comprises an action category component;
and the fourth category component comprises a remainder category component.

10. The syntax-based document analysis system of claim 8, further comprising:
a second electronic spoken language glossary comprising permissible constituents associated with the second structure category component;
a third electronic spoken language glossary comprising permissible constituents associated with the third structure category component; and
a fourth electronic spoken language glossary comprising permissible constituents associated with the fourth structure category component.

11. The syntax-based document analysis system of claim 1, further comprising:
a syntax-based document analysis module, the syntax-based document analysis module operative to:
identify the document structure instance in the electronic document using a document type specific document structure identifier;
determine whether the document structure instance includes any of the permissible constituents in the first electronic spoken language glossary consistent with the document type specific syntax definition; and
perform a document analysis operation based on whether the document structure instance includes any of the permissible constituents in the first electronic spoken language glossary consistent with the document type specific syntax definition.

12. A syntax-based document analysis system comprising:
a memory comprising:
a document type specific syntax definition for syntactically correct document structure, the syntax definition comprising a first structure category component for the document structure;
a first electronic spoken language glossary comprising permissible constituents associated with the first structure category component; and
an electronic attribute glossary comprising an attribute requirement assignable to at least some of the permissible constituents of the first electronic spoken language glossary, wherein the attribute requirement is identifiable by an attribute phrase associated with the attribute requirement; and
executable instructions that define:
a syntax-based document attribute analysis module, the syntax-based document attribute analysis module operative to:
identify a first constituent in a document structure instance of an electronic document matching a first permissible constituent found in the first editable electronic spoken language glossary;

analyze the document structure instance for a document structure instance phrase satisfying the attribute phrase;

determine that the document structure instance satisfies the attribute requirement for the first constituent of the document structure instance when the document structure instance phrase satisfies the attribute phrase; and generate an attribute requirement report identifying whether the attribute requirement for the first constituent has been satisfied; and output the attribute requirement report; and a processor operable to execute the executable instructions.

13. The syntax-based document analysis system of claim 12, wherein:

the electronic document comprises a set of document structure instances; and the attribute requirement report comprises:
- a row for the first constituent identified in the electronic document;
- a column for the attribute requirement contained within the electronic attribute glossary; and
- an intersection cell representing an intersection between the row and the column, wherein the intersection cell identifies whether a document structure instance from the set of document structure instances satisfies the attribute requirement assigned to the first constituent.

14. The syntax-based document analysis system of claim 12, wherein:

the electronic attribute glossary further comprises:
- an activatable element associated with the attribute requirement that, when activated, identifies that the attribute requirement is to be satisfied; and
- the syntax-based document attribute analysis module is further operative to determine whether the attribute requirement is to be satisfied based on whether the activatable element is activated.

15. The syntax-based document analysis system of claim 12, where the document type specific syntax definition further comprises:

a second structure category component for the document structure;

a third structure category component for the document structure; and a fourth structure category component for the document structure.

16. The syntax-based document analysis system of claim 15, where:

the second structure category component comprises a mode category component;

the third category component comprises an action category component; and the fourth category component comprises a remainder category component.

17. The syntax-based document analysis system of claim 15, further comprising:

a second electronic spoken language glossary comprising permissible constituents associated with the second structure category component;

a third electronic spoken language glossary comprising permissible constituents associated with the third structure category component; and a fourth electronic spoken language glossary comprising permissible constituents associated with the fourth structure category component.

18. The syntax-based document analysis system of claim 11, further comprising:

a syntax-based document analysis module, the syntax-based document analysis module operative to:

identify the document structure instance in the electronic document using a document type specific document structure identifier;

determine whether the document structure instance includes any of the permissible constituents in the first electronic spoken language glossary consistent with the document type specific syntax definition; and perform a document analysis operation based on whether the document structure instance includes any of the permissible constituents in the first electronic spoken language glossary consistent with the document type specific syntax definition.

* * * * *